(12) United States Patent
Daoura et al.

(10) Patent No.: US 12,452,638 B2
(45) Date of Patent: Oct. 21, 2025

(54) BATTERY BEACON SYSTEMS AND METHODS OF USE

(71) Applicant: PB Inc., Issaquah, WA (US)

(72) Inventors: Daniel J Daoura, Renton, WA (US); Nicholas R Pearson-Franks, Sammamish, WA (US)

(73) Assignee: PB Inc., Issaquah, WA (US)

( * ) Notice: Subject to any disclaimer, the term of this patent is extended or adjusted under 35 U.S.C. 154(b) by 892 days.

(21) Appl. No.: 17/694,582

(22) Filed: Mar. 14, 2022

(65) Prior Publication Data

US 2022/0225070 A1 Jul. 14, 2022

Related U.S. Application Data

(63) Continuation-in-part of application No. 16/673,251, filed on Nov. 4, 2019, now Pat. No. 11,277,726, which is a continuation of application No. 15/978,156, filed on May 13, 2018, now abandoned, which is a continuation-in-part of application No. 15/072,699, filed on Mar. 17, 2016, now abandoned.

(60) Provisional application No. 62/136,285, filed on Mar. 20, 2015.

(51) Int. Cl.
*H04W 4/80* (2018.01)
*H04L 67/02* (2022.01)
*H04W 4/02* (2018.01)

(52) U.S. Cl.
CPC ............... *H04W 4/80* (2018.02); *H04L 67/02* (2013.01); *H04W 4/02* (2013.01); *Y02D 30/70* (2020.08)

(58) Field of Classification Search
CPC ......... H04W 4/80; H04W 4/02; H04W 4/029; H04W 4/70; H04L 67/02; Y02D 30/70
See application file for complete search history.

(56) References Cited

U.S. PATENT DOCUMENTS

| 8,625,559 | B2* | 1/2014 | Kumar | H04W 52/0261 370/338 |
| 8,853,997 | B2* | 10/2014 | Fung | B60L 53/305 320/132 |
| 9,058,620 | B1* | 6/2015 | Boyle | G06Q 30/0226 |
| 9,494,674 | B2* | 11/2016 | Messier | G01S 19/48 |

(Continued)

*Primary Examiner* — Ankur Jain
(74) *Attorney, Agent, or Firm* — Christensen O'Connor Johnson Kindness PLLC

(57) ABSTRACT

In an embodiment, a battery radio jacket with flexible printed circuit operably mountable on an external surface of a standard battery, typically with a conductive adhesive backing, the jacket having end tabs for electrically connecting with the anode and cathode of the battery. Powered in parallel with a battery-operated appliance or load ("host asset"), the radio jacket transmits a unique radio identifier useful in finding and tracking the host asset. For convenience, the battery radio jacket as assembled on a standard battery, fits into the battery-receiving compartment of the battery-operated appliance without modification of the form factor of the battery. Optionally the radio jacket may include a switch for radio control of power to the appliance or load. The battery radio jackets enable radio links to smart devices such as smartphones and may be operated by a cloud host as part of a system for finding and tracking assets and for sensing and reporting battery status and environmental data.

25 Claims, 30 Drawing Sheets

(56) References Cited

U.S. PATENT DOCUMENTS

| | | | |
|---|---|---|---|
| 2014/0011058 A1* | 1/2014 | Adachi | B60L 50/66 429/61 |
| 2014/0151079 A1* | 6/2014 | Furui | B25F 5/02 173/171 |
| 2014/0228044 A1* | 8/2014 | Jones, Jr. | G01S 5/02 342/386 |
| 2014/0342193 A1* | 11/2014 | Mull | H01M 10/4257 429/61 |
| 2015/0084769 A1* | 3/2015 | Messier | H04W 4/021 340/539.13 |
| 2015/0162646 A1* | 6/2015 | Kawase | H01M 10/4257 429/7 |

* cited by examiner

SIGNAL STRENGTH vs DISTANCE

FIG. 6A
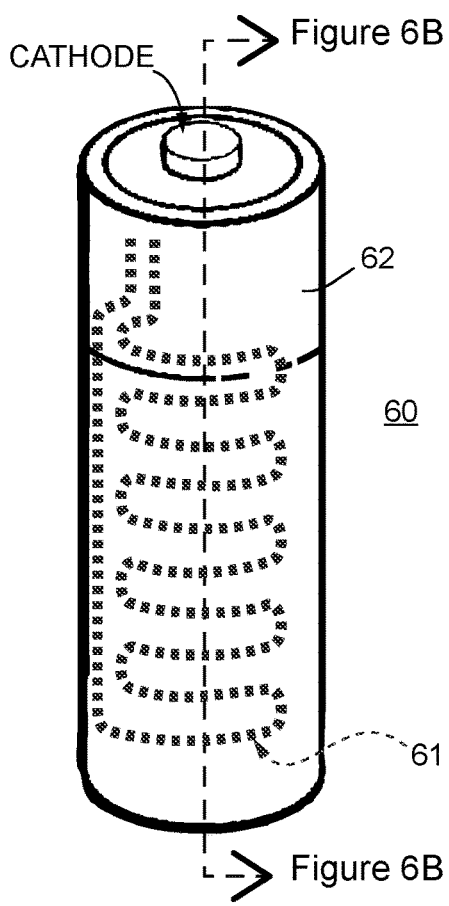
FIG. 6B
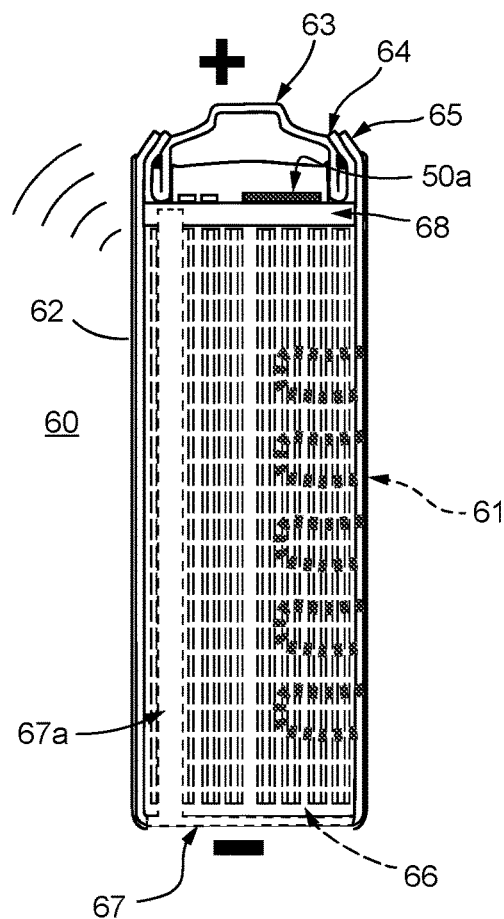
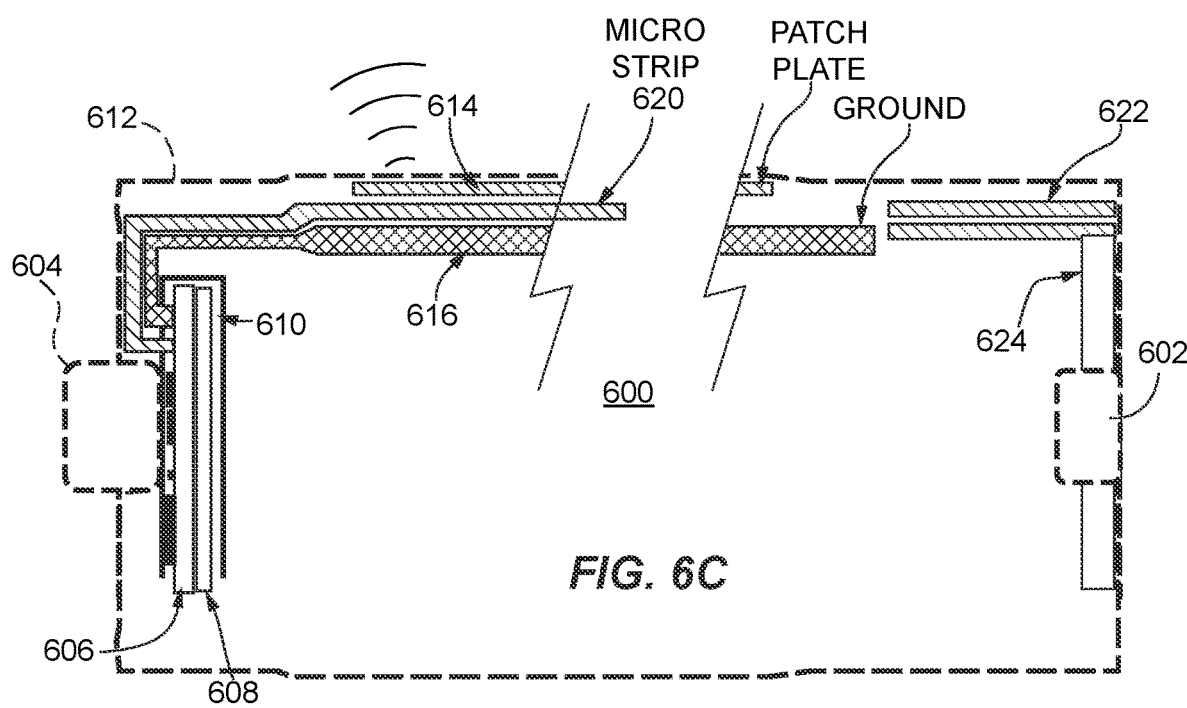
FIG. 6C

FIG. 10A
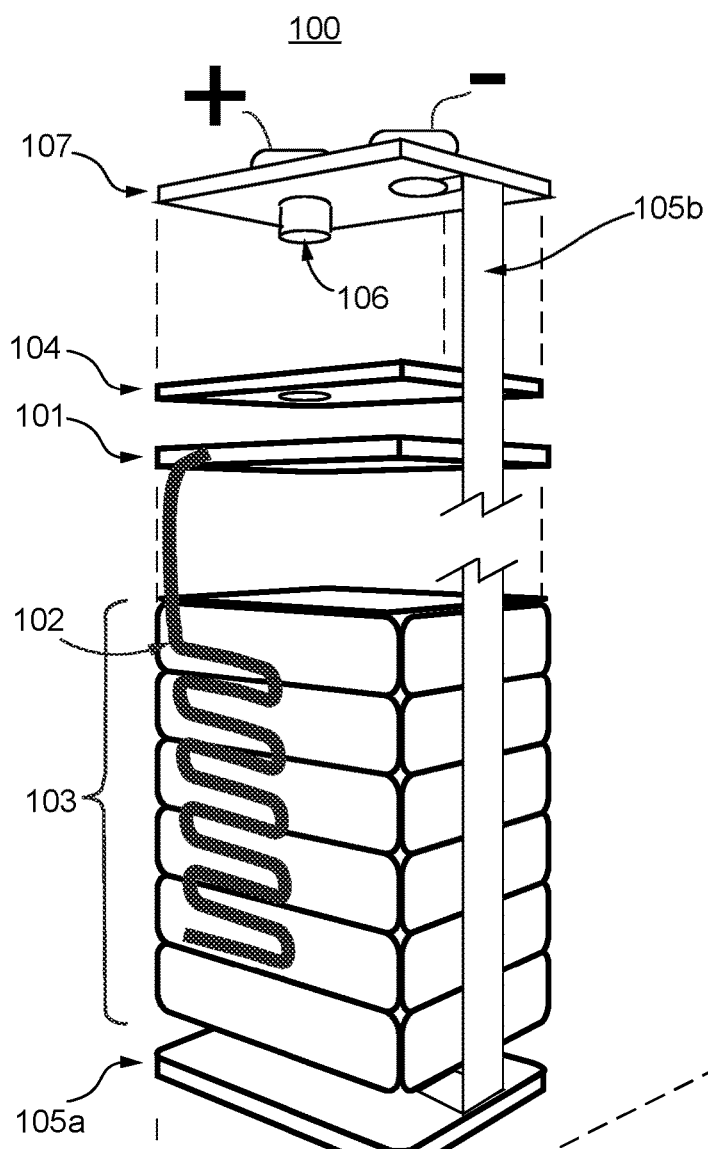
FIG. 10B
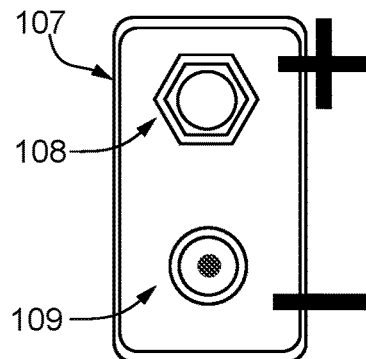
FIG. 10C
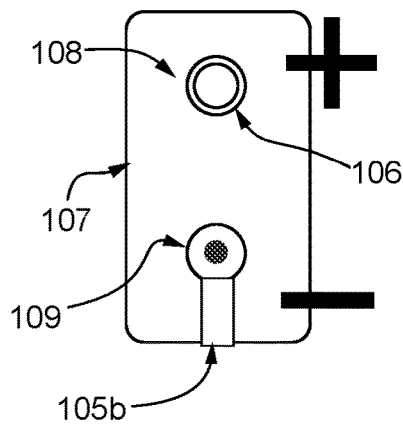
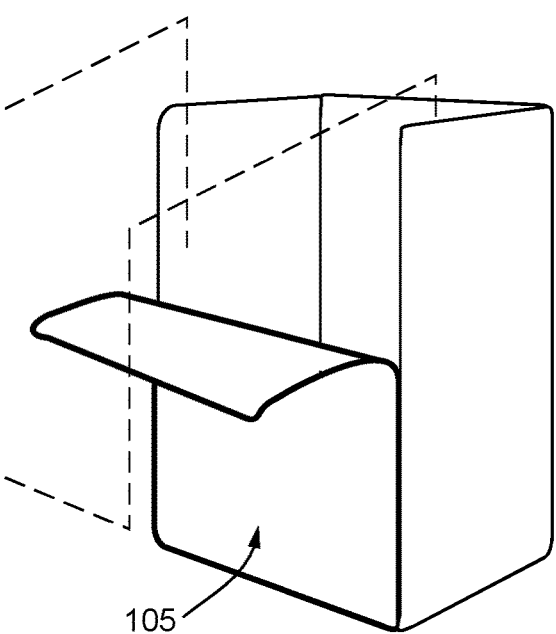

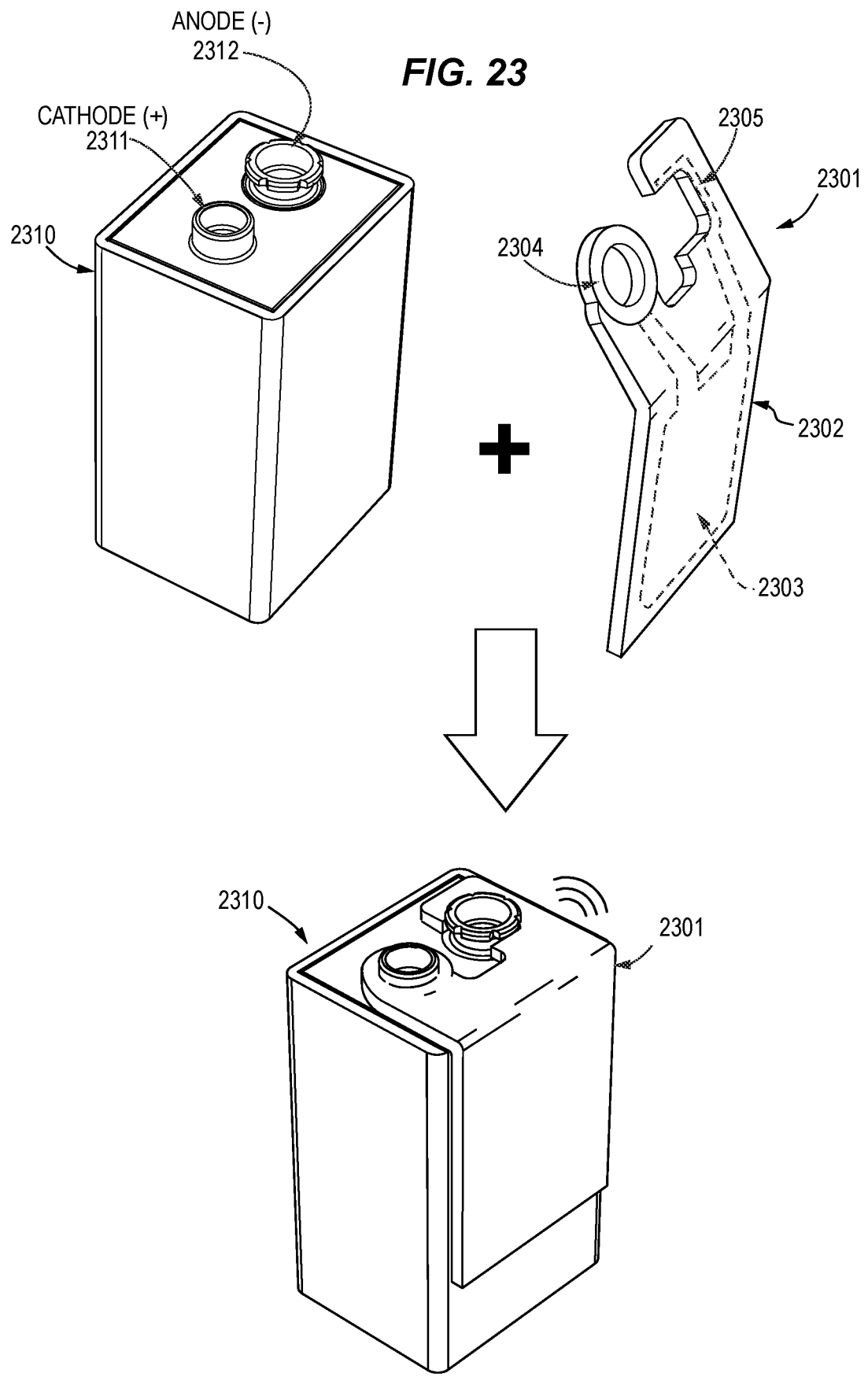

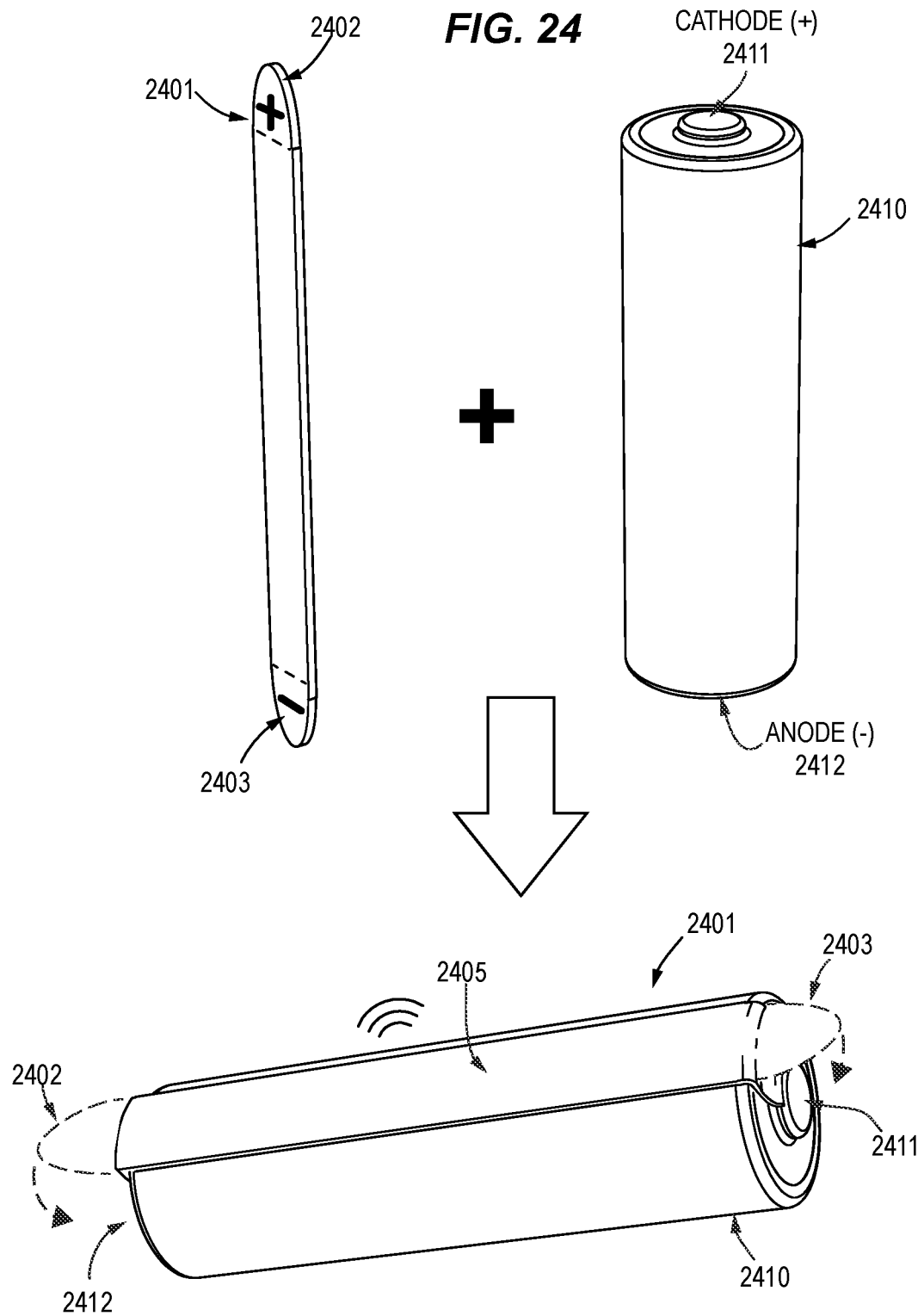

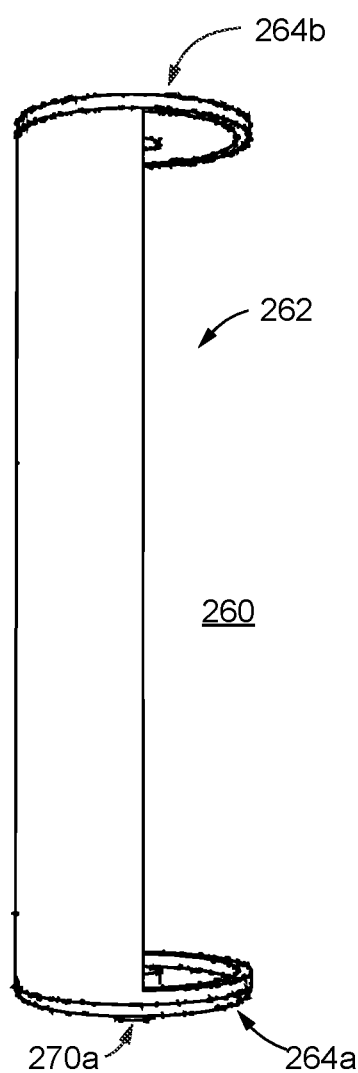
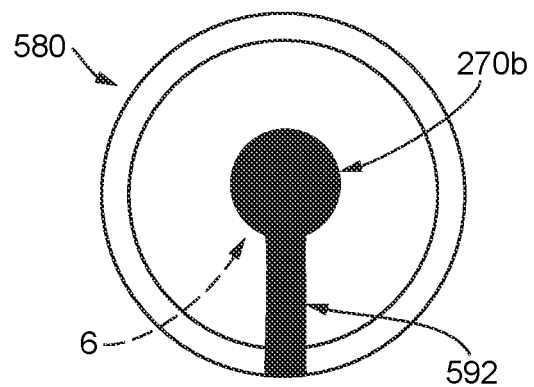
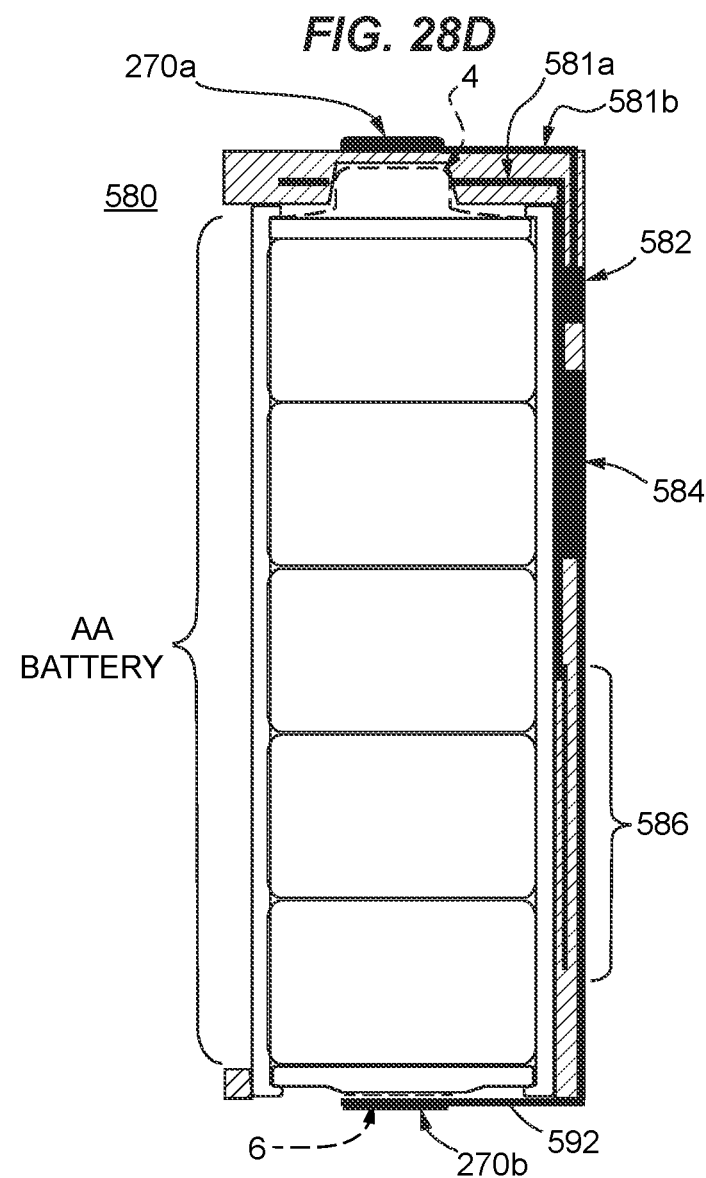

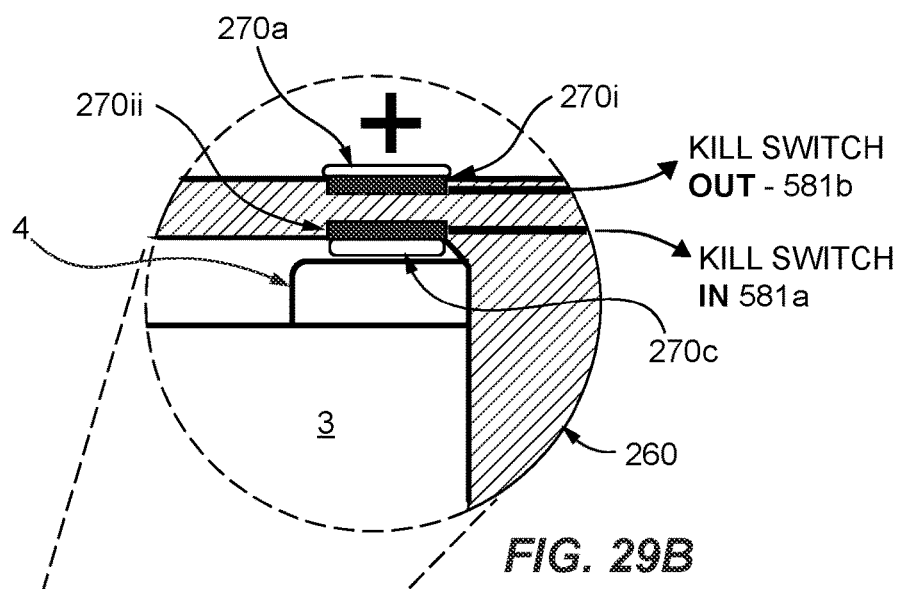
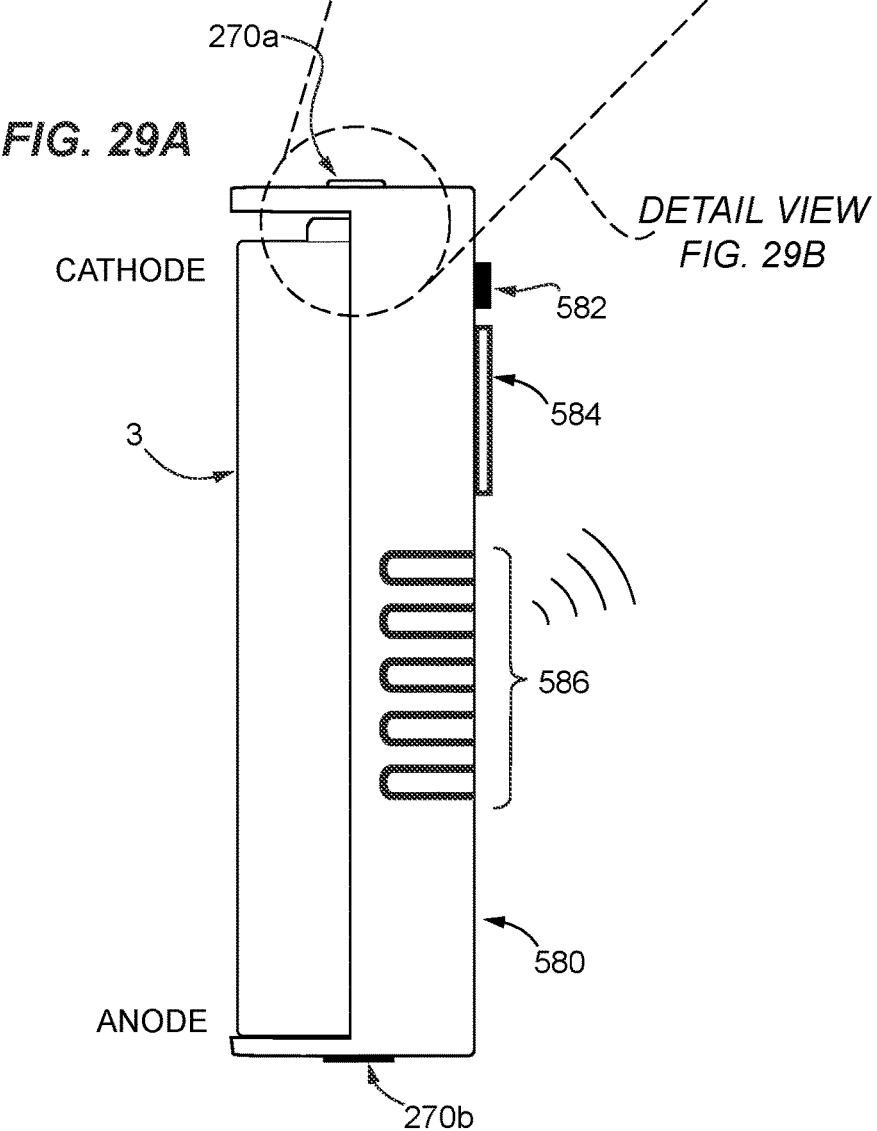

BATTERY BEACON SYSTEMS AND METHODS OF USE

CROSS REFERENCE TO RELATED APPLICATIONS

This application is a Continuation-In-Part of U.S. patent Ser. No. 16/673,251 filed Nov. 4, 2019, which is a Continuation of U.S. patent Ser. No. 15/978,156 filed May 13, 2018, which is a Continuation-In-Part of U.S. patent Ser. No. 15/072,699 filed Mar. 17, 2016, which claims the benefit of priority under 35 U.S.C. § 119(e) to U.S. Provisional Pat. Appl. No. 62/136,285 filed Mar. 20, 2015, all of which are herein incorporated in full by reference for all purposes.

This application is further related to U.S. Provisional Pat. Appl. No. 62/175,141 filed 12 Jun. 2015 titled "Devices And Network Architecture For Improved Radiobeacon Mediated Data Context Sensing", to U.S. Provisional Patent Appl. No. 62/260,313 filed 26 Nov. 2015, to U.S. Provisional Patent Appl. No. 62/256,955 filed 18 Nov. 2015, to U.S. Non-Provisional patent application Ser. No. 14/967,339 filed 13 Dec. 2015 titled "System Architectures and Methods for Radiobeacon Data Sharing", and to U.S. Pat. No. 9,392,404 filed 10 Jun. 2014 titled "Tracking device program with remote controls and alerts", said patent documents being co-assigned at the time of filing and are incorporated herein in entirety for all purposes by reference.

FIELD OF THE INVENTION

The invention relates to smart batteries, radiobeacon networks of batteries, and to systems and methods enabled by battery:beacon combinations.

BACKGROUND

We are increasingly surrounded by a "cloud" of electronic devices that are network compatible and are capable of exchanging data and programs with the Internet. This has been termed the "Internet of Things" (IoT). To track or monitor each device in the IoT, very large numbers of unique identifiers (UUID) may be needed, billions or trillions in fact. However, many devices are relevant only to one user or a group of users in a local environment such as a living space or a work space. Thus the Internet of Things presents a level of complexity that increasingly has become out of reach for most people, either as too difficult and time-consuming to organize, too big, or too costly. The IoT is suitable for large scale operations such as retail sales and inventory control (replacing in many cases RFID tagging) or urban environments (as in the "smart cities" concept), and for big science (such as environmental monitoring) but in order to penetrate home markets and smaller businesses, simpler systems are needed.

In addition, modern households contain large numbers of batteries used to power electronic devices. Some are essential for safety, such as the batteries that power portable smoke alarms and warn of potential fire hazards, and batteries needed emergency situations such as a power loss, a heavy snowfall, a tsunami, or an earthquake. Merely inventorying the stocks of batteries on hand is not sufficient; batteries must also be routinely tested and replaced as they reach the end of their useful life. Ideally, results of any testing are electronically recorded and archived, with appropriate notifications being sent to those responsible for their upkeep.

These systems are not readily implemented without obsoleting a whole generation of installed devices and consumer products. And where networking is implemented in the devices, the needed communications links require complex setup that is beyond the skill of the average user and programming or firmware that may be incompatible with newer generations of mobile devices.

These combined problems call for a combined solution. Integrating a level of intelligence into a battery is part of the answer, but a network communications system is also needed so that batteries can share relevant information with a user's smart device or a system operator's network. Thus there is a need for a battery:radiobeacon system capable of assisting the consumer with managing battery operated distributed power systems and serendipitously, providing tracking, locating, and a sensor web for the user or for user communities. These and other problems are addressed by the invention described below.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiments of the invention, battery:radiobeacon combinations are configurable by an individual user to help find lost objects and monitor pets and the activities of small children or hospital patients. The tracking device is essentially a beacon in a battery, and is a comprehensive solution to locate, monitor and track missing pets, people, luggage, inventory, tools and items of interest, for example. In other embodiments the tracking device incorporates various sensors and control mechanisms that make the tracking device a versatile multi-function device which can remotely inform or control other devices such as smartphones, tablets, or computers. These tracking devices, which we will term "smart batteries" or "battery:beacon combinations" can also report on their own condition.

The devices are instrumental in shaping and creating a market for the "internet of things" by allowing a user or network of users to seamlessly share sensor data while providing a regional or global picture of environmental conditions such as temperature, movement, radio traffic, trends in a particular area or simply a collaborative picture of all cats (with collars) active in a particular city at a specific time. The tracking device may have a speaker and a light emitting diode as is useful for its original search and find function. A control apparatus is associated with the tracking device. The control apparatus may command the tracking device to emit an alert, including a buzz or flashing light. If a tracked object is inside a drawer or under a pillow, the person searching for the object will hear the buzz or see the flashing light. The control apparatus may also set its own alerts to trigger based upon the distance between the tracking device and the control apparatus. Alerts can be based upon pairing the location of the tracking device to the alert so that alerts are only provided at predetermined locales and/or predetermined times.

Embodiments of the tracking device conserve power and space. The electronics of the tracking device are carried on a circuit board inside the battery housing. In some embodiments the battery may be wirelessly recharged with inductive or solar powered chargers but the batteries are otherwise readily exchangeable and relieve the load of disposable batteries dumped in landfills such as by providing a subscription exchange market in which new "smart batteries" (having a radiobeacon and sensor combination in the battery housing with the power cell) are provided for old.

The battery electronics include a local area, low energy transmitter that has enough computing power to control sensors and the tracking device. A ceramic antenna is one option to further conserve space. In some embodiments the sensors include a nine-axis accelerometer, direction, motion and a temperature sensor integrated with the encoder. Embodiments may omit GPS sensing circuitry in the beacon and rely on the GPS circuitry in control devices. Other embodiments may include GPS circuitry. Using one or more programs in a control apparatus, a tracking device can be set to trigger one or more alerts depending upon the distance between the tracking device and the control apparatus and on other contextual data. Many such applications rely on current "Bluetooth standards" and are Bluetooth low energy (BTLE) compliant.

The tracking devices are assigned to an owner-user who may grant privileges to others for using the devices of the owner. The owner-user may also have shared privileges with tracking devices of other users. Tracking devices may be associated in multiple network embodiments. In a local network, a hub communicates with local tracking devices and relays their sensor outputs to a cloud/internet site. Multiple hubs can form a wider area network that allows the hubs to communicate with each other and triangulate the approximate position of each tracking device. In a still wider area network, tracking devices anywhere in the world can be monitored by position, time of day, motion and any other characteristic or parameter sensed by the tracking device.

The embodiments described herein provide program instructions that are installed on a control apparatus and a network server. The computer program enables the control apparatus to detect tracking devices within range of the control apparatus and acquire control of the tracking device unless another control apparatus already controls the device. The control program also allows the user to retain privacy of information collected by a sensor package. Once set to private, only the control apparatus or other designated apparatuses or individuals will have access to data from the tracking device.

Devices, methods and systems are provided. Each device emits an intermittent radio frequency (RF) pulse having a formatted signal. The signal includes a UUID code consisting of a 128-bit word, more than enough to include very, very large numbers of classes of devices, and a major and minor code, each a 16-bit word, enough to encode a specific device identifier for more than 4 billion devices. However, the user does not need to actually handle this information, but instead can program each device by a simple proximity detection technique. Thus the methods and systems of the invention achieve a solution that overcomes the potential complexity of the IoT, enabling the user to simply and conveniently manage a local private cluster and to network the cluster if desired.

The control program allows the user of the user to select at least one alert for a variety of contexts, particularly for example proximity related alerts. In order to trigger the alert, the tracking device broadcasts a radiobeacon signal via its local area, low energy transmitter or transceiver. The relative strength of the beacon signal is proportional to the proximity or "range" between the control apparatus and the controlled tracking device. Relative signal strength is a condition or argument for a distance alert notification, either to indicate close or far. If a control apparatus suddenly receives a beacon signal of a controlled tracking device, the control apparatus may indicate the device has returned to a location proximate the control apparatus. Likewise, failure to detect a beacon signal of a controlled tracking device indicates the device is outside the range of the control apparatus. As currently practiced, the control program provides a feature for selecting a map displaying the remote location of each tracking device controlled by the network or smart device.

The tracking device may carry one or more sensors and each sensor may output one or more signals representative of other conditions monitored by the sensors. Other conditions include and are not limited to motion of the sensor in any direction or in a particular direction; temperature and other signals representative of time, the geographic location of the tracking device or both, motion and other physical, biological or chemical conditions being monitored by sensors. As such, each condition monitored may be associated or paired with any other one or more conditions to provide multiple conditions or "context" that must be met to trigger an alert. Context is provided not only from a combination of data from an individual sensor package, but also from other messages taken in aggregate.

The beacon signal includes the identification information for the tracking device and may include a signal representative of the status of the battery. The monitoring systems of the invention are tools for alerting a user or group of users of a depleted battery condition before the condition becomes critical, such as when a battery-powered device fails or enters an alarm state, for example a smoke alarm or a flashlight in an emergency kit. Because the radio pulses have a range (150 to 300 ft, or about 50 to 100 meters) that is proportioned for a living or working space, a plurality of radiobeacons in the space are termed a local private cluster (LPC). Local private clusters are typically the property of an individual user or group and are used to digitally organize a living or working space, improving efficiency and satisfaction through a "cloud of things" that are owned and operated by an individual or group. Advantageously, the hub, cellphone, or other computing device that receives the radiobeacon message may also include communications functionality for propagating messages from the LPC to a wired or wireless network, such as an internet gateway, a local area network, or a wide area network.

Structurally, the battery and radiobeacon share a common housing and can thus be considered a "battery:beacon combination or device". Surprisingly, newer antennas may be built into integrated devices having centimeter or millimeter dimensions and may be shaped to fit on or around the shell of a battery and even inside the housing. Printed circuit boards are not required to be flat or regularly shaped, and 3D circuit support systems are readily designed to make the most of available space.

Also included in systems of the invention is a network for operating the device(s), for receiving, recognizing and decoding any message(s), and for making assessment(s) and notification(s) based on user preference(s), system operator setting(s), and association(s) having rules-based logic, such as may depend on the truth values for a series of predicates and what we shall call "contextual information" that is often available as the result of message aggregation and trending, higher level functions of the network computing intelligence that makes use of the data supplied in messages from radiobeacons.

The embodiments described herein provide one or more computer programs or "applications" that are installed on compatible "smart devices" and may be updated periodically without the need to obsolete the existing hardware, the application(s) having the capacity to be operated on a compatible computing device so as to receive, recognize and decode messages from the local area radiobeacon or the LPC. Thus the devices may increase in value due to software updates that improve for example the user experience and expand the range of functions the system can handle.

We describe the invention in an initial series of characterizations. A notification system is described as being representative; the notification system comprises a) a low energy radiobeacon transmitter having, (i) a body with housing, said housing enclosing at least one internal power cell, said internal power cell having an anode and a cathode, and electrical poles mounted on said housing, wherein said poles are configured to accept an external load; (ii) a printed circuit board disposed in said housing, said printed circuit board comprising a circuit powered in parallel with said external poles, where said circuit comprises a controller, a non-volatile memory element with instruction set embedded in said memory, a volatile memory element, a clock, a radiobeacon subcircuit, wherein said radiobeacon subcircuit comprises a radio signal generator configured as a local area, low energy radiobeacon configured to generate a low power message containing a unique identifier and at least one accessory data frame; (iii) an antenna operatively connected to said radio signal generator, said antenna for broadcasting said message over a local area; and, b) a radio receiver configured to remotely detect said broadcast message from said local area, low energy radiobeacon transmitter, said radio receiver comprising a control apparatus or computing machine having programmable instructions for associating said broadcast message with said unique identifier, decoding said accessory data frame, and generating a rules-based notification to a user.

In more detail, the local area low power message that is propagated into the system is comprises a unique identifier, at least one accessory message frame, and a proximity, wherein proximity is defined by the proximate location physically associated with said beacon and said radio receiver. The message is broadcast on at least one preset channel in the radio frequency range of 2.4 to 2.5 GHz or 5.1 to 5.8 GHz.

The notification system may also include at least one sensor, often a sensor package is included. The system generally comprises a sensor having a sensor data output, and a subcircuit for inserting a sensor data output into a sensor value frame of said accessory message frame in response to a recurring scheduled task assignment or in response to a trigger.

These notification systems include a variety of sensors and their combinations. Sensors are selected from (a) a motion sensor; (b) a global positioning satellite sensor; (c) an accelerometer sensor, including one, two, or three axis accelerometric package and optional gyroscope and/or compass; (d) a touch switch status or action sensor; (e) a low voltage threshold detection sensor; (f) an overload detection sensor (often a thermal sensor such as fuse); (g) a radio traffic density sensor; (h) a mesh network traffic sensor; and, (i) a combination of two or more of the above.

However, it is to be expressly understood that the Summary and the Drawings are for introduction, illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

The elements, features, steps, and advantages of the invention will be more readily understood upon consideration of the following detailed description of the invention, taken in conjunction with the accompanying drawings, in which presently preferred embodiments of the invention are illustrated by way of example.

BRIEF DESCRIPTION OF THE DRAWINGS

The teachings of the present invention are more readily understood by considering the drawings, in which:

FIG. 6A is a rendering of a modified pen cell having an internal PCB with local area, low-energy beacon and associated antenna.

FIG. 6B is a section view through the pen cell showing a "jelly-roll electrolyte" coiled member (in section) and a part of a loop antenna complex of FIG. 6A mounted on the rightward housing wall (behind and insulated from the electrolyte).

FIG. 6C is a section view of a battery:radiobeacon combination with jacket-mounted patch antenna and rectantenna.

FIG. 10A is another exploded view of a battery:beacon combination of the invention with PCB mounted radio transmitter, memory and programming, and an antenna mounted against a radiolucent battery housing wall. FIG. 10B shows the top plate of the battery with positive and negative poles; FIG. 10C shows the underside of the top plate with positive electrode post and negative electrode strip extending to the anode at the base of the battery.

FIG. 23 is an assembly view of the components of a first adhesive flex patch for use with a pen cell battery and the completed assembly.

FIG. 24 is an assembly view of a second adhesive flex patch for use with a 9V alkaline battery and the completed assembly.

FIG. 28C is a view of a radiojacket in which the battery sleeve is empty. FIG. 28D is a cutaway schematic showing a circuit built into the radiojacket to connect the cathode and anode through a kill switch under control of a radioset and processor. FIG. 28E is an end view of the radiojacket.

FIGS. 29A and 29B illustrate a clip-on radiobeacon containing a battery and a detail view of the cathode interconnect through the kill switch.

Figure 1:
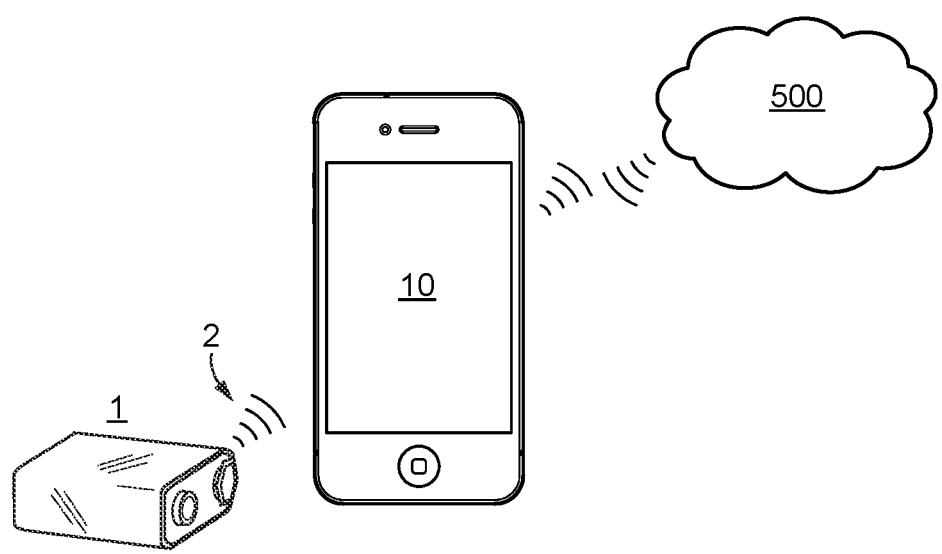
FIG. 1 is simplified view of a battery:beacon combination in communication with the Internet via a "smart device".

The drawing figures are not necessarily to scale. Certain features or components herein may be shown in somewhat schematic form and some details of conventional elements may not be shown in the interest of clarity, explanation, and conciseness. The drawing figures are hereby made part of the specification, written description and teachings disclosed herein. However, it is to be expressly understood that the drawings are for illustration and description only and are not intended as a definition of the limits of the invention.

Glossary

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. Certain meanings are defined here as intended by the inventors, i.e., they are intrinsic meanings. Other words and phrases used herein take their meaning as consistent with usage as would be apparent to one skilled in the relevant arts. The following definitions supplement those set forth elsewhere in this specification.

Unless otherwise defined, all technical and scientific terms used herein have the same meaning as commonly understood by one of ordinary skill in the art to which this invention belongs. In case of conflict, the present specification, including definitions, will control.

"Batteries" or "cells"—include "primary batteries" selected from a zinc/manganese dioxide cell, a Leclanche cell, a zinc/potassium hydroxide cell, an alkaline cell, a zinc/mercuric oxide cell, a cadmium/mercuric oxide cell, a zinc/oxygen cell, an aluminum/air cell, a lithium cell, a lithium/liquid cathode cell, a lithium/solid cathode cell, a lithium/solid electrolyte cell, a lithium-ion cell, a lithium-polymer cell, or a lithium/iron cell. Batteries are also defined by the terms a "secondary" battery and a "rechargeable" battery. Rechargeable batteries may be selected from lead-acid cells, cadmium/nickel cells, a NiCad cell, a hydrogen/nickel oxyhydride cell, a nickel/metal hydride cell, an NiMH cell, a sodium/sulfur cell, a nickel/sodium cell, a magnesium/titanium cell, a magnesium/lithium cell, an alkaline manganese cell, a nickel/zinc cell, an iron/nickel cell, an iron/oxygen cell, an iron/silver cell, or a redox cell more generally. The term battery may also be extended to include a supercapacitor. More detail is supplied at http://www.powerstream.com-/BatteryFAQ.html #ac, accessed in November, 2015.

Figure 16A:
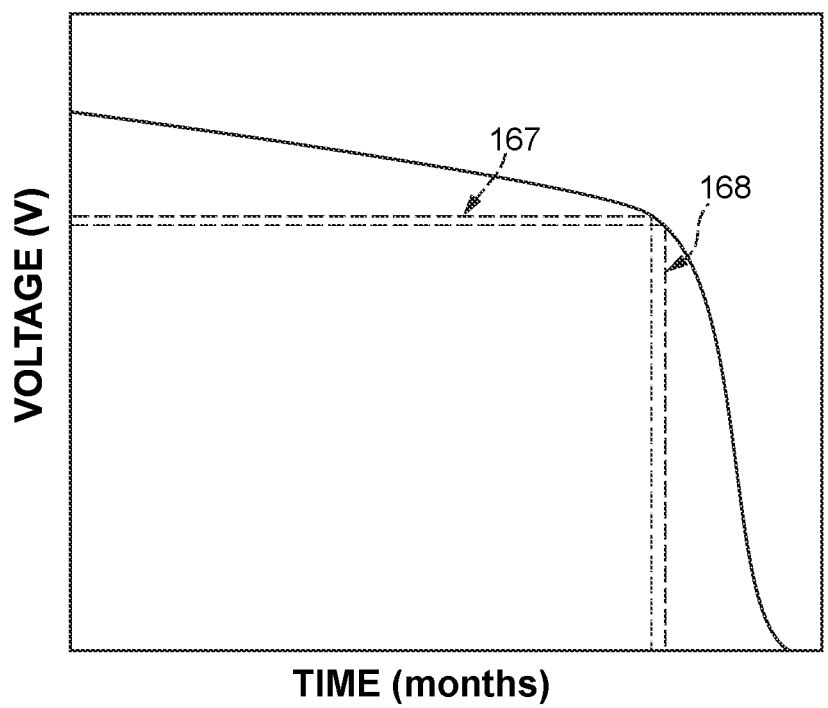
FIG. 16A shows how voltage monitoring can be used to schedule battery changes before the battery cell fails.

"Depleted battery condition"—defines a state of a battery in which voltage has decreased from the nominal voltage as manufactured but not such that no voltage is available for low current draw. Generally a "replace battery" threshold voltage may be defined below which the dropoff in voltage is relatively steep and some electronic devices powered by the battery may become unreliable. A "pre-alarm threshold" may also be defined in which voltage is slightly higher than the "replace battery" threshold but not so high as to be wasteful of battery life (FIG. 16A).

"Radiobeacon"—is understood in this disclosure as a solid-state device having only a transmit radio function, firmware to support pre-defined encoded pulse transmissions, a clock, and generally a voltage sensor or comparator function. The radiobeacons of the invention also include contacts having a form factor configured to make an electrical connection with a battery and are thus each specific to a particular species of battery. The transmission is generally structured as an intermittent pulse, and encodes at least one unique identifier signal associated with each individual beacon and at least one identifier associated with a particular class of beacons, such as radiobeacons associated with a particular function or host system. The number of possible identifiers is dependent on the structure of the pulse. Unique device identifiers may be 32-bit words for example; class identifiers may be UUID signals, for example.

A local private cluster (LPC)—is a cluster of radiobeacons in proximity (at least periodically) to one or more radio receivers having at least a limited capacity to process programmable instructions and to broadcast or display an alert when an emission from a radiobeacon in the cluster is detected. If the radio receiver is mobile, the network may be established when the receiver comes into proximity to a radiobeacon that is emitting a signal. Because the radiobeacon emissions are unidirectional (no on-board receiver is used) and is intermittent (to save power), the LPC is not a network in a conventional sense of the word. In another sense, radiobeacons of a local private cluster communicate with a larger network of computing machines via unidirectional radio pulses and are not radio receivers.

A "hub"—is defined as a computing device having a capacity to detect a pulse emission from a plurality of radiobeacons and is generally positioned in proximity to a local private cluster. The hub may "host" a local private cluster of radiobeacons. The hub includes a radio receiver, a processor, a memory component, and program instructions configured to detect pulse emissions and to activate an alert display or broadcast an alert message when a radiobeacon emission from the local private cluster is detected. Generally the hub has the components of a computing machine and may include wired and wireless communication functions. In this way, LPCs may be shared with multiple users and meta-networks may be joined, such as through an internet gateway, a local area network, or a wide area network.

Broadcasts are termed "messages"—because they preferably include a "data payload" having output from a sensor or sensor package associated with the radiobeacon.

"Cloud host" or "cloud host server"—refers to a cloud-based computing machine having rules based decision authority to make notifications according to a message data payload received from a user. In some instances the cloud host may also cause machines to execute actions based on program rules. In this document, a symbol depicting a cloud and the reference number 500 are metaphors for the Internet itself, for local area networks (LANs), for wide area networks, and for individual sites on the Internet where users may access cloud computing, and store and retrieve programs and data.

"Five by five"—a radio term describing a very good quality of clarity of a radio transmission.

"Local area"—is a term descriptive of radio reception within a range of about 300 ft from a broadcast origin, and indicates a "low energy radio" source, such as a source, as currently practiced, that meets a Bluetooth low energy radiobeacon (BTLE) standard. Bluetooth standard channels are generally in the 2.4 GHz frequency band (2.412-2.472 GHz) and/or the 5 GHz frequency band (5.180-5.825 GHz). WLAN IEEE 802.11b/g, IEEE 802.11a and IEEE 802.11n protocols define radios that are compatible, but other related ISM bands may be used to avoid interferences or overlapping channels if desired by modifying the radiobeacons and receivers accordingly.

By this limitation in range, the local area, low energy (and low power) broadcasts associate themselves with a proximity or "range", wherein proximity is defined by a proximate location, i.e., a distance between said beacon and said radio receiver in which low energy radio communication is effective in conveying a message.

"Computing machine" is used in a broad sense, indicating a machine that accepts information in digital or similar form and manipulates it for a specific result based on a sequence of instructions. The computing machine may include logic circuitry having a processor, programmable memory or firmware, random access memory, and generally one or more ports to I/O devices including one or more of a graphical user interface, a display, a pointer, a keypad, a sensor, imaging circuitry, a radio or wired communications link, and so forth. One or more processors may be integrated into the display, sensor and communications modules of a monitoring system of the invention, and may communicate with other microprocessors or with a network via wireless or wired connections known to those skilled in the art. Processors are generally supported by static (programmable) and dynamic memory, a timing clock or clocks, and digital input and outputs as well as one or more communications protocols. Computing machines are frequently formed into networks, and networks of computers may be referred to here as "a computing machine" In one instance, ad hoc internet networks known in the art as "cloud computing" may be functionally equivalent to a distributed computing machine, for example.

"Cloud computing" relates in this context to any distributed network of computing machines operating cooperatively in some aspect. A cloud symbol in the drawings is a metaphor for the internet itself, for local area networks, for wide area networks and for individual sites on the internet where users may store and retrieve programs and/or data.

A "server" refers to a software engine or a computing machine on which that software engine runs, and provides a service or services to a client software program running on the same computer or on other computers distributed over a network. A client software program typically provides a user interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example.

General connection terms including, but not limited to "connected," "attached," "conjoined," "secured," and "affixed" are not meant to be limiting, such that structures so "associated" may have more than one way of being associated. "Electrically connected" refers to structures having a common or shared current path. "Digitally connected" refers to structures enabled to share digital data, whether by hard wired, electrical, optical, optoelectronic, or wireless means.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation. Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the invention may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure. Aspex Eyewear v Marchon Eyewear 672 F3d 1335, 1349 (Fed Circ 2012). "Configured to", as used here, is taken to indicate is able to, is designed to, and is intended to function in support of the inventive structures as claimed or disclosed.

It should be noted that the terms "may," "can,'" and "might" are used to indicate alternatives and optional features and only should be construed as a limitation if specifically included in the claims to which they pertain. The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a skill, device, apparatus or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

DETAILED DESCRIPTION

Although the following detailed description contains specific details for the purposes of illustration, one of skill in the art will appreciate that many variations and alterations to the following details are within the scope of the claimed invention.

FIG. 1 is simplified view of a first exemplary battery: radiobeacon combination 1 in communication with the Internet via a smart device. Throughout this description, the Internet is depicted as a cloud 500 having a myriad of network connections accessed through wired or wireless portals. In this instance the portal is taken as a smart device 10, such as a cell phone. A beacon signal 2 originates from the battery:beacon combination (shown here in its "standalone" state) that is received by the cell phone. The cell phone hosts programming configured to interpret the beacon signal as a message. Standard beacon communications protocols are used. In this instance, for example, the message contains universally unique identifier (UUID) value assigned by the battery manufacturer to the particular battery:beacon combination device 1. The message may also include a standard major value and a minor value, also termed major and minor frames, and added frames for sensor data, or data may be stuffed (i.e., by "bit overloading") in any of the standard frames as described earlier in co-assigned U.S. Prov. patent. Appl. Ser. No. 62/175,141, titled "Devices And Network Architecture For Improved Beacon Mediated Data Context Sensing", which is incorporated herein by reference for all it teaches. These binary bitstreams are routinely decoded by standard smart devices and may be processed by "applications" executed by the device or may be routed to a cloud server for added processing using contextual clues provided by sensor data in the message or aggregated data from other sources. The sensor data payload may be as simple as a switch position on the battery:beacon combination, or may include proximity information, voltage information, motion information, and so forth, any and all of which serve to provide message context for triggering appropriate processing and execution of commands (such as a notification or display) by remote devices with more intelligence in the network than the radiobeacon alone.

Sensor data may include temperature, light intensity, smoke, voltage, sound, motion, displacement, acceleration, humidity, temperature, pressure, radiation, button-press stimulus event, open switch event, compass direction, proximity, GPS position determinations or raw satellite data, radio traffic density, detection of compatible devices within radio range, or other stimuli or sensor data, for example, and is more generally termed "contextual content", while not limited thereto. According to relationships and permissions established by the receiving device and/or network system, look-up results are processed to configure notifications tied to the contextual content of the broadcast. Notifications to a receiving device and/or system are configured according to contextual data (sensu lato) broadcast by the beacon and known to the system.

Figure 2:
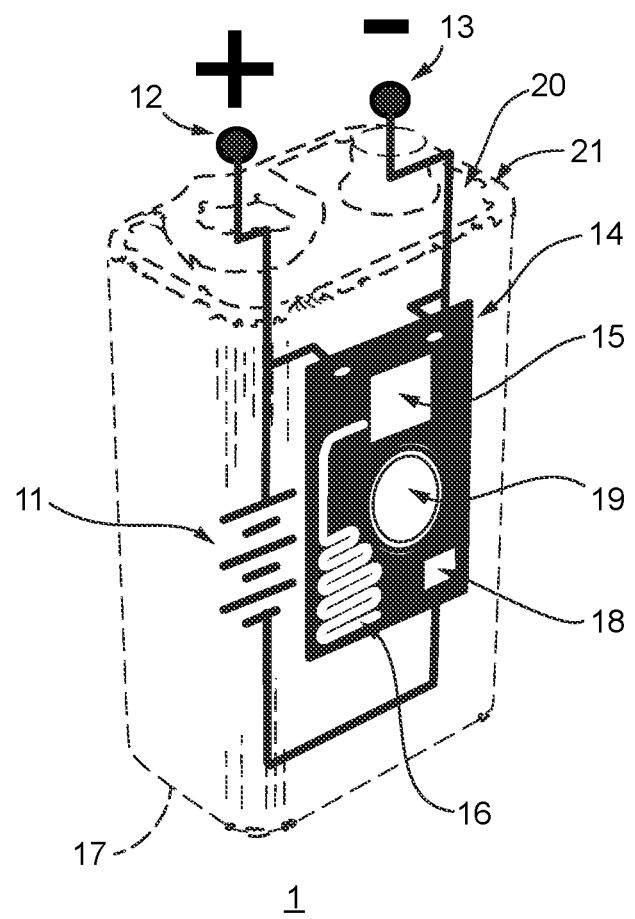
FIG. 2 is a more detailed view of inner workings of an exemplary battery:beacon combination, including a tactile switch. Shown is a PCB with parallel electrical contacts to the battery poles for drawing power, a low-energy radiobeacon chip with RF oscillator circuit, controller and memory, and an antenna on the PCB.

FIG. 2 is a more detailed view of inner workings of a first exemplary battery:beacon combination 1, including a metal-dome tactile switch 19 such as obtained from Molex (Lisle, IL) or a membrane switch. Shown is a PCB 14 with parallel electrical contacts to the conventional battery poles 12, 13 for drawing power 11, a low-energy radiobeacon chip 15 with internal RF oscillator circuit, and an antenna 16 disposed on the PCB. Also included is at least one memory chip 18 for storing data and program instructions and associated hardware for supporting radiobeacon pulse broadcasts at about 2.4 GHz on a standard local area, low energy band have a range greater than 100 ft with this configuration of antenna 16 as tested. The battery cells have a reduced aspect ratio to support insertion of the PCB inside the front face of the battery housing. The battery housing 17 is radiolucent. An outer coating of an elastomer is provided over the touch switch 19 so that it may be operated with finger pressure but remain sealed from moisture. After assembly, the top plate 20 with electrodes 12,13 is inserted so that electrical connections are patent and the device is sealed around the upper rim 21. Batteries of this type have an output of about 500 mAh at a nominal voltage of 9V. Current draw for the radiobeacon is about 5 uA in sleep mode and spikes to 15 mA Peak Power for fractions of a millisecond in "advertising mode" on three channels. Pulse broadcast interval may be varied according to programming resident in the beacon circuit, but for example may be set for one to sixty second intervals to minimize draw. By reducing emission power draw, any loss of range can be compensated by antenna optimization, but for proximity-based sensing and location tracking, a short range is preferable.

The multifunction button 19 initiates setup by pressing the button when a compatible host device (such as smart phone 10) is in radio proximity to the battery:beacon combination 1. The host device 10 is provided with an application and the application is programmed to receive the setup signal when the button is pressed. The host will record the UUID of the sending device. Then, in the future, when the host device receives that UUID again, its identity is recognized and an appropriate notification may be sent to the user. In addition, the smart device application may include instructions to forward the battery UUID and message to a cloud server 500, where added processing may occur. Detailed description of the use of systems of this type in locating or tracking lost items are found in U.S. Non-Provisional patent application Ser. No. 14/967,339 filed 13 Dec. 2015, titled "System Architectures and Methods for Radiobeacon Data Sharing", and US Non-Provisional patent application. Ser. No. 14/301,236 filed 10 Jun. 2014, titled "Tracking Device System", said patent documents being co-assigned and incorporated herein in entirety for all purposes by reference.

Briefly, multifunction button 19 is operable to perform one or more functions according to context and history. The button operates with one or more control programs resident on a host device during setup of alarms, to pair triggers, and if so enabled, to remotely control operations of the host device. In this instance, the device functions with a single-button multi-function interface to control system command response(s) based on rules linked to button press patterns, long, short, duplexed and operated with Boolean statements about other variables, such as time of day, day length, user profile, traffic reports, emergency broadcasts, locations of friends, and weather forecast, for example. On larger batteries, an array of tactile buttons may be installed.

Figure 3A:
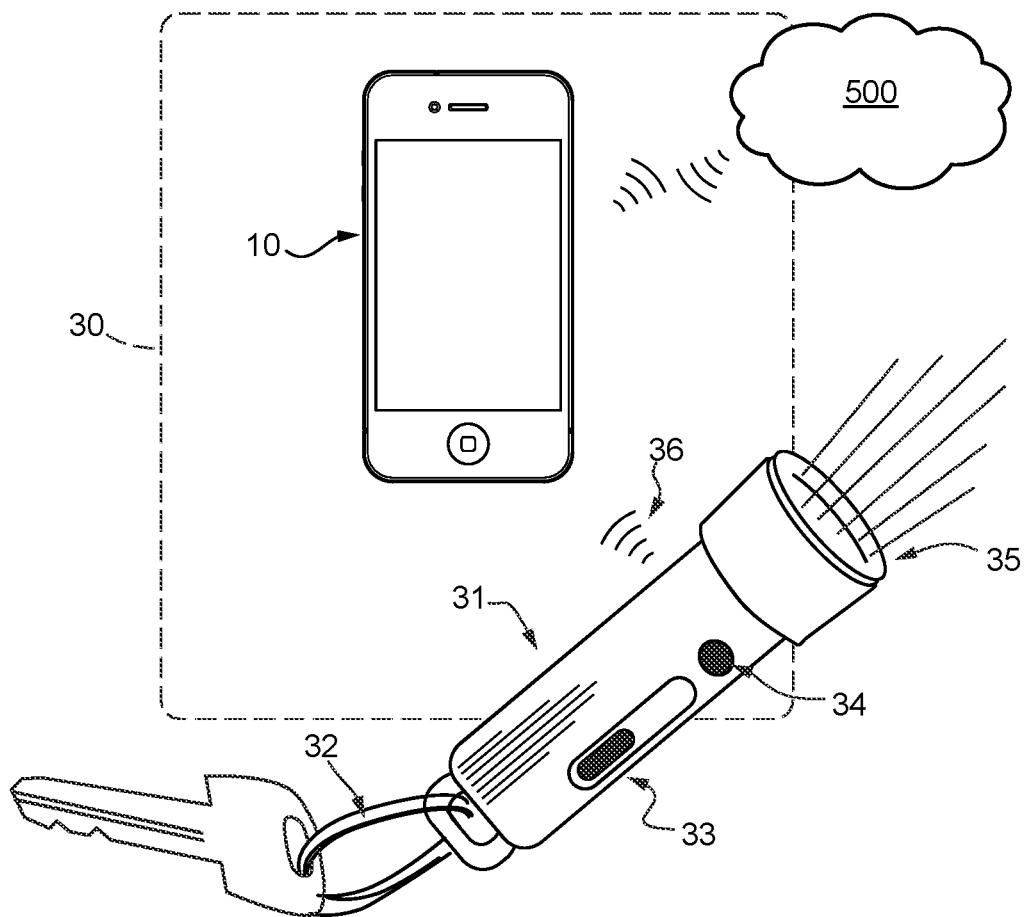
FIG. 3A is a network view of a battery:beacon combination housed in a flashlight (on a keychain) and a system for making an Internet connection through a smart device.

FIG. 3A is a network view of a battery:beacon combination housed in a flashlight (31, on a keychain 32) and a system 30 for making an Internet connection through a smart device 10. The Internet is indicated symbolically by cloud 500. The flashlight includes an ON/OFF switch 33, a button 34 operatively connected to the battery, and a standard LED bulb 35 with lens.

A battery having an integrated radiobeacon is installed inside the flashlight. In use, the battery:beacon combination is enclosed inside the flashlight housing, which is made of plastic so that radio emissions 36 can reach compatible smart devices in proximity. The device is fitted with a local area, low energy radio emitter without radio reception capability and "pairing" is not needed.

A variety of sensors may also be incorporated. Exemplary sensors sense environmental and physical parameters experienced by the beacon, including and not limited to temperature, light intensity, smoke, sound, motion, displacement, acceleration, humidity, pressure, radiation, button-press event, compass direction, or to report daylight levels, traffic levels, noise levels, NOX levels, and unusual noises such as gunshots or sirens, or self-reporting, such as reporting a low battery level, or other stimulus, sensor data, or environmental parameters, without limitation thereto. In some embodiments, a sensor package is built into a core chip, and includes a combined multi-axis motion sensor and temperature sensor. The sensor has an accelerometer, a gyroscope, and a magnetometer for each axis. The information or "sensor data" output by the multi-axis motion sensor enables the receiver (i.e., a host device such as a smartphone) to monitor and track the beacon as it moves from one location to another. The motion of the beacon can be monitored continuously as long as the receiver is close enough to be in wireless contact with a sensor package on board. As an alternative the information may be stored in a memory in the beacon and accessed later, thus the system is operative in cooperation with its software application(s) and its radiobeacon combinations to perform locating, tracking and monitoring of persons or things as described earlier in U.S. Non-Provisional patent application Ser. No. 14/301, 236, filed 10 Jun. 2014, titled "Tracking Device System", which is co-owned, but the radiobeacon is herein disclosed to be built into the battery, for example as represented in FIG. 2.

Another sensor is provided in this example, a battery voltage low threshold sensor, as will be described in more detail with respect to FIGS. 16A and 16B, but also serves to alert the user to replace or recharge a depleted battery. This information is of value for example for use with a flashlight or night-time road hazard display stored in a car. After long storage, the battery or batteries may become drained, and the battery:beacon of the invention is configured to trigger a notification on a viewer's smart device (under control of a suitable software application) such that the user can replace the battery before it is too weak to perform its function. Other applications will be described below, but one skilled in the arts will readily grasp that batteries capable of broadcasting battery status will find use in earthquake kits, camping gear, home use, smoke alarms, and battery-operated tools where interruptions in power are undesirable and advance notice of a low battery status is desirable.

The tactile switch 34 operates with one or more control programs resident on a host device during setup of alarms, to pair triggers, and if so enabled, to remotely control operations of the host device. Those skilled in the art will understand that a host device may be any electronic device with a processor, non-volatile memory for storing program instructions, and generally having wireless functionality, as commonly found in modern smartphones, personal digital assistants, laptops, notebook computers, tablet computers, desktop computers, or any equivalent device that can store and hold programs and data, execute programs, receive and/or transmit information and commands via wired or wireless channels of communication.

Two way radio contact is unnecessary to perform these simple notification functions in a system that is programmed to detect, identify, and decode messages from a battery:beacon combination of the invention. However, where size permits, hardware for two-way radio contact may be adapted for use in these battery:beacon combinations, such as for doing remote flash updates of software such that the device will increase in value as it receives the latest upgrades with added or improved function and reliability, for example as in a battery-to-battery beacon mesh network.

Figure 3B:
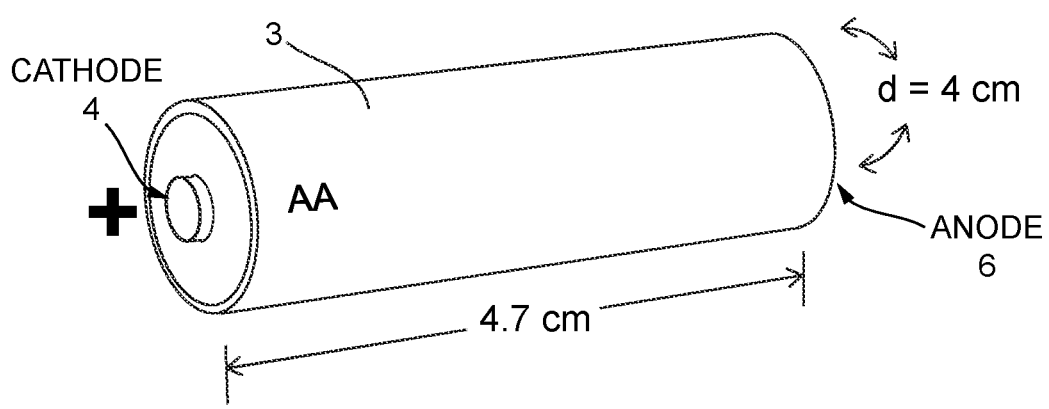
FIG. 3B shows a double-A battery (also termed a "pen cell") of conventional art; indicating the approximate dimensions.

FIG. 3B shows a pen cell 3 of the conventional art, indicating the approximate dimensions. The battery defines two end poles, one a cathode 4 the other an anode 6. This battery lacks a multifunction battery button and also lacks the needed circuitry and antenna for radiotransmission.

Batteries may contain a discharge overload sensor, also termed a "circuit interrupt device" or more sophisticated battery management systems such as a "fuel gauge", any one of which can be incorporated, by following the teachings of this invention, as a sensor such that the sensor output or "status" fed as data into a beacon message for communication to a smart device or a network system having compatible software. "Status" can be as simple as a truth value corresponding to an "open" or "closed" switch, or can be parametric such as a temperature calibrated in degrees. More complex parametric data caches may be related from the sensors using the encoder and radiobeacon of the inventive combinations.

Figure 4:
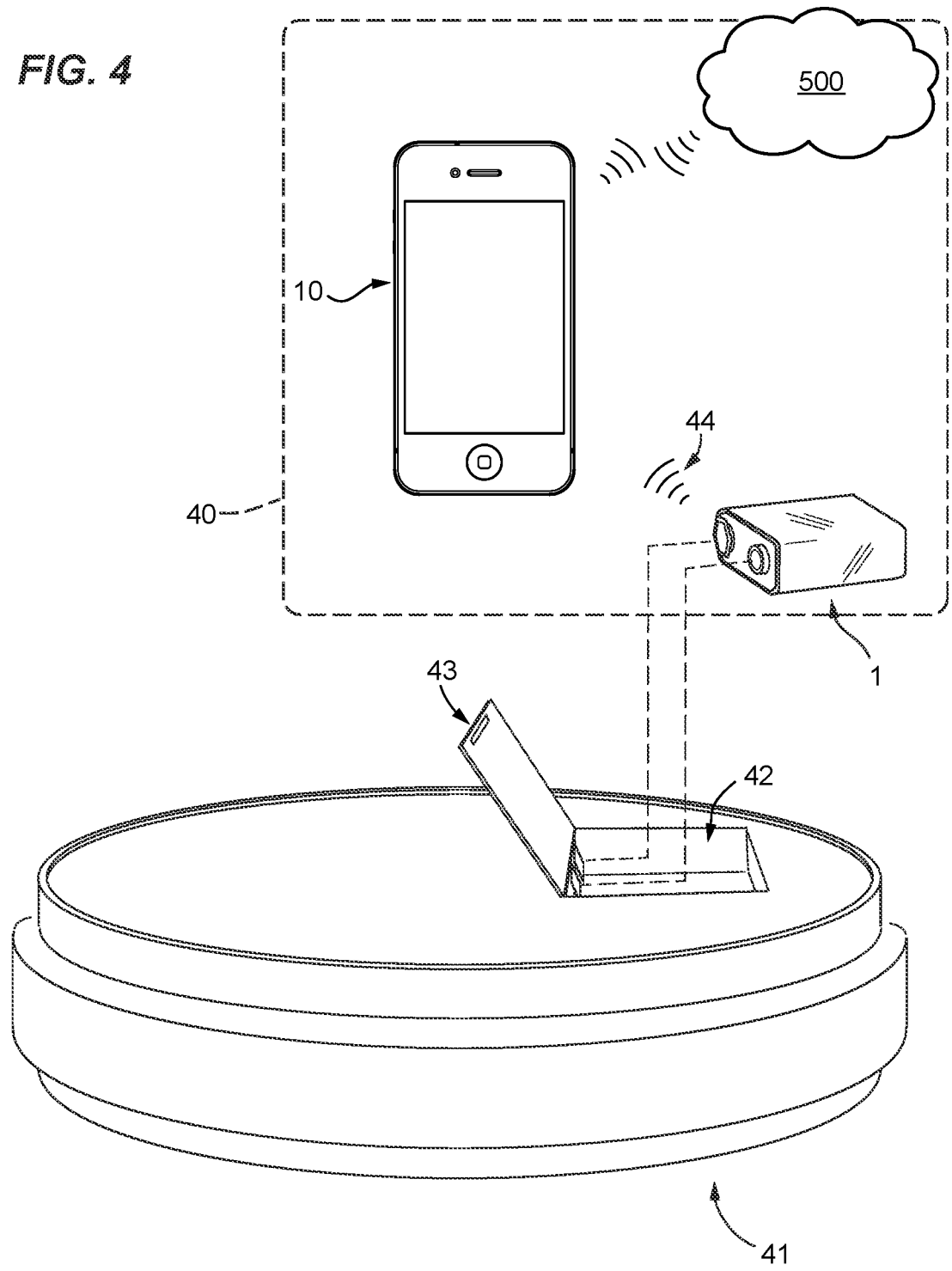
FIG. 4 is a network view of a battery:beacon combination housed in a smoke alarm and a system for making an Internet connection through a smart device.

FIG. 4 is a network view of a battery:beacon combination 1 housed in a smoke alarm in radio communication with a system 40 for making an Internet connection 500 through a smart device 10. The drawing depicts a battery:beacon combination 1 in electrical contact with a smoke alarm 41. The smoke alarm is a conventional device and draws power from the battery; the smoke alarm is shown in an inverted position so that the battery receiving port 42 with hatch 43 is accessible. The on-board battery monitor includes a radiobeacon having a low power antenna and emits short messages 44 when a depleted battery condition is detected.

Miniature circuitry inside the battery, typically an integrated solid state device, is used to periodically monitor voltage or power and to detect a depleted battery condition. The monitoring unit draws power from the battery to send an intermittent radio pulse when actuated.

A smart device 10 is shown for monitoring and detecting the intermittent radio pulse or pulses when in proximity to the battery monitor radiobeacon. The smart device may be a cellphone for example, but is not limited thereto. More generally, the monitoring system is contemplated to use any computing device or network having a compatible radio receiver and programming instructions for acting on a message having an identifier (such as a UUID code) identifiable as assigned to the battery:beacon combination.

Easy to use programming instructions are provided to translate the message into a notification that is made at the convenience of the user. Advantageously, the program is set up to "map" the location of the affected battery (with associated smoke alarm) in a location description provided by the end user, like "kitchen" or "guest bedroom". One of the conveniences of a local private cluster is that the end user will be intimately familiar with the meaning of these locations without the need for more detailed referents, GPS, triangulation, or other complex proximity sensing known in the art. Thus the solution to the problem of monitoring status of a plurality of batteries in a local area is reduced to its minimum elements (battery condition, location in a living or workspace) and the location is graphically presented in a readily accessed notification at such time as the "pre-alarm" battery threshold is crossed. By presenting the user with information that battery failure is imminent, the user may take corrective action before the smoke alarm goes into an alarm state, but the actual "replace battery" alarm circuit and beeper wired into conventional smoke alarms are in no way disabled.

Figure 5A:
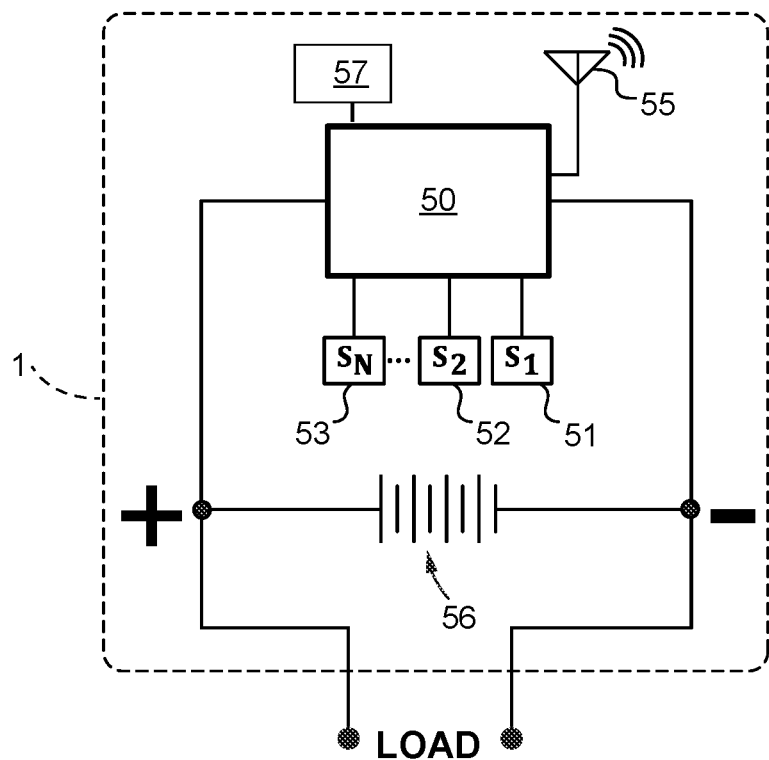
FIG. 5A is a simplified electrical circuit of a battery monitor device.

FIG. 5A is a simplified electrical schematic of a battery:beacon combination 1. Some elements of the circuit may be realized in a solid state chip 50 rather than assembled individually. Here an ASIC having the needed functionalities for making local area, low energy beacon transmissions is used. The transmitter/encoder may be a module, and an antenna 55 on the PCB (or in the battery housing) that produces a time-varying electromagnetic field, i.e., a radio pulse, that may be electromagnetically coupled to a receiver antenna of a mobile computing device, hub, or other computing machine. On-board transmitters are available from a number of integrated device manufacturers and are available as SM devices for use with a suitable antenna.

The radiobeacon circuit takes power from the power cell 56 that is to be monitored and is wired in parallel with the load. The smoke alarm itself is an independent device and is indicated here by the term "LOAD". That would include the smoke detector sensor itself, an LED, a speaker, and alarm circuitry. Within the battery:beacon combination 1, a voltage monitoring circuit may be modularized as indicated here by a series of sensor modules $S_1, S_2 \ldots S_N$, (51,52,53) where $S_1$ may be a low voltage threshold detector, $S_2$ may be a thermal overload detector, and $S_N$ may be tamper sensor, as a Hall Effect device mounted on the hatch 43, for example. Alternatively some of the sensors may be integrated into the chip. For example, by including a GPS sensor, the transmission of the radiobeacon may include point-specific information that can be directed to local fire responders through a cloud server that never sleeps. The chip 50 is set up to encode the sensor data content in a formatted message and to generate a broadcast according to a trigger or to a clock schedule.

Effectors may also be associated with the chip. Actuator 57 may be a device for wirelessly activating a secondary alarm or system, such as for turning on all lights in the house, or for activating an outside speaker so that the alarm condition is broadcast to the neighborhood. Similar circuit schematics are conceived for double-A batteries, where the battery or the host device (such as a flashlight) are equipped with a speaker or an LED, and actuator 57 is enabled to turn on the light or the sound to assist in locating the host device during a search. The LED may be on the body of the flashlight, or the speaker may be in the wall of the flashlight housing, for example, for batteries having host units that are made to be compatible.

This simplified block view includes a local area, low energy core device 50. The core device includes a transmitter for sending radio signals and may also be enabled for sending control signals. Optionally, the core device may be specified to include a transceiver for receiving data and control commands. The core device generally includes a microcontroller, read only memory (ROM) supplied with a programmed instruction set, random access memory (RAM) sufficient to support rudimentary control, or may be provided with firmware sufficient for basic functions. In current practice, integrated devices that support Bluetooth local area, low energy radiobeacon transmission protocols (BTLE) are used.

Figure 5B:
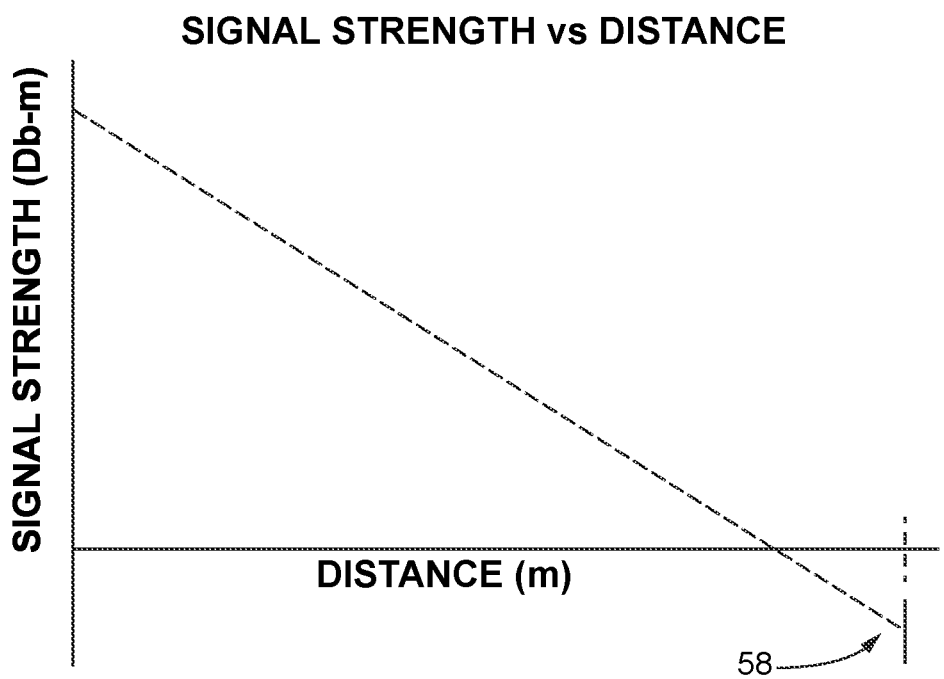
FIG. 5B is a Log plot of signal strength as a function of distance, as may be used for RSSI proximity detection.

The core device 50 is assigned a unique identification code (UUID) and broadcast at periodic intervals is programmed by the developer. The maximum range of the radio broadcast is about 300 feet (~100 m) as presently practiced. Because of the low range, beacons are finding increasing use as proximity sensors. FIG. 5B is a plot of signal strength as a function of distance, as may be used for RSSI proximity detection. A lower limit of detection 58 or maximum distance of effective transmission is shown.

Each beacon radio pulse may have a peak current of about 15-30 milliAmp for a fraction of a millisecond. Current draw can be in the range of 6 microAmp when not pulsing. Each pulse broadcasts an encoded identifier signal, optionally with other data. In advertising mode, three or more separate frequency channels may be used in order to ensure that a receiver will pick up the signal.

"Proximity" or "range" is defined in FIG. 5B, which shows a typical logarithmic attenuation of a radio signal (here in dB-m) as a function of distance. For low-power antennas and radio transmitters operating in the Bluetooth ISM band (either the 2.4-2.5 or the 5.0 to 5.4 GHz bands), this distance is measured in a few meters to tens of meters, and is generally less than 300 ft depending on the power, the antenna, and any intervening structures. Power loss is proportionate to $(\lambda/d)n$, where d is distance. Thus the hardware establishes a local private cluster without the need for bidirectional network communication capability involving a complicated bidirectional "handshake" or "pairing". Any networking capability is resident downstream in the network, including computers, tablets, hubs, cellphones, and various computing means known in the art. This simple arrangement ensures that smoke alarms may be retrofitted with an intelligent monitoring capacity without the need to obsolete the existing equipment and without large expense or inconvenience in setting up bidirectional networks.

The Bluetooth pulse emission is in the open, and can be picked up by any proximate receiver tuned to the correct frequency and band. As currently practiced, the emission power and antennae of the battery:beacons of the invention are configured to permit transmissions of more than 150 feet, up to about 300 feet (~100 m), outdoors, and through walls within a building, as appropriate for networking local clusters or tracking by proximity. Thus the current draw required for battery:beacon monitoring is a negligible part of the total current stored in the battery and does not contribute to a reduction in the battery life.

Using existing radiobeacon technology, very large local clusters may be constructed. Each radiobeacon has a dedicated identity. The current pulse emission standard allows for a UUID signal differentially encoding 4,294,967,296 individual device nodes. Thus a local cluster may be have many independent devices and can satisfy the needs of an individual, institution or group having a common household, office or workspace. Groups having multiple living or work spaces may build multiple "local private clusters" (LPCs) without exhausting the pool of unique identifiers needed to avoid confusion, as when operating a single program application in multiple environments. The need for more complex address data, such as IPv6, is entirely avoided by using simple unidirectional transmissions each uniquely identifying one of a plurality of radiobeacon identifiers in a local area.

In more detail, the Bluetooth communications protocol is as follows: In the most simple form, a radiobeacon is a local area, low energy device emitting an "advertisement mode message" following a strict format, that being an Apple defined "iBeacon" prefix, followed by a variable UUID, and a major and minor value. The UUID is characteristic of the genus or class of radiobeacons defined by the manufacturer, the paired frames of the major and minor value may be used to differentiate individual radiobeacons and thus may be associated with a location. In a unidirectional cluster, the user sets up a listening device and associates the individual major and minor signal code of each radiobeacon with a particular location in a local private cluster. The UUID is typically a 128-bit word. Major and minor identifiers are each 16-bit words as currently defined.

Compatible listening devices are programmed to listen for a UUID broadcast by a compatible radiobeacon. iOS devices with Bluetooth, smart devices more generally, and for example Android systems, may receive transmissions of this type and may be programmed to process the radiobeacon signals according to an application supplied with the radiobeacons or as part of a local private cluster kit that includes a hub for example and a plurality of radiobeacons. The radiobeacons signal smart devices passing through their effective radio range and may trigger a smart device action, depending on programming in the smart device. For example, the user will be referred to a cloud server and offered content special to their profile. The hub may also detect beacon emissions from the mobile smart devices and may modify the outgoing message accordingly.

Another encoded identifier is a near field communications device configured for receiving unidirectional pulse emissions from a radiobeacon on a compatible frequency, where details of the technology may be derived by study of US Pat. Publ. No. 2014/0304094 to Apple and related publications. The technical details of these publication and all references therein are hereby incorporated in full for all purposes by reference.

RFID and wireless systems may also be adapted for use in the systems of the invention provided adjustments are made to accommodate these older technologies to a unidirectional active RF pulse transmission of a radiobeacon. The technical details of AU Pat. Doc. Publ. No. 2012/101222, titled "Radio Frequency Identification (RFID) beacon including controllable signal direction and range" are hereby incorporated in full for guidance and for all other purposes by reference.

FIG. 6A is a rendering of a modified double-A battery 60 having a bluetoothed low-energy beacon (internal) and an associated antenna 61 sealed under a radiolucent "jacket" or cover 62. This is shown in a modified see-through view in FIG. 6B. Visible are the walls 62 of the cell, a top cathode plate 63, with gasket 64 separating the cathode from the anode 65, and an interior filled with "jelly-roll" electrolytic layers 66 coiled as a cylinder. In this view, a rigid plastic housing serves as a wall around the entire electrolyte complex. A metal plate forms the bottom 72 anodic connector of the cell and is connected to the jelly roll by a central spindle pin. A conductive strip 67a runs up the side of the housing to connect the PCB 68 to the anode. Antenna 61 is outside the wall and under the cover layer 62.

The antenna is on the outside of the jelly-roll (shown here behind and insulated from the electrolyte) and is insulated by a rigid plastic layer. An added radiolucent outside layer forms the exterior of the battery housing. A metal cathode (+, 63) and an anode (−, 67) are also marked. Electrical connections are as known in the art, with PCB 68 being connected in parallel across the battery cell. Also shown is a chip 50a indicative of the local area, low energy radio transmitter/encoder and associated memory functions (see FIG. 5A, 50). The transmitter is in electrical connection with antenna 61.

In 2016, almost 3 billion double-A cells were produced; most with a capacity of 2.8 Ah to 3.1 Ah. It is thought that the energy density will grow to 3.4 Ah by 2017, offering the lowest cost per Wh in spite of the cylindrical design. The higher energy density of the cylindrical cell compensates for its less ideal stacking characteristics. The empty space can be used for cooling to improve thermal management and the cylindrical housing has good mechanical stability and resists deformation. These cells are expected to be in use long into the future, and thus engineering of a smart battery having an embedded radiobeacon makes good sense.

By adding a beacon function to the basic battery, several advantages arise. First, as already indicated, the battery can report on its condition. Secondly, the battery can help a user find it; the signal increases in strength as the user approaches, and will appear to weaken if it is moving away. If the battery is installed in a camera or radio for example, these "location and tracking" features are unchanged. Also, many of these batteries are rechargeable or can be recycled. The beacon function substantially enhances the value of what would otherwise be a disposable commodity; thus the user is motivated to engage suppliers in a subscription service offering "new batteries for old". In addition, those batteries that end up in the trash, unless entirely dead, can be located by their distinctive beacon ping, and can be extracted from the paramagnetic fraction using sieving, density sorting and a pick line. Thus the supply of rare earths and lithium in the battery waste stream can be substantially reduced. Users who elect to exchange their batteries will benefit from receiving new batteries having the latest upgrades in energy management technology and smart sensing.

While the batteries are intended to reduce the quantity of batteries that end up in municipal waste streams, by building a bluetoothed radiobeacon into each battery that is sold, with an antenna as a layer in or outside the housing and covered by a radiolucent, wear-resistant jacket, the invention is poised to make a significant contribution to a sustainable future at a minimal cost, perhaps 0.25 cents per battery. Municipal waste processor equipment may be outfitted with a radiobeacon signal detector, and can direct sieving operations to recover the battery fraction from mixed waste. Further recycling can then be done in a secondary sort, so that batteries of particular types are distinguished by their UUID or by information in a major or minor frame of the transmission. Because bluetoothed broadcasts are low energy and the battery can be supplied with a supercapacitor that stores a residual energy supply, the radiobeacon circuits of the invention can wake up when interrogated and begin to broadcast a distinctive ping for several hours, even if the electrochemical cell is fully exhausted. Advantageously, by layering the antenna in the housing wall (i.e., in the external skin of the battery where the signal strength is best), valuable copper is relatively easily separated from the electrochemical cells in the body of the battery.

The following figures are relevant in assessing battery recycling. The annual world market for batteries is approaching $50B US. LiION batteries make up about $20B of this total, followed by NiMH and NiCd battery types. At current market value, LiCoO metal in the batteries has a value of $25,000 per ton and Nickel more than $15,000 per ton according to a web link accessible at batteryuniversity.com/learn/article/battery_recycling_as_a_business. The single unsolved problem in profitably recycling these batteries is the difficulty of the sorting process, both as relates to recovery from mixed trash, and as to separation of batteries by their respective chemistries. By providing a cheap radio transmitter in each battery that broadcasts a simple identifier, the solution to both problems becomes fully automated. But more importantly, the value of the battery to the consumer vastly increases with little or no increase in cost, ensuring that consumers will find new uses for rechargeable smart batteries long after their original cost has been recovered, and hence are less likely to discard them.

Ultimately, by using an RF energy harvester built into the skin of the batteries of the invention, many batteries will find use in radio-noisy environments where they may be perpetually recharged, or so it will seem over years of function. A sketch of such a battery is shown schematically in FIG. 6C.

The view of FIG. 6C is a schematic in midplane section through a pen cell battery 600 with anode 602 and cathode 604. The core electrochemical cells of the battery are not shown, but include an electrical connection to the anode and a parallel electrical circuit for powering a processor and logic circuitry (suggested here as a PCB, 606) mounted under the cathode. This circuit may include battery monitoring sensors as described below. While not shown, the PCB will also include a radiobeacon. And in this case, a supercapacitor 608 is mounted below the PCB to provide reserve energy when activated during a recycling operation. Also supplied is a vent 610 and provision for cooling and expansion. The housing includes a rigid shell with chassis (not shown) generally of a stiff plastic. Several components are layered onto the shell, either on the inside or the outside wall of the shell. A radiolucent jacket 612 is applied over the shell and any external components as an insulator and sealant that resists wear and abrasion.

The wall structure is unique in that functional layers are included. Shown here is a slot patch antenna with microstrip driver 620 and dielectric ground 616. The microstrip inductively drives a surface electromagnetic wave in the overlying patch plate to generate a radio pulse that emanates out from the wall. Patch plates may be arrayed as needed on rounded surfaces and may be miniaturized by techniques known in the art such as use of fractal patterns. The microstrip driver is connected electrically to a radiosignal generator on the PCB 606. The ground 616 is also connected to the PCB. The patch plate is mounted in spacer material under the radiolucent jacket.

In this embodiment, the battery also includes a rectantenna used to harvest RF energy from the environment around the battery. The rectantenna may be part of a circuit, termed here a "rectenna" 624 that rectifies alternating current flow in the rectantenna, steps up the voltage, and delivers DC power to recharge the battery from any waste oscillating electromagnetic fields in the vicinity. By placing the battery in proximity to household AC lines, for example, the battery has the potential to operate long past its nominal charge capacity. Similar capacity to harvest RF energy exists in many public places and near power transmission lines. Thus these batteries are inexpensive but quite valuable in minimizing carbon footprint while delivering on the promise of the IoT.

However, some batteries may be discarded by mistake or by habit during the transition to a sustainable future. The same features that make the battery valuable to the consumer also permit automated battery recovery from trash. To identify the battery in a waste stream, the patch antenna layered in the outside wall of the battery housing can be driven by a signal generator under control of the core processor, and power is generally provided by the electrochemical battery, but for use in trash recovery, a supercapacitor 608 may be provided next to the radio signal generator of the battery, and the supercapacitor is activated (connected in parallel across the radio signal generator) to supply a beacon broadcast "ping" when the processor receives a specific command from trash processor equipment. The distinctive beacon ping can be used to direct a magnetic claw to the site of the battery. The battery may be provided with a paramagnetic chassis or cap so as to be magnetically extracted from the trash stream. Use of the supercapacitor as a reserve energy supply ensures that the battery can be recovered even if the electrochemical cell is completely depleted.

Figure 7:
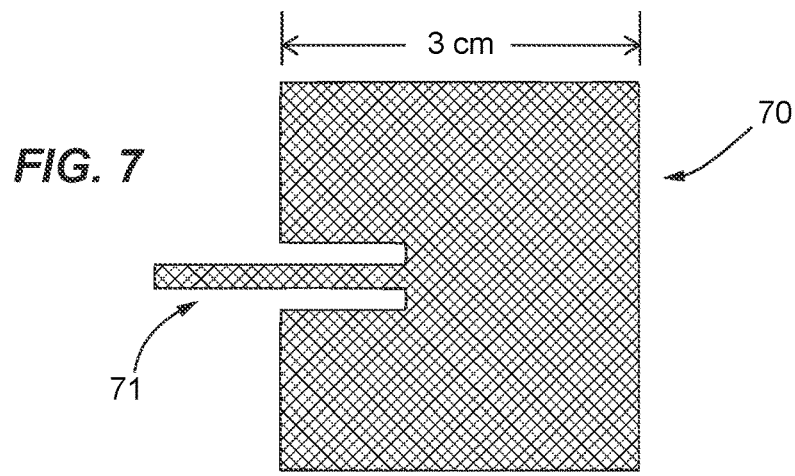
FIG. 7 is a view of a quarter wave fractal patch microstrip antenna sized to operate in the 2.4 to 2.483 GHz range.

FIG. 7 is a view of a quarter-wave "fractal patch" "microstrip" antenna 70 sized to operate in the 2.4 to 2.483 GHz range. The patch antenna or a patch array may be configured to wrap around the battery housing, either with a double-A pen cell or a box-shaped 9V battery form factor, under a radiolucent exterior layer. The microstrip 71 is low noise, and is connected to the radio pulse generator (or receiver). While not shown in detail, these antennae benefit by breaking the conductive surface into a fractal pattern for greater efficiency. A substantial body of antenna engineering has developed to aid in their design. Surprisingly, the capacity to transmit when wrapped around a pen cell is not a problem. The diameter of a double-A cell is only a little more than a centimeter, and a 3 cm patch antenna takes up almost the entire circumference when conforming to the cylindrical wall of the housing. In some instances these can be printed in place in layers. Three layers are required, the patch layer, ground layer, and dielectric substrate layer that separates the patch and ground. An inset microstrip or stripline feed carries the signal to the patch layer and the generated EMF oscillates in fundamental mode between the two plates. A complementary split-ring slot resonator (CSRSR) and an interdigitated capacitor may be inserted in the microstrip patch construct. Slot patch antennas designed to operate at the preferred Bluetooth 2.4 GHz frequency are known in the art and have been reduced to the size of a sidepanel of a 9V battery. Fractal designs are known to result in even more compact antenna configurations.

Figure 8:
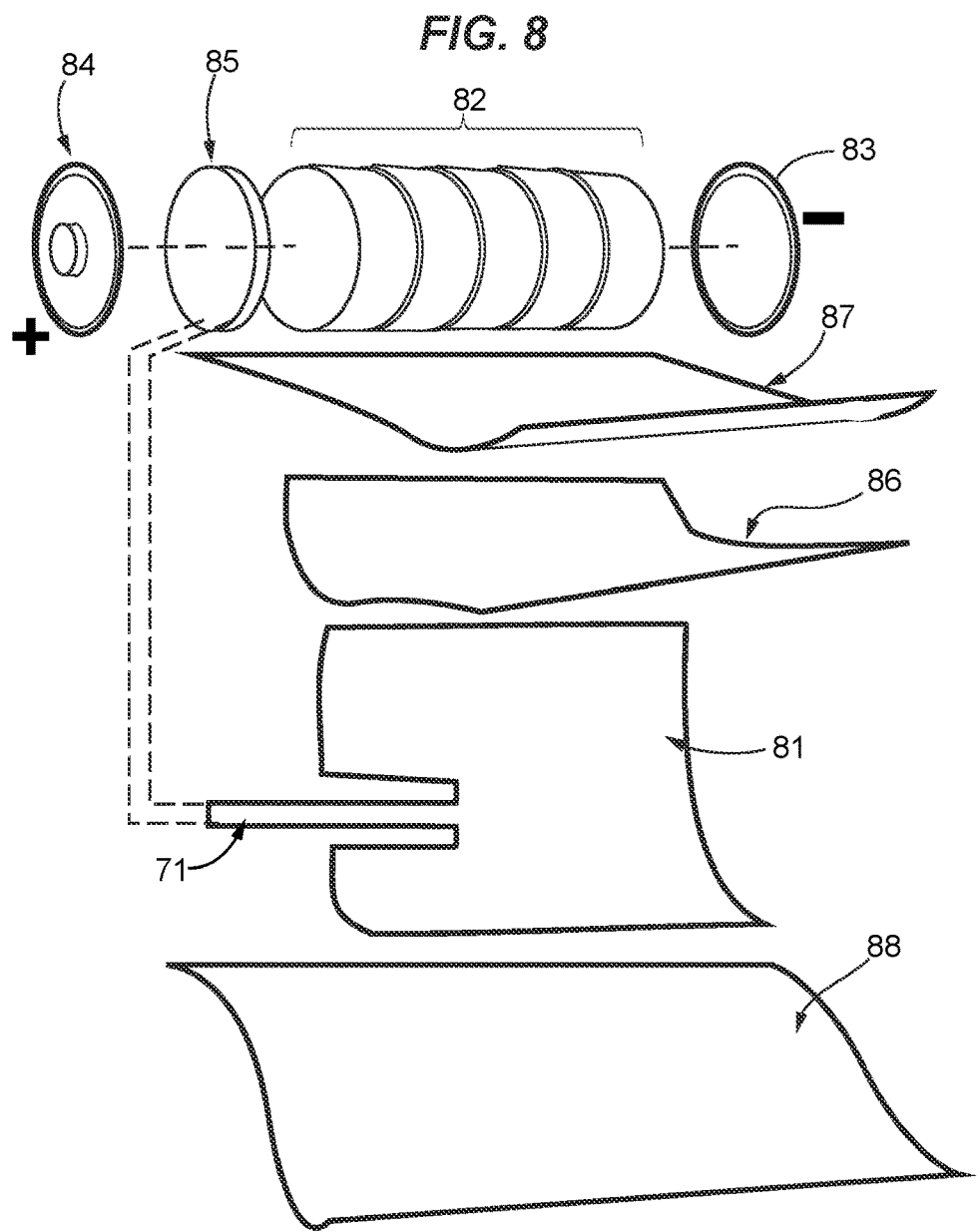
FIG. 8 shows the elements of a radiobeacon combination with microstrip patch antenna as assembled.

FIG. 8 shows assembly of a battery:beacon combination 80 with patch layer 81 with microstrip lead 71. The structure includes a core of coin cells 81 in contact with an anode 83 at the bottom and a cathode 84 at the top. A PCB 85 containing the required radiobeacon and any battery management circuitry is mounted under the cathode and attaches to the microstrip lead 71. The patch antenna consists of the patch layer 81 combined with dielectric layer 86 and ground layer 87. The antenna is electrically connected to the pulse generator of the radiobeacon, having on-board circuitry for generating a programmable radio beacon pulse under control of an encoder and processor on the PCB. Because the radiobeacon is wired in parallel, radio pulses may continue to be sent even when the positive and negative poles of the battery are not part of a closed circuit. The microstrip is attached to the pulse generator of the circuit board before sealing the battery housing. A radiolucent protective coat 88 may then be applied over the patch layer of the antenna.

Figure 9A:
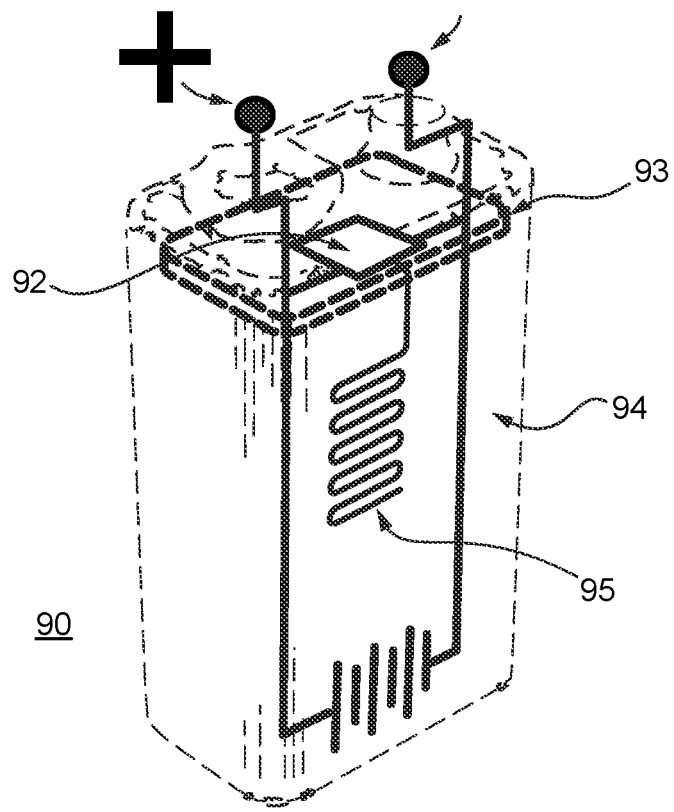
FIGS. 9A and 9B extend the concepts to 9 Volt disposable and rechargeable batteries. Two antenna configurations are shown.
Figure 9B:
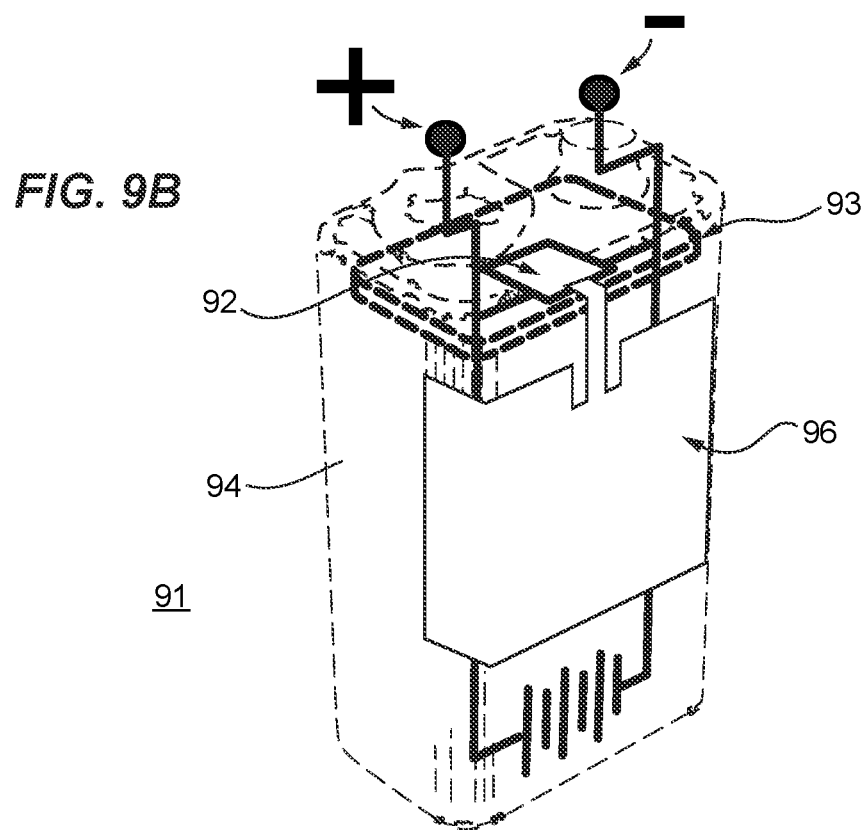

FIGS. 9A and 9B extend the concept of a battery:beacon combination 90,91 to 9V disposable and rechargeable batteries that are typical sold in a box-shaped housing with positive and negative poles (+,−) on top. In preferred embodiments, the radiobeacon and battery management functions are integrated in a single chip or ASIC on a single PCB 93 with supporting circuitry and sensors. An antenna is connected to the circuit, but is generally positioned so as to avoid the metallic parts of the battery and as shown here is disposed on the front wall of a plastic housing 94.

In FIG. 9A, a simple folded antenna 95 is used having a length of about 3 cm. Lengths of up to 6 cm are readily configured within the form factor of a 9V battery housing, corresponding to a half-wavelength antenna for standard 2+ GHz Bluetooth emissions and a one-wavelength antenna for the sister 5+ GHz Bluetooth band. In FIG. 9B, a quarter wave microstrip patch antenna 96 is used. Both antennae are enclosed within a radiolucent housing.

In a preferred embodiment, the antenna is sized for emission in the 2.4 to 2.483 GHz range. Antenna size may be calculated as $\lambda/4$ for a first cut. A loop antenna is shown for illustration, but the invention is not limited thereto. Alternative antenna configurations include dipole antennae, loop antennae, and ceramic antenna, which are sometimes chosen for their compactness. A typical ceramic antenna may take up only 20% of the space occupied by a loop antenna. These antennas have unique properties and are available in requisite dimensions of 1-2 mm. Dielectric resonant antenna materials having suitable dielectric permittivity produce radio emissions when excited by a monopole feed strip or other oscillator. They have found use as on-board micro-antennas if sufficiently insulated from proximate paramagnetic surfaces. Further details about the technology are found for example in non-patent literature such as an article titled "Dielectric Materials for Compact Dielectric Resonator Antenna Applications" as accessed on the internet on 12 Mar. 2015 and incorporated herein in full by reference.

FIG. 10A is an exploded view of a battery:beacon combination 100 of the invention with PCB mounted radio transmitter 101, memory and programming, and an antenna mounted on a radiolucent battery housing wall. A stack of power cells 103 forms the core of the battery. Also shown is a separate battery management PCB 104. Typically the uppermost PCB is configured to support a fuse that prevents battery overload but may also include battery management and circuit interrupt functions. Unlike ordinary fuses, these polymeric devices typical regain conductance when they cool. Most lithium and nickel-based cylindrical cells include a positive thermal coefficient (PTC) switch. When exposed to excessive current, the normally conductive polymer heats up and becomes resistive, acting as short circuit protection. Once the short is removed, the PTC cools down and returns to conductive state. Battery fuel gauge circuits are also used. With miniaturized circuitry, the battery management functions and the radiobeacon function may be integrated onto a single PCB (or other circuit supporting member).

The battery stack is capped at the top with a insulative plate 107 configured to support the cathode and anode (+,−) and sealed at the bottom with an insulative plate 105a that may be part of the housing or may be a conductive material linked to a conductive strip 105b that joins the voltaic stack 103 to the anodic pole on top (and completes the parallel circuits running through the PCBs). Because the battery cells (appearing here like a pile of bricks) are typically housed in conductive metal sheaths, the cathode must connect, directly or indirectly, to the uppermost surface of the voltaic pile. The cathode (+) is shown here with an electrically conductive post 106 extending through a pair of PCBs to the top of the voltaic pile.

FIG. 10B shows the top plate of the battery with positive 108 and negative 109 poles; FIG. 10C shows the underside of the top plate with positive electrode post 106, insulative plate 107, and negative electrode strip 105b that forms a connection to the anode at the base of the voltaic pile 103.

Returning to FIG. 10A, dashed lines indicate how the voltaic pile and associated PCBs and antenna are inserted into a plastic housing 105. A wall of the housing is turned down to demonstrate the insertion more clearly. The housing is generally of a rigid but radiolucent material and may have reinforcing ribs and thickness to meet mechanical requirements for routine use.

Figure 11:
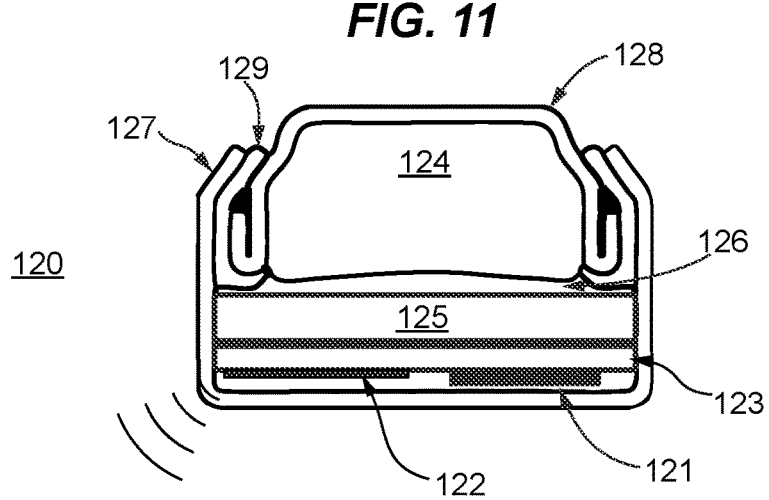
FIG. 11 is a "coin cell" in section view, showing internal mounting of a radiobeacon and antenna with programmable controller and memory in an ASIC-type integrated circuit.

FIG. 11 is a "coin cell" 120 in section view, showing internal mounting of a radiobeacon chip 121 and antenna 122 with programmable controller and memory in an ASIC-type integrated circuit on a PCB 123. These circuits may be potted with a black epoxy if desired to prevent copying. The batteries contain a zinc anode 124 and a solid electrolyte cathode 125 separated by a solid electrolyte barrier 126. The electroactive compounds are housed in a cathode can 127 and sealed by an anode can 128 with a insulating gasket 129 between the two so that a circuit is formed only when a load is attached between the anode and the cathode. But the PCB is linked to the power supply in parallel and for a small current draw, can make intermittent radio broadcasts on a local area, low energy band. Also included is an antenna. The device emits regular digital radio pulses that include a UUID, and optionally other frames, preferably at least some sensor data.

Another type of cell is the "prismatic cell" which is layered in a chocolate bar shaped can, having aluminum cans around individually layered electrolytic cells, with capacities of 20-30 Ah, such as for electric vehicles. Smaller versions are seen in cell phones and tablets. Any of these may benefit from an on-board radio beacon as described above.

Figure 12A:
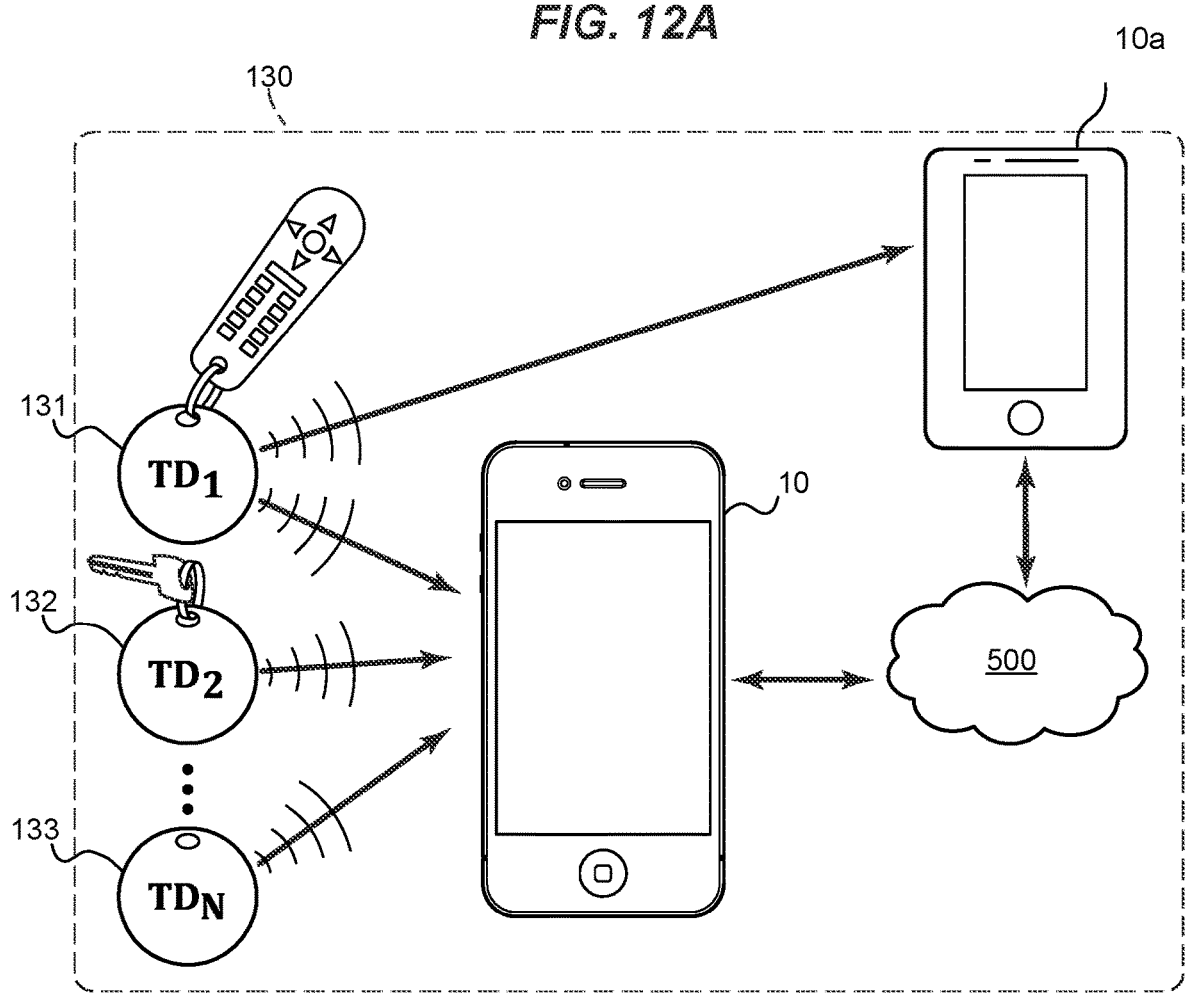
FIG. 12A is a network view of a battery:beacon combination as part of a system for linking tracking devices (each containing a coin-cell battery:beacon combination) with a smart device in communication with the Internet and with other smart devices.
Figure 12B:
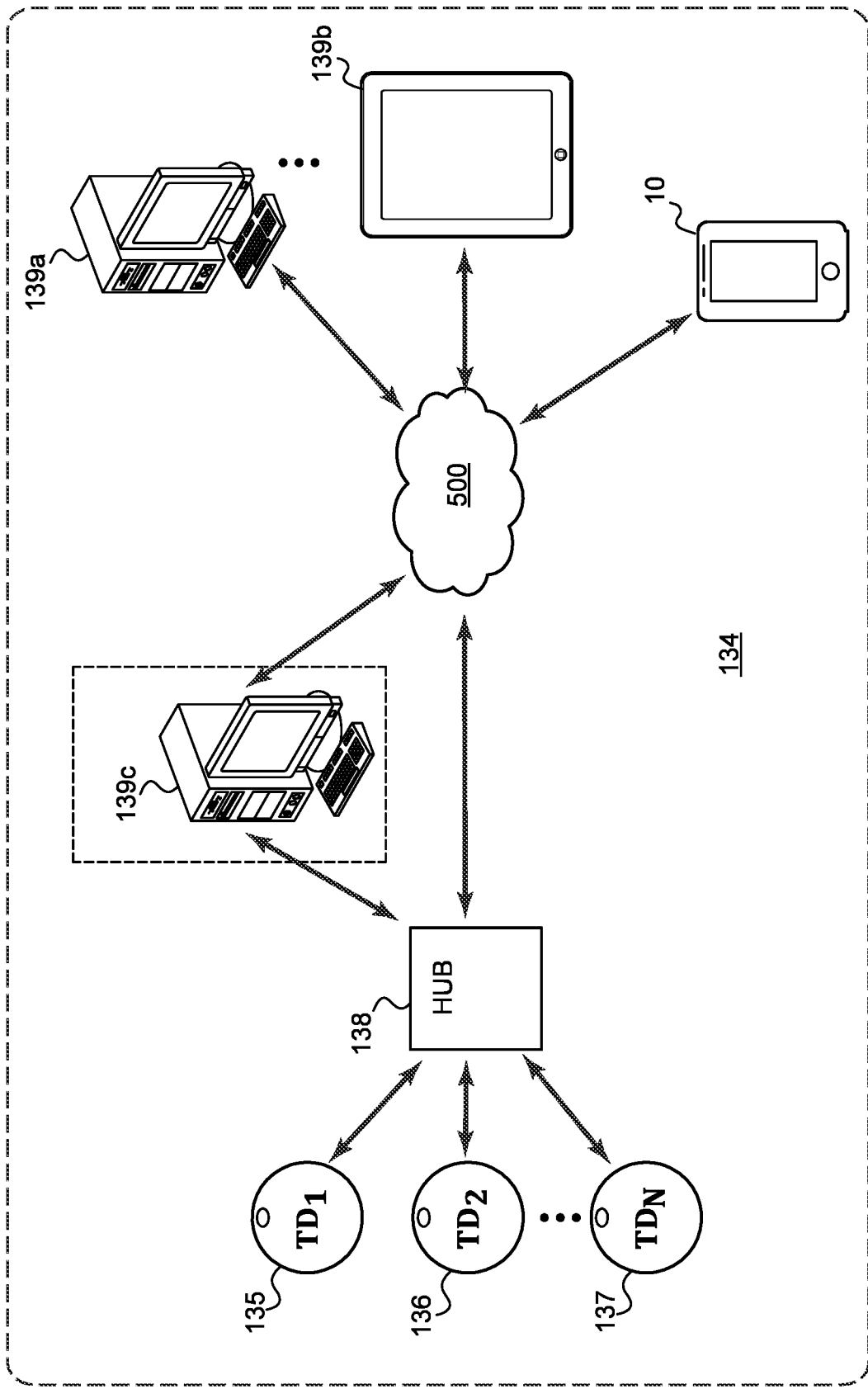
FIG. 12B is a network view of a battery:beacon combination as part of a system for linking tracking devices (each containing a coin-cell battery:beacon combination) with a local hub for transmitting data to a personal computer or directly to the cloud, where it can be shared with remote computing devices.

FIGS. 12A and 12B are network views of a battery:beacon combination as part of a system for linking tracking devices ($TD_1$, $TD_2$, $TD_3$) with a smart device 10 in communication with the Internet 500 and with other smart devices 10a. In FIG. 12A, the radiobeacons are part of coin cells powering the tracking devices 131,132,133, which are each linked to keychains or other similar personal possessions, the details of which are not important, and are intended to assist users in keeping track of their possessions and locating them when needed. Similarly, tracking device 133 could be inserted in a wallet, or pinned to a child's belt. The possibilities are not limited.

These tracking devices have a large range of uses. Sensor networks may also be formed from tracking devices having battery:beacons of the invention, and may be used to report environmental information, motion, and so forth, so that when linked into larger networks, may form an earthquake warning system, for example, or alert users to a traffic jam ahead, or help locate a missing child or pet, and could be detected by an Amber Alert system for example.

Users begin by establishing a direct association between a deployment of three beacons TD1, TD2, TD3 (131,132, 133) and a host device, here a first smartphone 10. Any network alerts are conveyed to the cloud 500 from the smartphone, or may be shared with a second smartphone 10a of a friend. In this system or network 130, each beacon is paired with the host device 10 of an owner. While a smartphone is shown, the host device may be a computer, a tablet, or other personal computing device. The host device has a transceiver for establishing a wireless connection to the cloud 500, representing here a portal to the Internet. The host device 10 may create one or more alerts (also termed "notifications") based on the relative location of the host device, the beacons, and any sensor data (including input "stimuli" generally) received from the beacons. For example, this system 130 may be tasked to find a lost object having an associated beacon, to set an alert for when an object, pet, or person bearing a beacon moves into or out of one or more predetermined proximity ranges, and to pair alerts with locations or motions of the beacons 131,132,133 in this simple deployment. The owner-user may share information transmitted by the beacons with others, and may control or share control the beacons. Accordingly, in another user with a second host device 10a may be given permission to use the same beacons to establish alerts on the second host device that are different from or shared with those alerts created by the first user on host device 10.

The system 130 may remind a user to take along needed personal items before leaving a current location. Beacons would be attached to a key ring, a laptop or tablet computer, a briefcase, a purse, a wallet, a suitcase, a backpack, or other personal items. The user will carry the tracked items during travel. If the user departs a location and forgets one of the tracked items, an alert will sound on a host device 10 alerting the owner not to leave without it. Such alerts may be paired to specific locations (i.e., are context sensitive) so that they are only triggered when and where the user wants.

Inertial sensors may be included to refine the alerts. If all personal items in a cluster are moving in the same direction with the same inertial velocity as the user, then reasonably the user is carrying them. But if one item is stationary, or is moving in another direction, the user is quickly alerted to backtrack and find the lost item.

The core device (chip 50) of each battery:beacon has a clock or is electronically connected to a clock. The beacon signal in any signal from a sensor in the beacon may be tagged with time sent. The clock may also be used to extend the life of the battery. If battery voltage is sensed as low, the beacon may be put in power saving mode, including a command to power up when the user begins moving or an ambient light is detected. Thus sensor data can serve in making contextually relevant notifications to a user. Here the user's device and beacon constellation power up and fire off an alert if anything is left behind.

The system 130 may also generate an alert when an item has returned. For example assume a beacon is attached to an automobile operated by another member of the user's household. When the driver of that automobile returns home, the beacon will trigger an alert in the user's host device and may push a notification to the user that the automobile is now in the driveway. Similarly, the return of the cat looking for dinner can be announced to the household through a shared user alert to devices 10 and 10a.

FIG. 12B is a network view of a battery:beacon combination as part of a system 134 for linking tracking devices (each containing a coin-cell battery:beacon combination) with a local hub 138 for transmitting data to the cloud, where it can be shared with remote computing devices, or directly to an owner's personal computer 139c. In this exemplary view, a system 134 and network having three tracking devices ($TD_1$, $TD_2$, $TD_3$; 134,135,136), a smart device (identified here as a "hub" 138), an optional computing device 139c, a cloud-based cloud host server 500, and three client devices (10,139a,139b). Battery:beacon combinations 134,135,136 are in bidirectional wireless communication with hub 138. In this instance, each radiobeacon circuit includes a transceiver for sending and receiving messages, a controller, memory containing a limited instruction set, a clock for datestamping received messages, and an antenna. Optionally, the hub 138 may be connected to a gateway computing resource 139c that in turn is connected to the cloud host 500. In some embodiments, the hub 138 is directly connected to the cloud, bypassing optional desktop gateway. The hub 138 listens for signals (i.e., messages) from the tracking devices. The hub has a bluetoothed radioset or other wireless communication apparatus and can sense the range of any compatible radiobeacon within its effective field. Upon receiving signals from one or more radiobeacons, the hub relays the UUID identifier information and any sensor payload associated with the message to the cloud host server. Likewise, the hub may send control information received from the owner via the cloud host server to each or all the tracking devices 134,135,136. For example, reports and updates may be sent to a remote computer 139a, a tablet 139b, or an owner's smartphone 10. Similarly, the smartphone, tablet or computer may be used to send commands to one or more of the tracking devices via hub 138. Commands received from the host by the hub are downswitched to a Bluetooth compatible antenna at a frequency in the Bluetooth band for transmission to a battery-mounted radiobeacon 134,135,136 having a transceiver. The operation of the transceiver is essentially as described in U.S. patent application Ser. No. 14/967,339 titled "System Architectures and Methods for Radiobeacon Data Sharing", filed 13 Dec. 2015 (see FIG. 7B, radiobeacon 80), but according to the teachings of the present invention, the transceiver is mounted in the battery, not the host device. Internet client 139c (shown here as a desktop computer) is optional if hub 138 is equipped with a wide area transceiver communicatively compatible with an internetwork portal. Thus tracking devices fitted with radiobeacons may also have radio transceiver capability.

These embodiments of networks rely on integrating multiple radiobeacons and bluetooth devices into an ad hoc network by providing an application (i.e., a rules-based instruction set comprising software and/or firmware) configured to recognize bluetoothed radio signals of a particular class and effect notifications or actions based on programmed instructions by forwarding those particular signals to a cloud administrative server. In this way, a smart device (e.g. a smartphone) does not have to directly control the radiobeacons. All radiobeacons for an owner are registered in the hub 138 and correspondingly on the host server, and hence can be securely accessed from a smartphone or other smart device anywhere in the world. The registered radiobeacons can be used for home security, tracking lost objects, automation, or playing games with friends across the world, without limit thereto. As transceivers, these tracking devices 134,135,136 may also function as nodes in a mesh network.

Figure 13:
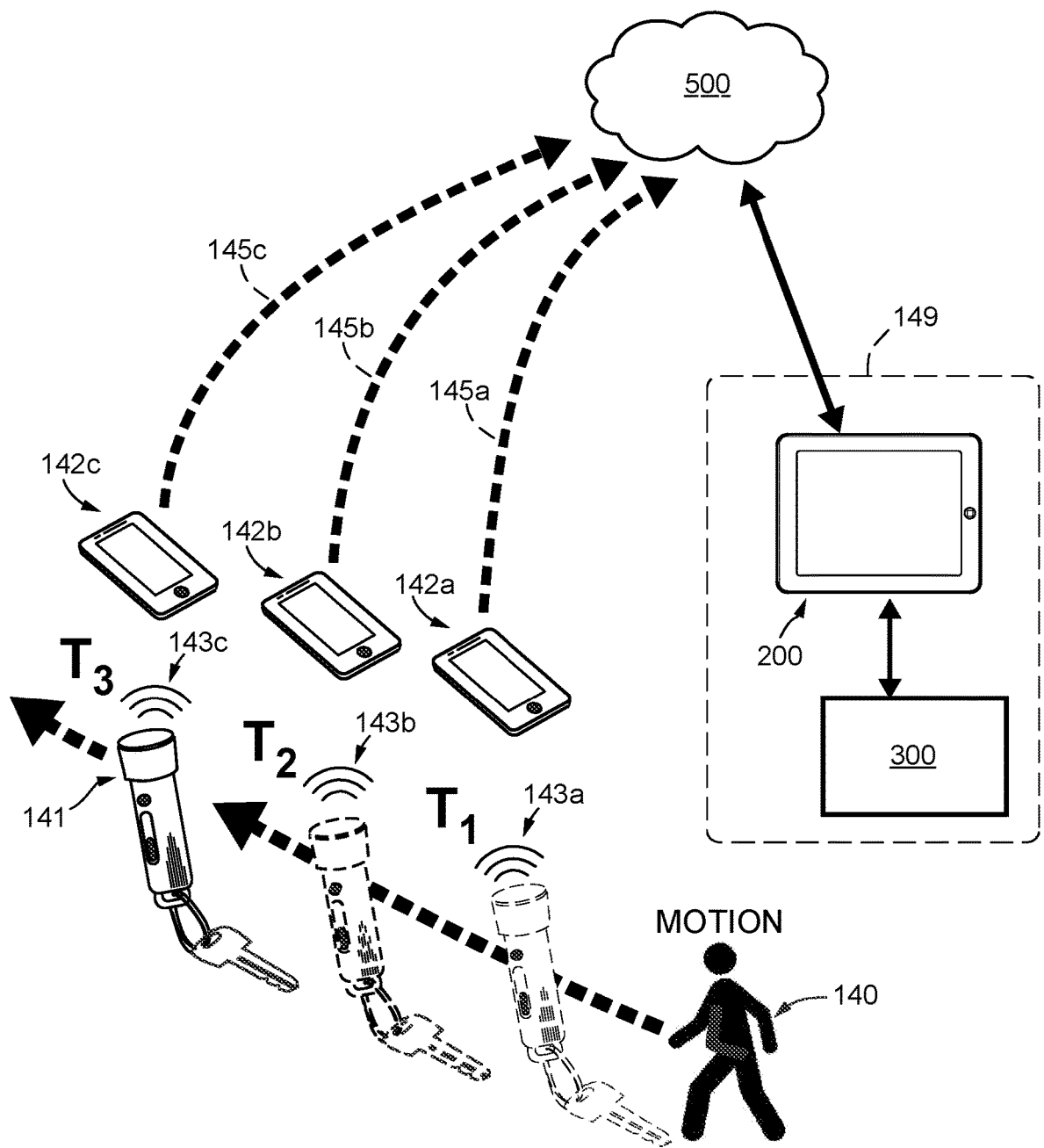
FIG. 13 is a view of an application for tracking a keychain, each of three positions corresponding to the motion of a person walking.

FIG. 13 is an animation view of a person 140 walking, the person having possession of a penlight apparatus 141 on a keychain, in which the apparatus 141 is essentially as described in FIG. 3A, and contains a battery:beacon combination. In each time snapshot $T_1$, $T_2$, $T_3$, the battery:beacon combination in the penlight transits a defined path (MOTION, dashed heavy arrow) so as to come into radio-proximity with a series of three smart devices (142a,142b, 142c). Each smart device detects and registers a Bluetooth message (143a,143b,143c) from the radiobeacon in a time sequence $T_1$ through $T_3$, and upswitchingly transmits a broadband wide area message in real time (145a,145b,145c) to a cloud server 500, which in turn may initiate a command transmission to a smart device or hub 200 in a remote location 149. In this instance, here remote hub 200 may be programmed to command a remote machine 300 to execute an instruction and monitors that the execution of the command was completed (double-headed arrows). The command to machine 300 can be as simple as an instruction to turn on a hot tub or a porch light because the owner 140 is almost home, and the hub 200 can report status to the cloud server, where it is accessible for the owner's inspection by opening his account screen on a smart phone, and so forth.

Many more applications can be envisaged. Radio signals are indicated at three times $T_1$, $T_2$, and $T_3$, each corresponding to a point in time and a position in the right-to-left path of the walking person 140. Each message may contain updated sensor content reflective of time and distance travelled. The cloud host server may use this information to track the battery:beacon combination in device 141, which in this example is a pen light attached to a keychain that has been unknowingly carried away by an individual 140 in a borrowed jacket.

The messages may also include other sensor information, such as microclimate indicators, detection of noises, heart rate, walking pace, insolation, and direct or indirect indicators of proximity and location. Data on fitness (such as accelerometry data) can be cached, or sent from the tracking device 141, and entered in a user's exercise log, for example.

In some instances, permission may be in place to engage smart device hardware services. For example, local hub or smart device 200 may include a virtual machine accessory video camera either integral to the device or separately linked to a USB or wireless camera, either at home, or on a headband or a pair of smart glasses worn on the head of a user. The video can then be streamed to the cloud, and according to user permissions in an administrative server, forwarded to one or more display stations or websites to help track the errant keychain or check up on the household. This could be important when the person carrying the radiobeacon 141 has left their medications at home, or is missing and needs to be found. In another instance, the operator of smart device 142c could be invited to approach walking person 140 and offer assistance. Thus a community network is established and includes "good Samaritans" who have downloaded the needed software to their smart device.

Roles may be reversed, smart device 200 may interchangeably insert itself into ad hoc networks by proximity to the radiobeacons of others, and serve as a shared community resource—either way, all community smart devices will reciprocate in upswitchingly transmitting data from a radiobeacon to the cloud. This network is based on microcircuitry inserted into battery:beacon combinations that power the various smart devices.

Hub device 200 may also function as a radiobeacon, or may signal the cloud server 500 to request devices 142a, 142b and 142c report their location so as to track the person 140 carrying radiobeacon device 141. Generally the messages are very short and result in a minimal load on the network. In other cases, some devices may have permission to permit sharing of foreground resources such as GPS location that can be used to track the keychain (or the missing person) or even to push a solicitation for aid to one of the passersby, indicated here as carrying smart device 142c. The person can be notified if unwanted tracking is occurring, for example by monitoring inquiry responses in the radiobeacon and issuing a notification if a persistent inquiry pattern from an unrecognized third party device emerges as the person moves from place to place.

In some embodiments, the radiobeacon 141 may carry its own GPS device and broadcast its latitude and longitude coordinates in the message (i.e., as a geostamp), accompanied by a timestamp. In other embodiments, the radiobeacon message may be stamped with the GPS coordinates of any smart device that participates in systems such as shown in the preceding figures and is within an effective radio contact area of any radiobeacon. In still other embodiments, the location of one smart device may be paired with proximity and range to the battery:beacon combination installed in pen light 141. For example, in the system shown in FIG. 13, the smart device 142a provides a location using its GPS function and pairs that location with the proximity of device 141 and the time of contact. The pen light 141 with battery:beacon combination thus is a sophisticated "radiotag" when attached to or carried by children, pets, property and so forth. The smaller tags shown in FIG. 12B (tracking devices 134,135,136) function in the same way. Any of the tags can be used to map a path taken by individual 140 and project a destination or an intercept.

Device 200 may be a smart pad for displaying a map. The map may be an interactive map and may include a voice overlay or data overlay. Maps may include aggregate data, such as traffic, radio traffic, tremors, fog, crowding, or special offers, sites of interest, meeting places, and so forth and the path of a radiotagged object being tracked by its battery will be updated on the map display.

Where timestamps and geostamps can be aggregated, the host notification may include a tracking feature whereby a plurality of recent "fixes" on the location of a lost object are visually displayed in the form of a trail or track over time superimposed on the map. The "track" may also include an extrapolation of at least one future position or a composite showing the locations of one or two friends who in position to intersect the track ahead of the lost object, thus potentially recovering it by activating a audible alarm in the penlight when in close range.

On receipt, compatible smart devices will register each message and add a timestamp (and a geostamp when available). Conventionally this information is then discarded if the smart device determines that no policy or rule associates the message with the owner of the device; however, by installing an application of the invention in a smart device, the smart device acquires capability to access a cloud host of the invention, and message policies will include instructions for processing and rebroadcasting third-party messages in background (but where the message contents remain anonymous, occult, and encoded so that the owner of the "proxy" device is not notified or permitted access to the message contents without special permissions). At the end of the upswitching process, no record of the contents of the message can be retrieved from the proxy smart device and encryption may be used as known in the art to ensure privacy, whereby only the cloud host server will decrypt the message. The broadcast forward, however, includes the original data payload of the message, a timestamp as received, and a network address for the cloud host, so that it can be routed to the cloud host server. Based on ownership of the radiobeacon as determined from the original message contents, and on sensor data in the message, along with any contextual information that is relevant, the cloud host server accesses a database or instruction sets, determines a user preference or an administrative preference for some appropriate action in response, and initiates the pre-configured action, for instance, instructing a remote machine or machine system to execute an action that the owner has requested according to the time, place, context, and/or any condition reported in the sensor data.

In other instances, the cloud host server 500 will take collectively beneficial action, such as by sharing a map showing aggregated data indicating updated traffic conditions, or alerting users according to their profile of any events of interest. The actions can range from calling an emergency operator in the event that the radiobeacon detects and reports data consistent with a vehicle accident or injury, or actuating a camera, or lowering a window in an overheated vehicle, or unlocking a car without using a key, helping a user find their lost keychain with their cellphone, helping find their lost cellphone (using the radiobeacon in the cellphone) with their keychain tracking device, or displaying a map on a smart pad, the map having an overlayer of aggregated local microarea weather data collected from multiple radiobeacon-associated sensors making transmissions picked up by smart devices.

Figure 14:
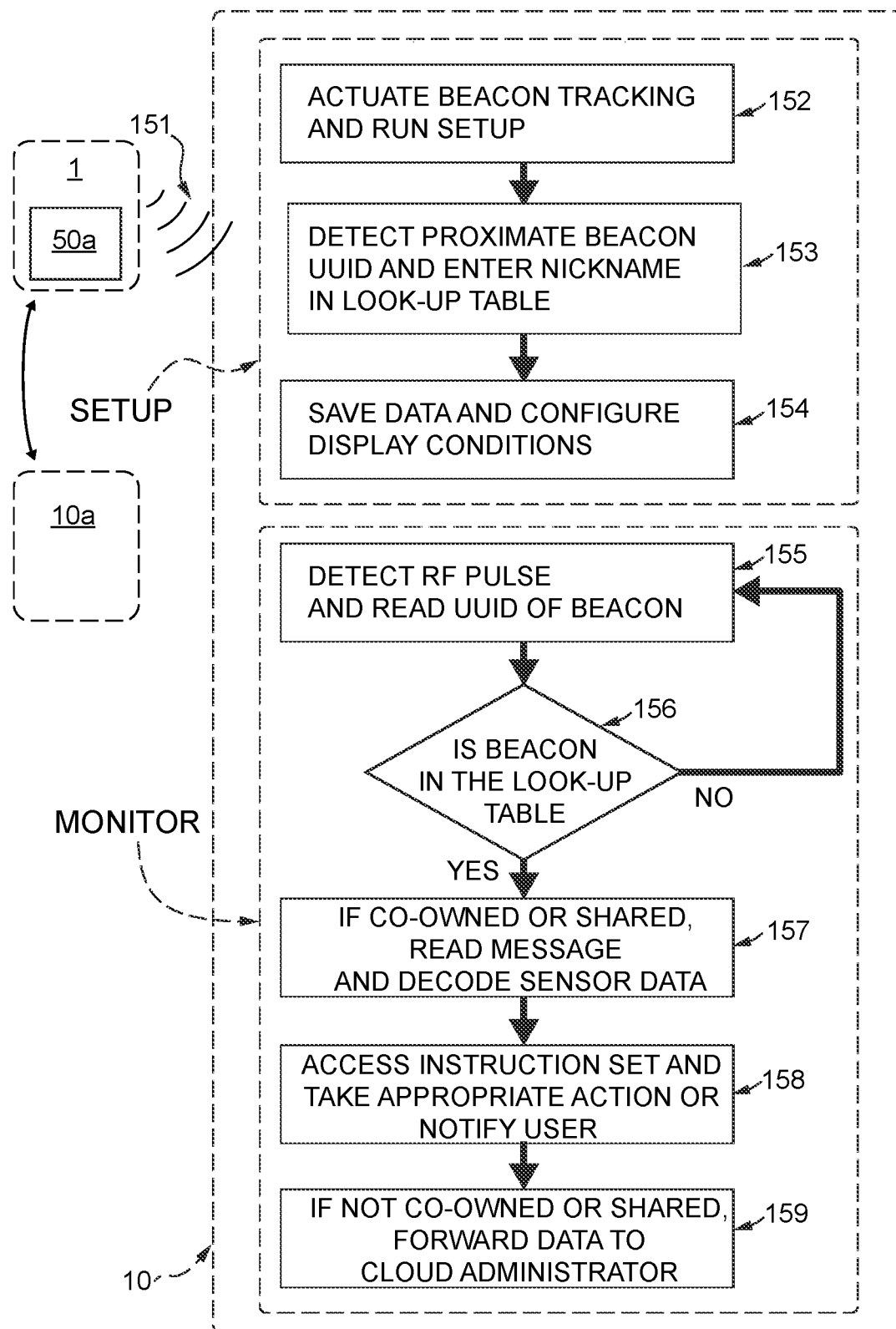
FIG. 14 is a flow chart of a method for tracking a person or a thing using the battery:beacon combinations of the invention.

FIG. 14 is a flow chart of a method for tracking a person or a thing using a battery:beacon combination 1 of the invention in operative communication with a network system having at least one device configured with compatible instructions for operating the network. The method includes a SETUP function and a MONITOR function and is operated on a smart device 10 for example. During setup, the beacon tracking application of a smart device 10a is actuated and setup is run to detect 153 proximate battery:beacon devices 50a by receiving broadcast 151. The detected device 50a is entered 154 in a look-up table by UUID and given a nickname and location (if installed to be stationary). The data is then saved 154 and can be shared with other smart devices. During the MONITOR phase, when an RF pulse is detected by a smart device, the device reads 155 the UUID of the beacon, and determines 156 whether it is in the look-up table or not. If identified as co-owned or shared (YES, 157), any message associated with the transmission is read and decoded. An instruction set is accessed 158 and according to the data and context, any action is taken, often including sending a notification to the user. In addition, the message, particularly if not recognized as being co-owned or shared, can be forwarded 159 to a cloud administrator. At the cloud administrator, the UUID will again be compared with lists of subscribers and action taken if rules-based programming parameters are met.

Figure 15:
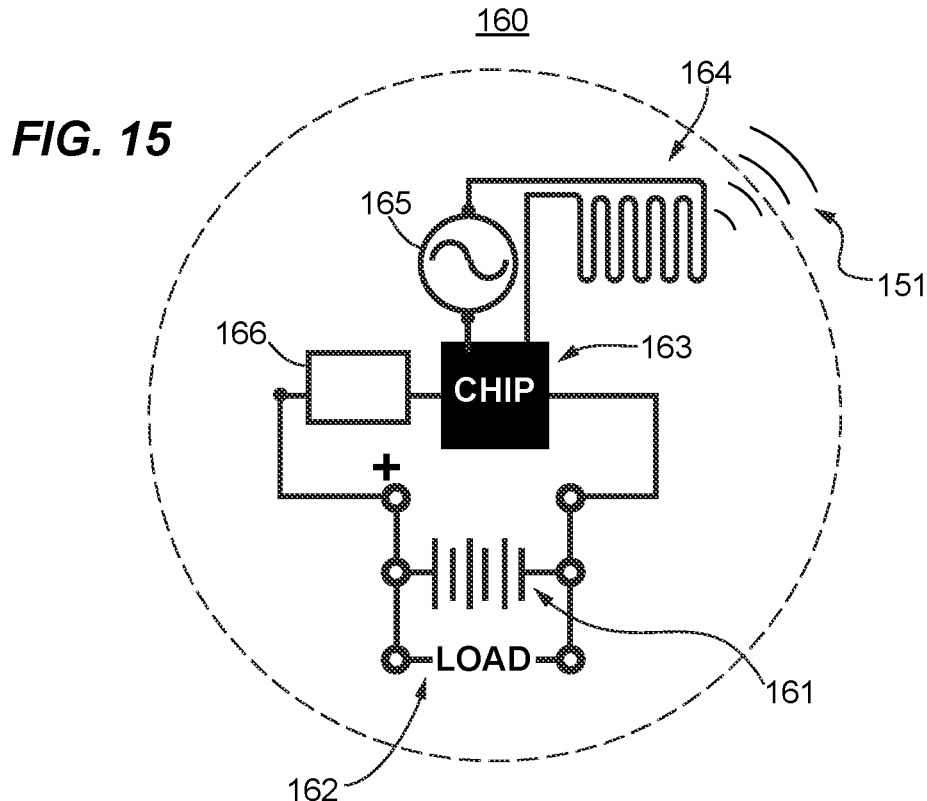
FIG. 15 is a schematic of a general device with internal battery having a battery:beacon combination of the invention.

FIG. 15 is a schematic of a general host device (LOAD) with internal battery having a battery:beacon combination of the invention. The circuit 160 includes a voltaic pile 161 and a load 162 in series. The radiobeacon subcircuit is connected in parallel and includes core chip 163 (with encoder and messaging function), an oscillator 165 for generating an RF signal, and an antenna 164. In this example, also included is a sensor 166.

The beacon signal includes the identification information for the battery:beacon device and a signal representative of the sensor data output. A program application in a monitoring device such as a hub or smart phone may be used to identify the signal by the beacon identifier in the pulse and to deduce the location of the device from a look-up table set up by the user or from proximity data in real time.

Basic circuit components of a battery:beacon combination (installed in a device constituting a load) are identified. Circuit components include a core encoder and signal generator integrated circuit or "chip" 163. The chip generally includes an integrated microcontroller, read only memory (ROM), random access memory (RAM) sufficient to support rudimentary control, or may be provided with firmware sufficient for basic functions, and generally includes a clock and at least one sensor, such as an 10 port connected to the multifunction button 19 described earlier. The circuit may also include an environmental sensor 166. For some applications, a removable flash memory device may be incorporated. The memory device may tabulate data collected by sensors mounted in the device for later retrieval and analysis. Messages received by the device may also be collected if the device includes a transceiver.

The device 160 is assigned a unique identification code (UUID) and will generally broadcast at periodic intervals as programmed by the developer. Broadcasts may be made using a ceramic antenna, a loop antenna, a whip antenna, a patch antenna, or a dipole antenna selected for low energy consumption such that the antenna is disposed in radiolucent battery housing.

The unit 160 is connected to one or more sensors 166, or any number of sensors. Exemplary sensors sense environmental and physical parameters experienced by the radiobeacon, including and not limited to temperature, light intensity, smoke, voltage, sound, motion, displacement, acceleration, heading, humidity, pressure, radiation, button-press event, compass direction, or to report daylight levels, traffic levels, noise levels, NOX levels, and unusual noises such as gunshots or sirens, or self-reporting, such as reporting a low battery threshold level, other stimulus, sensor data, or environmental parameters, without limitation thereto. In some embodiments, a sensor is a combined multi-axis motion sensor and temperature sensor. In one embodiment, the sensor has an accelerometer, a gyroscope, and a magnetometer for each axis. The information or "sensor data" output by the multi-axis motion sensor enables the receiver (i.e., a host device such as a smartphone) to monitor and track the battery (which is radiotagged by a radiobeacon) as it moves from one location to another. Alternatively, the battery:beacon may include a GPS-based location sensor. The motion of the device can be monitored continuously by a cloud host server 500 as long as the receiver is close enough to be in wireless contact with the sensor package on board or alternatively with a radiobeacon in wireless contact with the beacon. As an alternative, the information may be stored in a memory in the device and accessed later.

Some embodiments of the battery:beacon combination of the invention are rechargeable batteries that may be recharged via an inductive charger. Wireless chargers, also known as induction chargers, typically place one coil in a charging device or pad that is connected to an AC power source. Battery top off controls and discharge controls are known in the art and may be implemented where warranted.

In one application, the sensor is a low battery voltage sensor. FIG. 16A shows how voltage monitoring can be used to schedule battery changes before a smoke alarm fails. The beacon sensor is a voltage monitor 166 and is configured to detect a low voltage condition (termed here a "pre-alarm threshold", 167) at a voltage that is slightly higher than the "replace battery" alarm threshold (168, set in the monitoring circuit of the smoke alarm) and to actuate a radiobeacon signal that is detected by a compatible hub, by a cellphone, or by another mobile computing machine when in proximity to the radiobeacon and when configured with compatible software or firmware. Radio pulses are emitted intermittently and are detected by a device in proximity to the radiobeacon. Because this applies to local private clusters, using a mobile device to detect the radio pulses will result in a successful unidirectional transmission of the "pre-alarm" alert data at any time that the end user is in proximity to the radiobeacon. The sensor package may also include a photosensor and code sufficient to ensure that the pre-alarm notification occurs during morning hours. A motion sensor may be used to route the pre-alarm notification to a remote receiver via a cloud host, such as when no one is home.

Figure 16B:
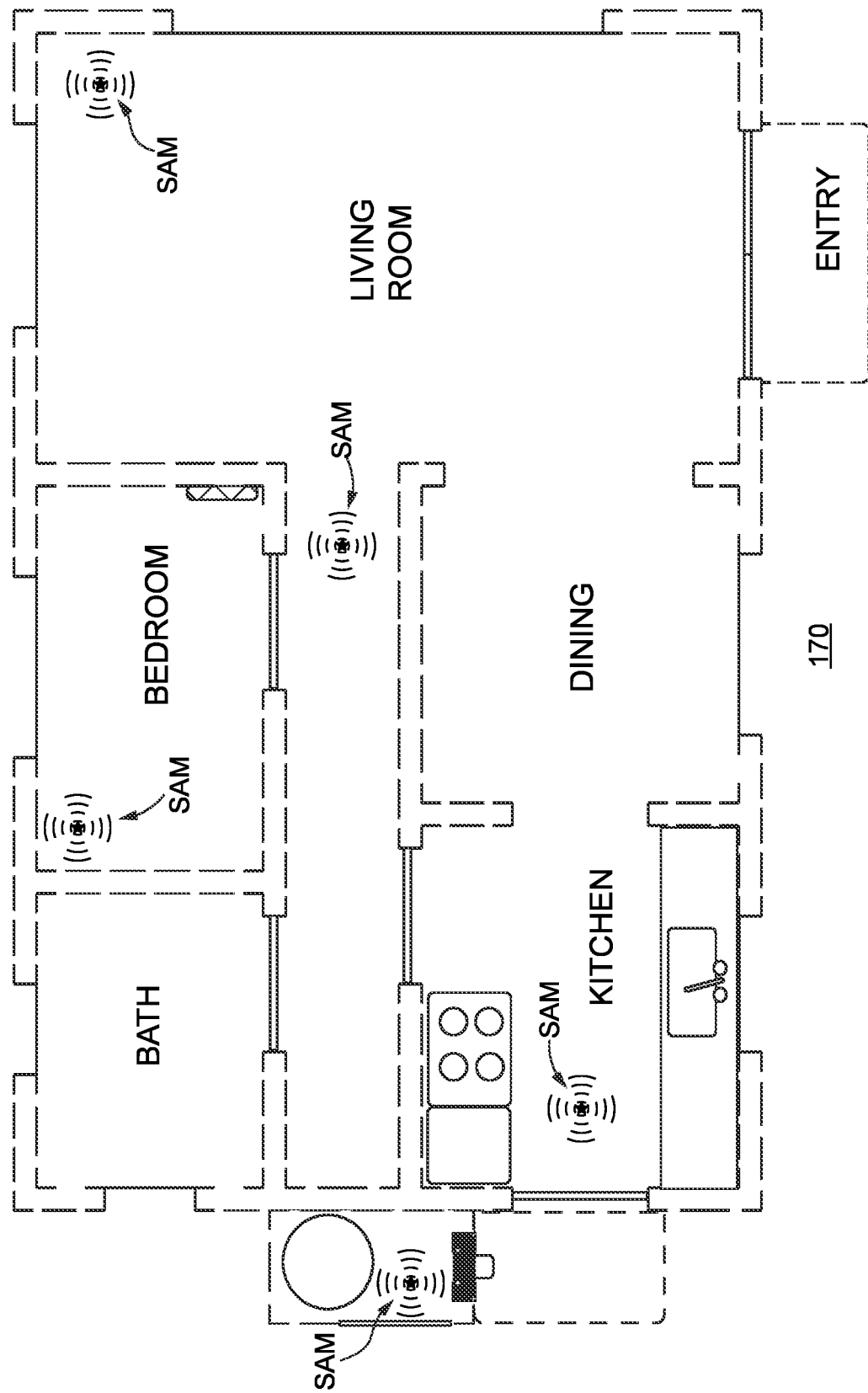
FIG. 16B is a schematic view of multiple smoke alarms (SAM) deployed in a household network and system for monitoring multiple batteries in the network.

FIG. 16B is a schematic view of multiple smoke alarms (SAM) deployed in a household network and system for monitoring multiple batteries in the network. This plan view of a household 170 contains multiple beacons associated with personal possessions or particular locations, where the exemplary beacons are enabled to monitor household conditions and notify an owner of any adverse conditions. Some beacons are used to tag personal items such as a wallet, car keys, and backpack. Other beacons are used to detect motion, such as of a backdoor swinging open or a car entering a garage. Yet other beacons are used to report a room temperature or temperature in the refrigerator or a smoke alarm battery voltage. One beacon is attached to the family dog and reports motion and position of the dog. Thus, this deployment of beacons represents a constellation of sensors having multiple complementary uses, all of which are accessible to the owner as organizational aides. While the smoke alarms retain their existing functions, the battery:beacon in each smoke alarm extends the functionality by providing an early warning of a depleted battery condition during daylight hours, and can even include a reminder when the smart phone next senses it is in a supermarket. Thus data management in the user's life becomes a useful tool for timesavings and problem solving and may also improve quality of life, either in an office setting, a neighborhood, or as shown here in a household.

In preferred methods of use, the deployment of beacons may trigger notifications or actions depending on location, particularly in the context of indoor navigation where proximity of a host receiver is known relative to a cluster of beacons. In one example, a user enters a room having a beacon, the user's smart phone detects the beacon and receives associated temperature data. Room temperature is detected as low. So the application can push a notification to the receiver device, or code in the application in the receiver can include instructions to turn up the heat to a pre-defined comfort level and to turn on the lights or an MP3 music track preference in a compatible device, for example. The receiver can identify the user's location from the beacon and can broadcast this information to a cloud service if desired, so as to obtain other special services. A substantial body of literature on cloud-mediated services is known in the art, but a simple beacon-mediated trigger or notification system has been needed to simplify and improve delivery of services. By overloading contextual data on the communications protocol, substantial improvement is achieved and is an advance in the art.

As described elsewhere [U.S. Provisional Pat. Appl. No. 62/175,141 filed 12 Jun. 2015 titled "Devices And Network Architecture For Improved Radiobeacon Mediated Data Context Sensing"], the sensor data, including input stimuli generally, is overloaded into the frames of a standardized beacon transmission and parsimoniously broadcast at defined intervals. The data may be read by a compatible portable device such as a smartphone in proximity to the household, or may be uploaded from a host device or other computing device with cloud access, so that the data and any accompanying notifications can be downloaded remotely or accessed through a browser.

Figure 17A:
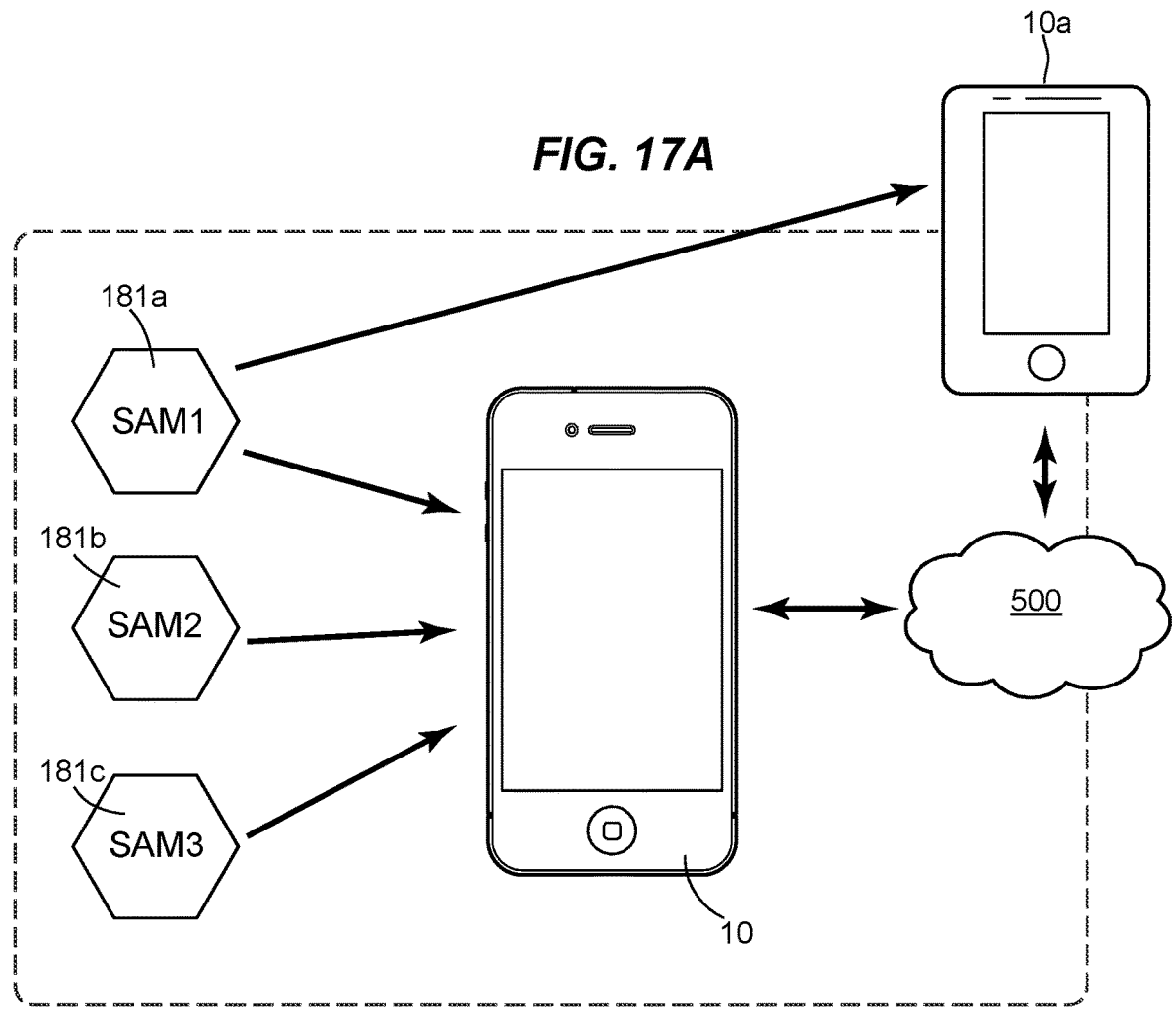
FIG. 17A depicts data reporting in a network with two smart devices and a cloud-based administrative server.

FIG. 17A depicts data reporting from smoke alarms (SAMs: 181a,181b,181c) in a local private network 180a with two smart devices 10,10a and a cloud-based administrative server 500. This represents a local private cluster having a primary receiver 10, a remote receiver 10a, and a network connection to the internet. Three smoke alarm monitors (SAM1, SAM2, SAM3) are shown. Each battery:beacon monitor associated with a smoke alarm will emit a unidirectional radio pulse if the battery weakens below a pre-alarm threshold as shown in FIG. 16A. The radio pulses are encoded with a unique identifier and when detected by a compatible computing device, the location of the battery in need of replacement is readily determined. In turn, a computing device in receipt of the radio pulse may be used to propagate an alarm annunciation to a larger network, such as the Internet, as represented here by a cloud 500, or a local area network or wide area network if desired. Similar local networks can be constructed for other types of sensors, where each sensor is operatively in communication with an encoder and radiobeacon circuit enclosed in a removable battery 1.

Figure 17B:
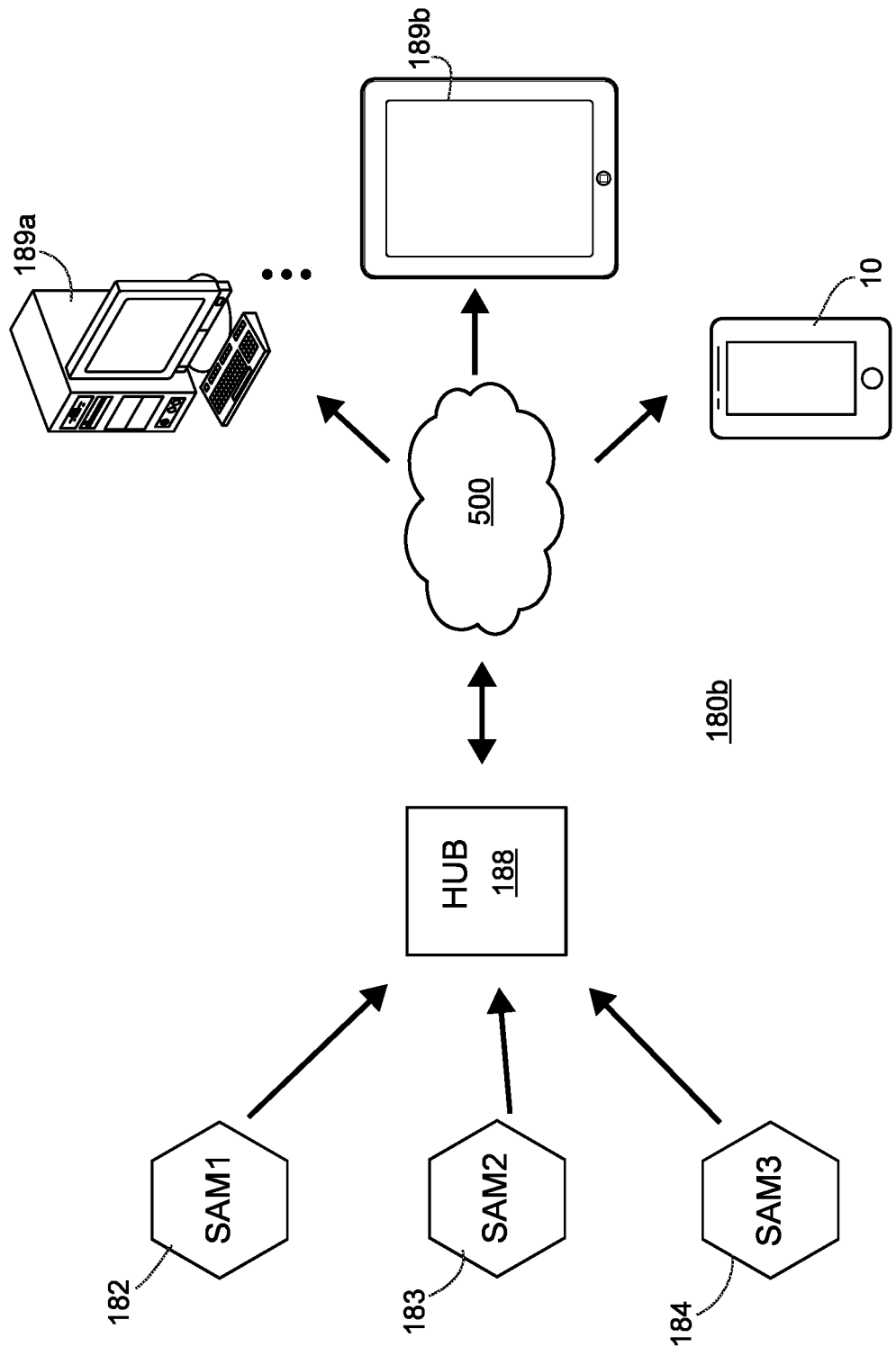
FIG. 17B depicts data reporting (from three smoke alarms, SAM) in a network directed through a hub to a cloud-based administrative server. The data may be shared via wireless connections with multiple smart devices and personal computers, for example.

FIG. 17B depicts data reporting in a network 180b directed through a hub 188 to a cloud-based administrative server 500. The data may be shared via wireless connections with multiple smart devices and personal computers (10, 189a,189b), for example. For illustration, three smoke alarms (182,183,184) are assumed to be distributed in a structure such as the household floorplan shown in FIG. 16B. In this instance, a dedicated hub 188 may be used to monitor the smoke alarms, which are each given a nickname, a location, and tabulated in a record of a look-up table along with the UUID of each battery:beacon combination associated with each smoke alarm. The hub is configured to listen for emissions from any of the radiobeacons listed for monitoring, and may also include other functions such as a capacity to make wireless transmissions to a computing machine or a capacity to monitor and control other remote device's in the user's local private cluster, in short the hub serves to manage the user's "Cloud of Things". The hub may contact the internet cloud 500 directly or may be routed through any effective portal as set up by the user. Once on the Internet, formatted data in XML or HTTP code for example may be displayed, tabulated, stored, or otherwise processed on a variety of remote devices, such as other computers of a network. Further details of the hub technology are disclosed in US Pat. Publ. No. 2015/0356393, entitled TRACKING DEVICE to Daoura; US Pat. Publ. No. 2015/0356861 titled TRACKING DEVICE SYSTEM to Daoura; and, US Pat. Publ. No. 2015/0356862 titled TRACKING DEVICE SYSTEM to Daoura which are co-owned and unpublished at the time of this filing. These patent documents are incorporated in full herein by reference for all their teachings. Based on pre-programmed rules, notifications will be sent to designated smart devices by the cloud server, each notification describing the nickname, location, and battery status of the affected smoke alarm.

Figure 18:
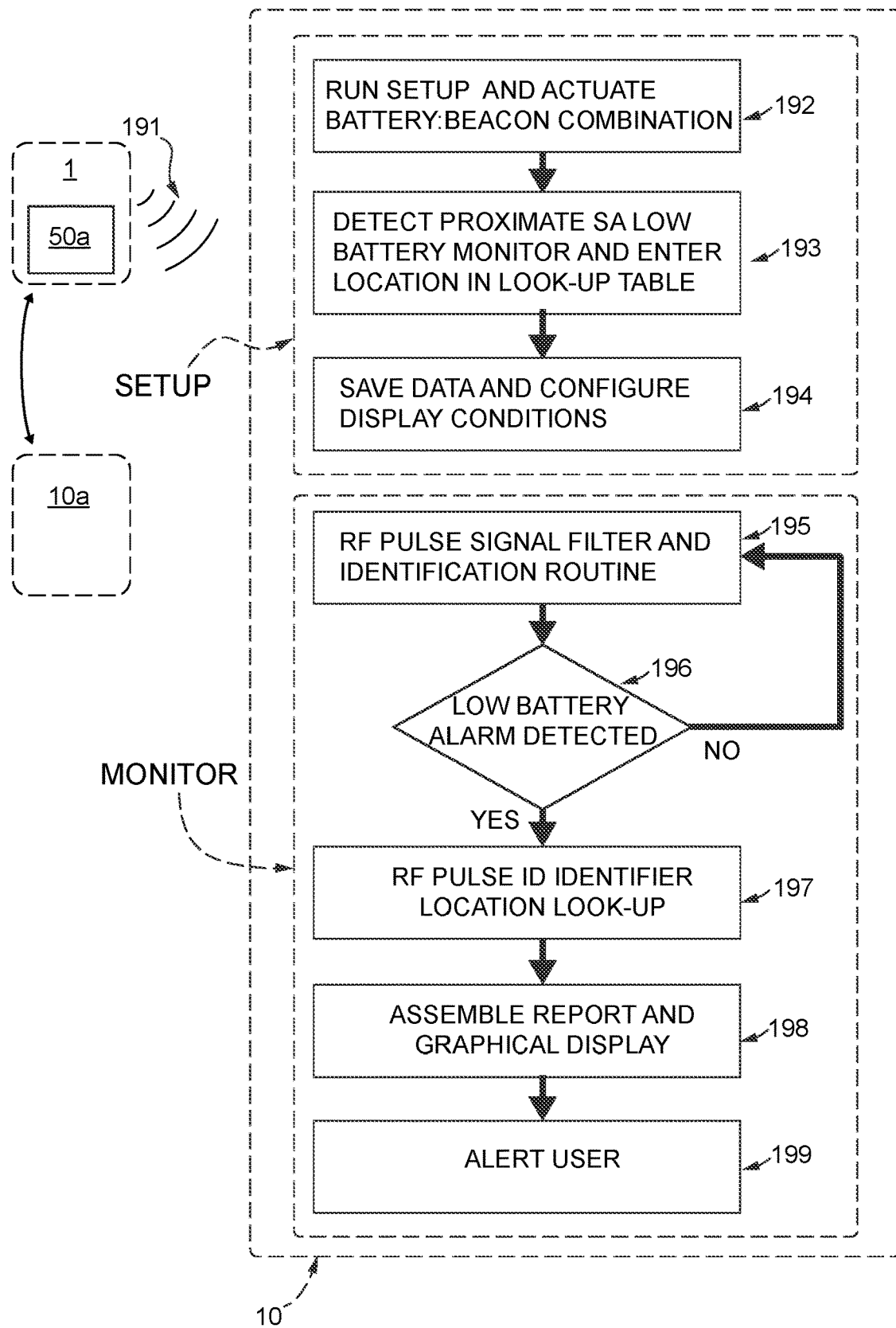
FIG. 18 depicts a method of includes a setup subroutine and a monitoring subroutine.

FIG. 18 depicts a method of using the network to issue notifications if an adverse condition such as a failing battery in a smoke alarm is detected. The method consists of a setup subroutine and a monitoring subroutine. FIG. 18 is a block diagram of a method, here embodied as an application as may be installed in a cellphone, hub or computing device having a compatible radio receiver such as a Bluetooth device. The application is configured to detect RF pulses 191 within the range of transmission from a radiobeacon 50a, and is programmed by the user to associate the unique identifier (UUID) signal of the radiobeacon transmission with a particular location of a smoke alarm battery 1 being monitored.

In a first step 192 of SETUP, the radiobeacon is actuated and the receiver is alerted to find the pulse emission 191. The receiver will then show 193 the user a table in graphical format and invite the user to enter a location and a nickname to be associated with the newly detected pulse emission, which has a unique identifier (UUID). The look-up table is then saved 194 in the smart device and can be shared with other smart devices having the program. The pulse transmission automatically ends after a brief setup window, but when next detected by the device, the graphical display will indicate the location assigned to that particular radiobeacon. The receiver includes computational capability to broadcast a notification to a network such as an Internet with a message to a user summarizing the alert notification and the location and the server will monitor to be sure that the alarm notification is cleared. To keep things simple, the user has only to remember that the "kitchen smoke alarm" refers to his house and is one of his cluster of things that he monitors for a depleted battery pre-alarm. The alarm notification will automatically cleared and reset when the battery is replaced.

More generally, the invention is embodied in an apparatus for monitoring any compatible remote battery, which comprises: a) a folded or flexible printed circuit board with electrical contacts configured to be inserted inside a disposable battery selected from a 9V cell, an AA cell an AAA cell, a coin cell, or other battery such as tool-specific rechargeable battery, during manufacture; b) a voltage monitor or comparator circuit in electrical contact with said electrical contacts, wherein said voltage monitor or comparator is configured for detecting a depleted battery condition; c) a low energy radiobeacon subcircuit in electrical contact with said electrical contacts, wherein said radiobeacon subcircuit comprises an RF pulse signal generator for generating RF pulses or signals on a plurality of preset channels in an ISM frequency range of about 2.4 to 2.5 GHz or about 5.1 to 5.8 GHz, a clock for generating said RF pulses at a preset duration when said depleted battery condition is detected; d) a low power antenna for emitting said RF pulses or signals, and, e) a radio receiver 10 for detecting said RF pulses or signal, said radio receiver comprising a control apparatus or computing machine and programmable instructions for coupling said RF pulses to a location-specific display or broadcast. The location-specific display or broadcast is formatted to indicate the kind of battery monitor and the location of the battery being monitored; thus by way of illustration, a battery powered smoke alarm may be identified as in need of battery replacement when an RF pulse from the battery monitor is detected on a remote computing device, the RF pulse or signal indicating a weak or depleted battery in the smoke alarm, for example. Similar systems find use for monitoring a variety of batteries in various applications.

By way of example, FIG. 16B is a schematic floorplan view of a house; a "map" where each battery:beacon combination is associated (during setup) in a look-up table with a particular smoke alarm (SAM). During monitoring (FIG. 18), as a battery weakens, the monitoring device detects 195 the RF pulse, identifies 196 signals related to the household, identifies 197 the UUID in the lookup table, and if on the list, prepares 198 a report that a depleted battery pre-alarm threshold has been crossed (see FIG. 16A), and broadcasts 199 an annunciation signal to alert the user. The signal is encoded with an identifier signal, so that upon detection by a proximate compatible computing device, an application run by the computing apparatus will generate a graphical display indicating the location of the weak battery so that it may be replaced. A user encountering the pre-alarm notification has sufficient time to replace the battery before the smoke alarm goes into its "depleted battery alarm" state and begins making an audible beep (the conventional means for alerting a user of a low battery). Advantageously, no bidirectional data transmission is needed to achieve this simple synergy of timely information and user notification. The host device has the option of forwarding the data and report to a cloud-based subscription service for follow-up. Users may also receive notices at close of the workday tasking them with an errand to drop by the store and buy a battery. Even better, because the battery:beacon devices at home are also registered in the look-up table on the user's private network, the user can be reminded how many of the right size batteries are at home already and what their condition is, possibly avoiding that trip to the store.

Figure 19:
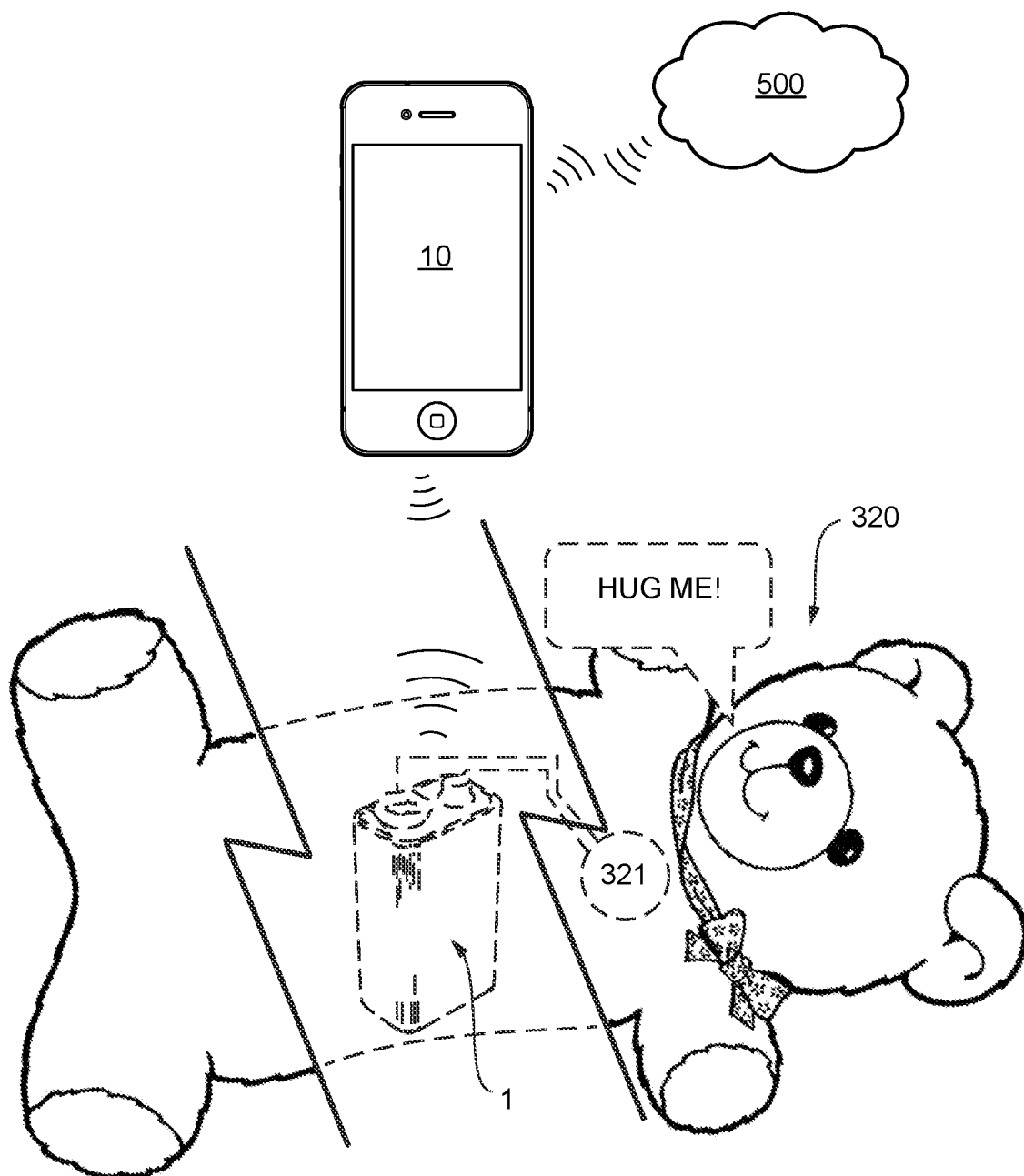
FIG. 19 is a cutaway view showing a toy teddy bear equipped with a battery:beacon combination of the invention.

FIG. 19 is a cutaway view showing a toy teddy bear 320 equipped with a battery:beacon combination 1 of the invention. When installed in the teddy bear's belly, the battery, which operates a sound generator, triggers a vocalization whenever accelerometer motion is sensed, for example, or when voices are detected. In one version, the toy's radiobeacon, when motion is detected, triggers a smart device 10 (sometimes in conjunction with cloud 500 resources) to actuate the toy's audio controller 321. The toy learns by associating with new software "applications" for the battery: beacon combination as the child grows and becomes more sophisticated (as more complex sensor packages are integrated into the battery combination), for example the controller 321 is actuated by motion and warmth sensors in the battery. In another instance, the vocalizations become more or less complex depending on the level of the program version for operating the toy, as upgraded in the smart device or by download to a memory in the battery. In yet another instance, the toy may include a microphone and the cloud resources 500 may include speech recognition so as to implement an interactive dialogue with a person holding the toy, the interactive level being programmable on an interface in the smart device.

Figure 20:
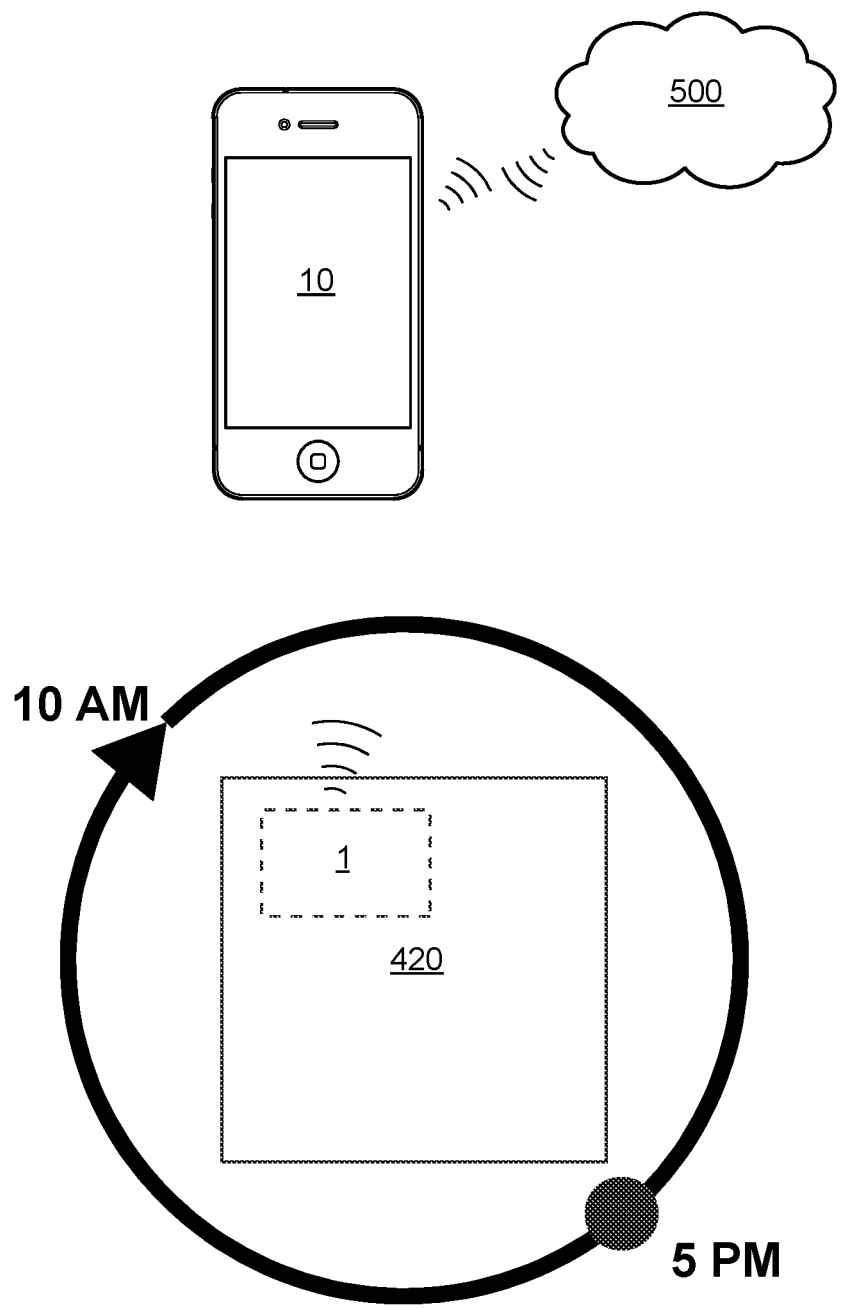
FIG. 20 is a block diagram of a tool, in this case a glucose monitor used by a diabetic patient to maintain a steady blood sugar level.

FIG. 20 is a block diagram of a tool and tool monitoring system, in this case a monitoring device 420 such as a blood glucose monitor used by a diabetic patient to maintain a steady blood sugar level. The tool is fitted with a battery: beacon combination 1 of the invention and becomes more effectively integrated into the patient's daily routine by use of an application (resident in a home network as here, or the patient's smart phone 10 for example) that responds to messages from the radiobeacon. By using the glucose monitor, motion is detected in the battery sensor package, such as a motion detector mounted on a PCB associated with the battery housing and powered from the battery power cell. The motion sensor output is encoded in a message and sent at a standard local area, low energy broadcast frequency, where it is picked up by the household local network administered out of a central hub in the kitchen, for example. Using the unique identifier in the message, the hub controller determines that the glucose monitoring tool was used, and makes a record of the time, 10 AM for example. If subsequently, no test result is entered in the patients log file (administered on the home network), the hub will send a notification to the patient to ensure that the report is updated. In the opposite situation, in which no activity or motion of the glucose monitoring tool is detected at 5 PM, the hub recognizes this as a more potentially serious situation, and will escalate notifications until a confirmation is received that the testing is being attended to. In this instance, the smart device or hub is keeping time, the radiobeacon need not. The radiobeacon merely sends a message when it senses an acceleration or motion consistent with use of the tool, and the host network does the rest. Time is indicated by a circle with a clockwise arrow.

A variety of other conditions are associated with the need for frequent attention, such as the need to take particular medications regularly, so the system can include a sensor in any battery that is associated with a medication (even as simple as a penlight battery with radiobeacon unit strapped to a medication bottle), and the system will remember to verify that the medication was taken, even if the patient entirely forgets. The battery:beacon also serves to locate the medication bottle if it is misplaced by virtue of its tracking and proximity locating system as described in U.S. Non-Provisional patent application Ser. No. 14/301,236 filed 10 Jun. 2014 titled "Tracking Device System", which is co-assigned and co-owned, and is incorporated here by reference in full for all that it teaches.

Figure 21A:
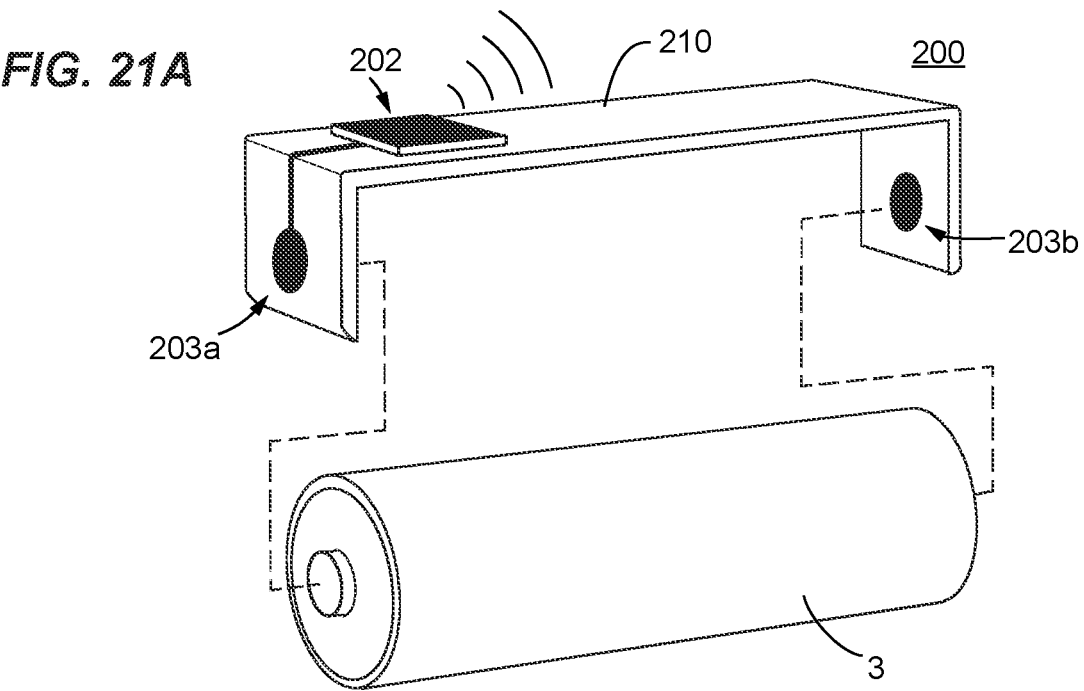
FIG. 21A is an exploded view of a second embodiment of the invention, depicting a clip-on battery monitor in piggyback electrical contact with a disposable pen cell.
Figure 21B:
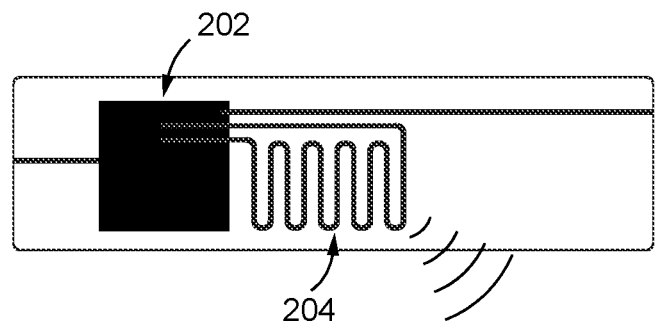
FIGS. 21B, 21C and 21D provide added views of the clip-on device that operates in parallel with an external circuit or load.
Figure 21C:
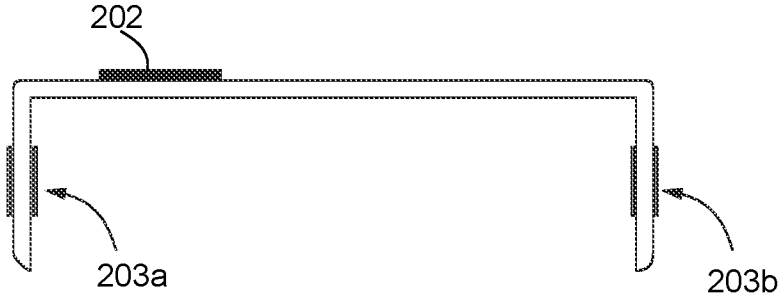
Figure 21D:
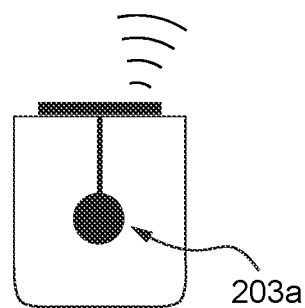

FIG. 21A is an exploded view of a second embodiment of the invention, depicting a clip-on battery monitor in piggyback electrical contact with a disposable pen cell. FIGS. 21B, 21C and 21D provide top, side and end views of the clip-on device that operates in parallel with an external circuit or load. Depicted are a beacon clip or "applique" 200 in piggyback electrical contact with a disposable pen cell 3. Chip 202 is configured as a controller to monitor voltage, make timely RF signals, and to store a simple program instruction set in on-board EEPROM. The form factor chosen here is acceptable for AA and AAA batteries, illustrating the versatility of the inventive folded or flexible PCB battery monitoring devices. In this view, the battery is inserted or attached between through-contacts (203*a*,203*b*) provided at either end of the device. As shown, device body 210 is provided with sufficient rigidity and a level of springiness that contacts may be "clipped" onto the ends of the battery, but alternatively, flexible contacts may be formed of a sticky electro-conductive material so as to adhere to the battery end poles. Thin fold-down foil tabs may also be used to make an electrical connection between the PCB and the battery poles. Similarly, thin tabs of flexible PCB material, for example, are provided with full-thickness electrically conductive end piece through-contacts (203*a*, 203*b*) so as to allow the end user to form Voltaic piles by stacking the batteries end to end, as is often needed to sum the voltages of multiple batteries, while providing one battery in the stack with radiobeacon capability and antenna 204. When used in a series circuit, monitoring any one battery is indicative of the condition of all the batteries in the series voltaic pile.

Similarly, when purchasing batteries in larger units by lot, a battery monitor affixed to any one battery of the lot is generally representative of the condition of all the batteries. Thus the user may monitor battery quality of many batteries simply and effectively with a single battery monitoring system of the invention. This attachable device readily converts any battery to a smart battery and is re-usable.

Figure 22A:
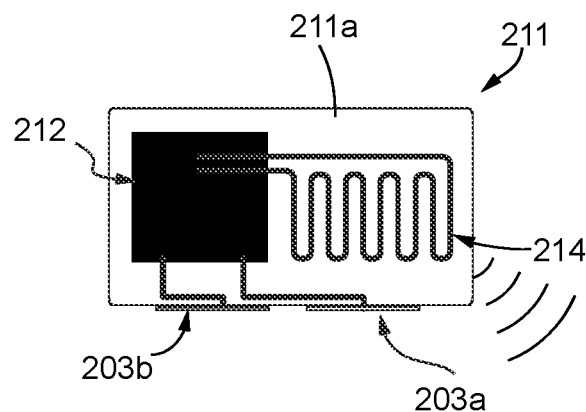
FIG. 22A is a perspective view of a second on-board battery monitor.
Figure 22B:
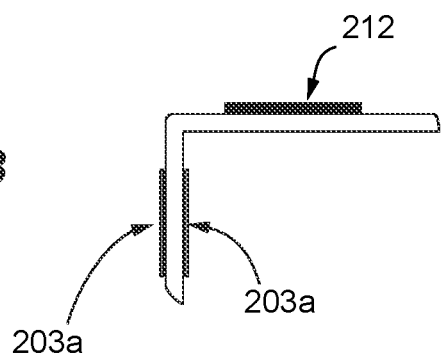
FIG. 22B is a side view.
Figure 22C:
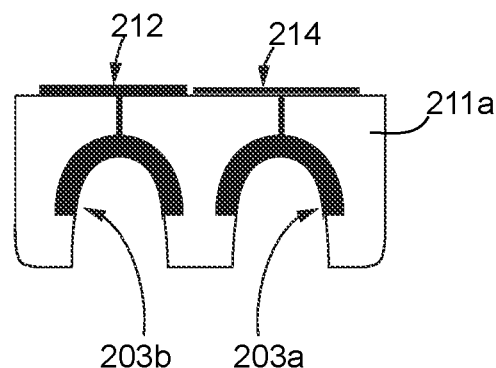
FIG. 22C is an end view of the battery monitor device.

FIG. 22A is a top view of a second on-board battery: beacon monitor 211 for use with disposable battery cells; in this case for use with standard 9V cells. FIG. 22A depicts a clip-on battery monitor in piggyback electrical contact with a disposable 9V battery. Chip 212 is configured as a controller to monitor voltage, make timely RF signals, and to store a simple program instruction set in on-board EEPROM or other non-volatile memory such as Z-RAM. FIGS. 22B and 22C provide side and end views of the clip-on device that operates in parallel with an external circuit or load. The advantage of this device is that it may be retrofitted on existing batteries where the case dimensions allow, converting dumb disposable batteries into smart members of an IoT local cluster with essentially no effort and minimal expense. The battery with radio jacket slips into a host asset and begins broadcasting a unique radio identifier that allows it to be found and tracked.

Shown is a folded or flexible PCB with electrical contacts to the battery poles, a radiobeacon chip with solid state RF oscillator and supporting voltage monitoring circuitry, and an antenna 214. Also shown are connectors 203*a* and 203*b* that clip over the topside poles of a conventional 9V alkaline battery.

The contacts to the battery poles are interference fit when installing the battery monitor on a 9V battery so as to ensure electrical contact with both poles is made. The wire leads of the smoke alarm are typically then pressed onto the poles: further ensuring a solid contact. A quick functional test during setup is performed to validate the installation. Circuits may be designed that require a defined polarity; in this instance the contacts are tabbed so that the installation cannot be inadvertently reversed and a diode is used to protect the circuitry in case it is forced onto the poles in reverse polarity.

The radio antenna 214 is disposed on an outside surface of the clip-on body 211a and is not in direct contact with the wall of the battery. Battery monitor clip-ons having the capacity to closely conform to the shape of the battery they are to monitor is an advance in the art and a part of the invention. While a loop antenna is shown for illustration, dipole antennas, ceramic antennas, whip antennas, and other antenna types may also be used.

FIG. 23 is an assembly view of an adhesive flex patch circuit 2301 and a method of use in which the adhesive flex patch is adhered to a 9V alkaline battery 2310 so that in the completed assembly, conductive foil tabs on either side of the head of the flex patch are in electrical contact with the cathode 2311 and anode 2312 of the battery. The tabs may be made of a layer of conductive foil under an insulative flexible layer and may be coated on the underside with a conductive adhesive where they contact the poles. With these connections secured, battery condition and location can be monitored as long as there is power in the battery. The circuits are designed to draw a minimum of current and make use of sleep protocols so that battery life is not significantly shortened. Unlike the 9V batteries they attach to, generally these circuits may be re-usable several or many times.

The adhesive flex patch 2301 consists of a flexible PCB backing 2302 and a circuit 2303 with flexible and foldable leads 2304 and 2305. The leads 2304,2305 are shaped so that installation can only be accomplished by attaching the correct lead to each of the power terminals of the battery. Electrons necessarily flow from the anode 2312 via lead 2305 to the cathode 2311 via lead 2304 through the circuit 2303 during operation. The patch includes an insulative underlayer and coverlayer to avoid stray shorts when in use. The thickness of the patch is thin enough to be useful with a wide range of appliances, device and toys for household use, including smoke detectors (termed here sensu lato, a "load").

The circuit will include a processor, instructions in memory which when executed by the processor cause the circuit to operate, and a radiobeacon programmed to broadcast an intermittent beacon signal and optionally to receive radio instructions. Typically the radiobeacon is a Bluetooth radio that transmits a radio unit identifier at a regular periodicity, but may also include transmission of data, such as battery condition. Other sensor data may also be transmitted if other sensors are included in the circuit, for example an accelerometer or heading sensor that include a gyroscope and compass, as is useful in updating location. The radiobeacon signal is a homing signal, and allows Bluetooth radiosets in proximity to detect the beacon device and to estimate its position and range. For example, a smartphone may be used to home in on a beacon device by following the beacon signal. In some instances the smartphone or other radio can transmit a command to the beacon device, causing it to emit a tone if the circuit also includes a piezo speaker, for example. This combination of radio tracking with audio confirmation is a powerful tool for finding a lost radiobeacon. When the battery is inserted into a camera or toy, the radio/battery combination transmits a homing signal that can be tracked by a smart device, even when moving. Crowd sourcing of location information using radiobeacons is described in our earlier patents, including U.S. Pat. No. 9,392,404 titled "Tracking device program with remote controls and alerts", U.S. Pat. No. 9,774,410 titled "Radiobeacon Data Sharing by Forwarding Low Energy Transmissions to a Cloud Host", U.S. Pat. No. 9,961,523 titled "Beacon-Mediated Context Sensing", U.S. patent Ser. No. 10/580,281, titled "Tracking Device System", U.S. patent Ser. No. 11/145,183 titled "Tracking Device Programs, System and Methods", and in a number of related patents that were co-assigned at the time of this filing and are incorporated herein in full by reference. As shown here, the device is embedded in or printed on a foldable and flexible substrate, where folding or flexing may be realized in at least two planes. Folding a connective tab or tabs over a top corner of a 9V battery is achieved with a foldable or flexible substrate or laminate. The end tab or tabs is formed so that the connections to the anodic and cathodic poles cannot be made interchangeably and the correct orientation of + and − polarity is unmistakable to the end user. In some instances the tabs are foil leads and are laminated so as to be re-usable several times with normal wear and tear.

When used with a smoke detector, the device 2301 allows the user to monitor battery condition automatically on a smartphone, for example. Location of the smoke alarm is generally fixed and is tabulated when more than one smoke alarm is being monitored, but the status of battery condition changes over time and is monitored by the system. An "App" is installed that receives the radiobeacon signal, identifies the unique radio identifier, and with the user's help, associates the radiobeacon signal with a particular smoke detector, for example in the master bedroom or garage. The smartphone will then continue to receive periodic updates of battery strength and will recommend replacement when the battery is close to it lower limit of charge. The smartphone can also relay events such as a smoke alarm alert to a user who may not be at home at the time when used in conjunction with a cloud system as described in the cited patent references above.

When used inside a toy, appliance or other load, the device 2301 is operated in concert with an "App" installed in a smartphone, for example, or other smart device, and monitors the power condition of the battery, but also enables the user to search for the misplaced toy, appliance or other host asset by tracking its radiobeacon signal. A cloud host may be resourced to enable tracking over extended distances as described in the cited patent references above. The radiobeacon device may comprise a buzzer or piezo speaker, and may be configured to receive a radio command from a smartphone or cloud host that results in activation of the buzzer or speaker as an aide in locating a missing item when in audible range of the device. In other instances, the location of the device may be displayed on a map generated on a smartphone or other smart device as an aid in tracking a missing host asset. The proximate audio signal complements the mapping capabilities in simplifying the finder functions of the system for the user.

FIG. 24 is an assembly view showing an adhesive flex patch circuit 2401 and a method of use in which the adhesive flex patch is adhered to a pen cell battery 2410 so that in the completed assembly, tabs 2402,2403 (dashed lines) on either end of the flex patch are folded down (arrows) over the battery contacts so as to be in electrical contact with the anode and cathode of the battery. The tabs may be made of a layer of conductive foil under an insulative flexible layer and may be coated on the underside with a conductive adhesive. With these connections secured, battery condition and location can be monitored as long as there is power in the battery. The circuits are designed to draw a minimum of current and make use of sleep protocols so that battery life is not significantly shortened. These device find use in radio tracking of assets such as cameras, radios, toys, bicycles, in short any battery-powered appliance or load that is capable of receiving a pen cell battery. Crowd sourcing of location information using radiobeacons is described in our earlier patents, including U.S. Pat. No. 9,392,404 titled "Tracking device program with remote controls and alerts", U.S. Pat. No. 9,774,410 titled "Radiobeacon Data Sharing by Forwarding Low Energy Transmissions to a Cloud Host", U.S. Pat. No. 9,961,523 titled "Beacon-Mediated Context Sensing", U.S. patent Ser. No. 10/580,281, titled "Tracking Device System", U.S. patent Ser. No. 11/145,183 titled "Tracking Device Programs, System and Methods", and in a number of related patents that were co-assigned at the time of this filing and are incorporated herein in full by reference.

The Bluetooth radiobeacon includes an antenna that is molded into the laminate or formed of a lead on the printed circuit board. The antenna may also be a compact ceramic antenna that is surface mounted on the board. Care is taken in designing the antenna to optimize efficiency of transmission (and reception) so that energy is not wasted. The beacon may broadcast once every ten seconds for example, and by careful consideration of the energy budget, can last for weeks or months in use.

A battery with radiobeacon attached may also be placed in a plastic bag or a sock for example and put in a backpack, jacket or other item so as to enable finding and tracking of host assets that do not require a battery for power. In this way a naked conventional battery is converted to a radiobeacon finder by applying a disposable radio jacket. Range of a Bluetooth radiobeacon may be more than fifty meters in any direction, and a smartphone that has been configured to identify the characteristic radio unique identifier in a beacon broadcast will find and track the lost asset. Proximity can result in an audible notification as the RSSI increases, or the location can be mapped to a display.

The flex patch draws a minimal amount of power from the battery for operation of a radiobeacon circuit 2405 in the body of the flex patch. The circuit is mounted on a flexible circuit board the ends of which are designed to be folded over the ends of the battery. Each adhesive end is identified with a + or a − to indicate proper orientation on the battery. Like the pencell batteries, generally these circuits are disposable, but it is possible to envisage a product that is re-usable several or many times. In some instances, the adhesive radiobeacon circuits may be used with rechargeable batteries and will contain diodes to ensure the circuits are not damaged during recharging.

Thin fold-down end-tabs used to make an electrical connection between the PCB and the battery poles may include a layer of foil with an insulative overcoat and coated at the poles on the underside with a sticky electro-conductive material so as to adhere to the battery end poles. Folding or flexing the end tabs over the top and bottom cylindrical edges of the battery is achieved with a foldable or flexible substrate or laminate. While shown here as a bullet shape in plan view, the tabs may also be "lollipop-shaped" for example, so as to be more readily folded onto the battery pole connections.

In other embodiments, the adhesive patches 2041 are provided with foil tabs that serve as full-thickness electrically conductive end piece through-contacts 2402,2403 so as to allow the end user to form Voltaic piles by stacking the batteries end to end, as is often needed to sum the voltages of multiple batteries, while providing one battery in the stack with radiobeacon capability and antenna 204. When used in a series circuit, monitoring any one battery is indicative of the condition of all the batteries in the series voltaic pile.

Similarly, when purchasing batteries in larger units by lot, a battery monitor affixed to any one battery of the lot is generally representative of the condition of all the batteries. Thus the user may monitor battery quality of many batteries simply and effectively with a single battery monitoring system of the invention. This attachable device readily converts any battery to a smart IOT battery and is re-usable.

Figure 25:
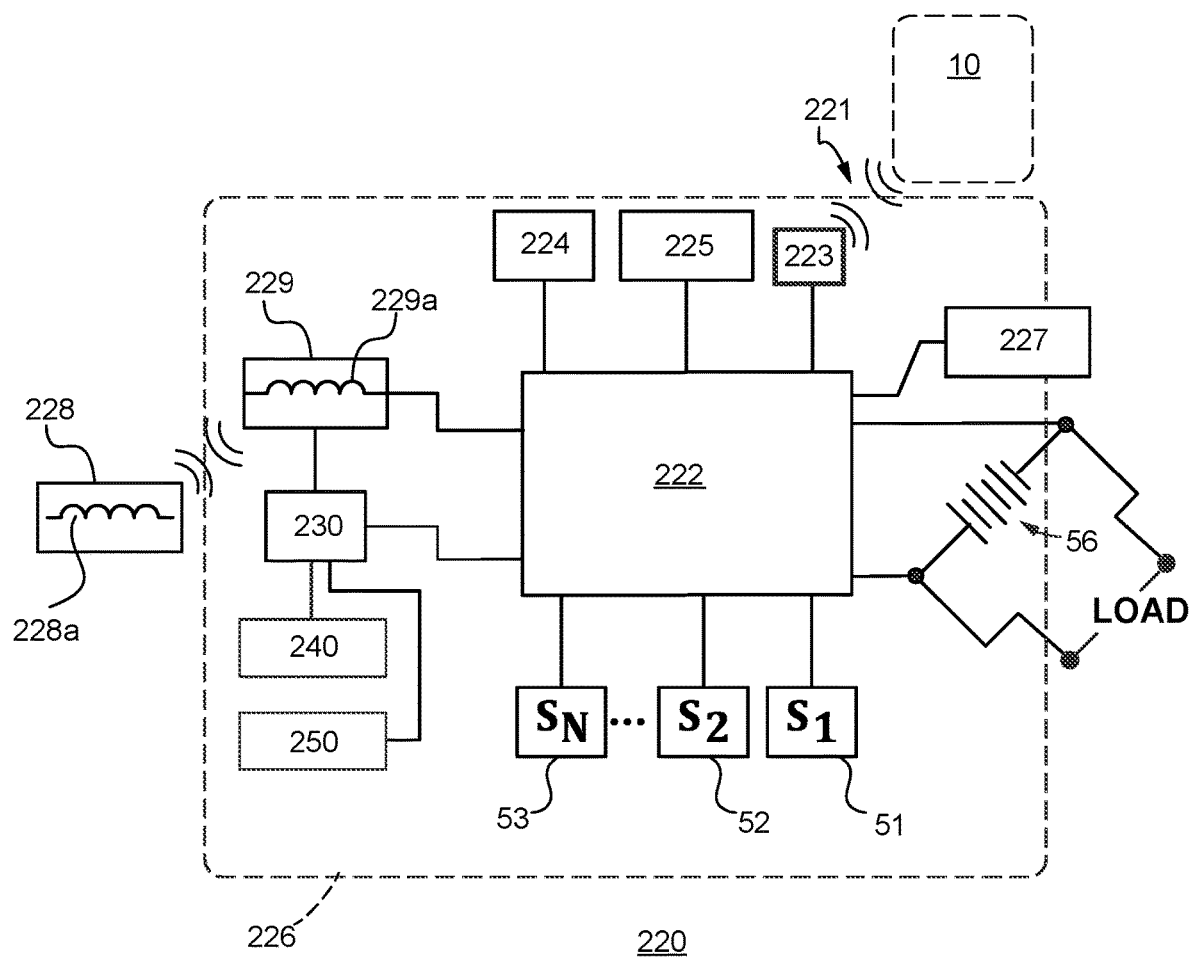
FIG. 25 is a schematic showing an embodiment in which battery recharge is mediated by a radio antenna and rectantenna circuitry in the battery, or by a solar cell.

FIG. 25 is a schematic showing a preferred embodiment of a battery:beacon combination 220 in which battery recharge is included and the radiobeacon is a transceiver capable of bidirectional radio communication 221. FIG. 25 shows the component circuitry of a preferred device, including a Battery Control Circuit and local area, low energy TransCeiver (BCC:LALETC) core device 222. The core device 223 includes a ceramic antenna serving as part of an on-board transceiver for sending and receiving information signals and control signals. The core device also includes a microprocessor, read only memory for storing program instructions and random access memory sufficient to enable the core device control the other components on the battery: beacon, including battery management functions such as circuit overload, charging, and fuel gauge functions. In a further embodiment, a permanent memory device is added to the device to record battery use history and any sensor data.

The core device 222 is assigned a unique identification code (UUID) known to the user's local network and local cluster. The core device broadcasts a pulsed radio message with the code at periodic intervals. The maximum range of the local area, low energy radio transmissions 221 is approximately 300 feet. In this embodiment, broadcasts are made using a ceramic antenna 223. The ceramic antenna saves space. A typical ceramic antenna may take up only 20% of the space occupied by a patch or dipole antenna, thereby contributing to the overall small size of beacon circuit in the battery.

The core device 222 controls a speaker 224 and a light emitting diode (LED) 225. The speaker 224 and the LED 225 provide alarms or audible responses for the tracking device 10 and assist in physically locating the device during a search, such as when the device is missing and is in a jacket pocket. The device housing 226 is thin enough to allow light to pass through and the sound is easily located. In alternate embodiments a clear, colored, or highly translucent "window" is provided in the cover above the LED 225 to aid in searches after dark.

The core device 220 is connected to one or more sensors 51,52 or any number of sensors 53. The sensors detect and report one or more physical parameters experienced by the tracking device 220, including but not limited to switch status, displacement, motion, acceleration, heading, electromagnetic radiation, radioactivity, temperature, sound, pressure and other physical parameters, for example. In some embodiments, a sensor 53 is a combined 9-axis motion sensor and temperature sensor. The sensor 53 has an accelerometer, gyroscope, and magnetometer for each axis. The information output by the 9-axis sensor enables the receiver to track the motion of the tracking device from one location to another location. The motion of the tracking device can be monitored continuously as long as one or more receivers are close enough to capture, record and report the motion output information of the 9-axis sensor 53 to a cloud server. As an alternative, the information may be stored in the memory for later upload.

A multi-function button 227 is operable to perform one of more functions described in more detail below. The single button 227 on the tracking device 220 and one or more control programs resident on a monitoring 10 device (for method see FIG. 19) operate together to set one or more alarms, contextual triggers, and remotely control operations of the smart device 10 or other remote machine 200 or 300. Those skilled in the art will grasp that a smart device may be any electronic device with processor, memory and communication ability including and not limited to a smartphone, a desktop computer, a laptop or notebook computer, a tablet computer, a personal digital assistant, or any equivalent device that can store and hold programs and data, execute programs, receive and/or transmit information and commands via wired or wireless channels of communication, but may also include machines in general having a smart interface and some capacity to make computations, store and retrieve data, and report status. The multi-function button 227 may have fewer positions than a keypad, but may be linked to contextual values such that more complex truth tables can be communicated, such as "DARK" (from a photocell) plus button switch OPEN=flashlight on, but "LIGHT" plus button switch OPEN=speaker on.

In some embodiments the units are equipped with batteries that may be wirelessly recharged with inductive or solar powered chargers. Wireless chargers 228, also known as induction chargers, typically place one coil 228a in a charging device or pad that is connected to an AC power source and another (receiver, 229) coil 229a inside the device with a rechargeable battery.

Also shown in FIG. 25, a transmitter module 228a has a transmitter coil 228b that produces a time-varying electromagnetic field that is coupled to a receiver coil 229b of a receiver module 229a on the device circuit board. The receiver module 229a also includes circuitry 230 to regulate and convert voltage and to convert AC current to DC current if needed. The core device 222 controls operations of the receiver module 229a and turns it on and off to recharge the battery 56 as needed. Inductive transmitter and receiver modules are available from a number of integrated device manufacturers.

Other embodiments of the invention may have wired rechargers. These are well known devices and may be incorporated into tracking devices 220 by providing a suitable port (not shown) to receive power from an external power source. However, such external ports provide openings in the cover through which water or other fluids may gain entry to the cavity holding the PCB 12 and its component circuitry.

Still other embodiments may have solar recharging systems 240. One such solar recharging system has one or more solar cells located on respective covers of the housing 226 and connected to a regulator 230 and battery fuel gauge circuit in the core chip 222 and to the rechargeable battery 56. The core device 222 uses the solar current to know whether the tracking device is in available light or not. Solar cells have a dual role by acting as light sensors. This allows flexibility in configuring notifications to the user by pairing sensor data and other contextual data to the presence or absence of light. The amount of current generated by the solar cells is indicative of the intensity of the light falling on the beacon sensor. This allows further flexibility by pairing any other sensed parameter to the presence or absence of light. The amount of current generated by the solar cells 240 indicates the intensity of light received by the tracking device 220.

Other embodiments of the tracking device have circuitry 250 for harvesting RF power to charge the battery 56 including MHz, GHz and terahertz emissions. A rectenna is integration of antenna and rectifier, as reflected by the name. The device can be used to convert RF energy to electrical energy. At the DC output side there is a DC pass filter to attenuate high order harmonics generated in rectification. Other embodiments of the battery monitor device have circuitry for harvesting local RF emissions for power to charge a capacitor that operates the radiobeacon pulse timer and emission circuitry. At http://www.hindawi.com/journals/apec/2010/591640/there is described an RF harvester 250 having a GMS antenna, one or more resonant circuits, boosters, peak detectors and an adder. The circuitry contains passive components and is designed to have tuned circuits at known frequencies of cell phone towers (960 MHz) and Bluetooth devices (2.4 and.or 5 GHz ISM bands). The boosters are Villard voltage multipliers. Reported test results show the RF harvester located within 500 meters of a cell tower was capable of generating 0.16 microWatt and successfully operated a calculator and a light emitting diode.

A combination battery:beacon combination and battery charger relying on RF power harvesting is also contemplated. Related advances include Dickson cascade diode capacitor circuits, charge pumps, Karthaus-Fischer cascade voltage doublers and rectennas known in the art. Because these RF sources operate continuously, potentially the tracker beacons can operate continuously in urban areas without being plugged in for a recharge.

Other embodiments of the invention may have wired rechargers. These are well-known devices and may be incorporated into beacon devices of the invention by providing a suitable port (not shown) to receive power from an external power supply. However, such external ports provide openings in the housing that are less desirable and hence indirect charging means are preferred. The rechargeable batteries may be kept topped up for extended emergencies and their condition may be monitored via smart device 10.

Integrated circuits may also include battery control circuits (BCC). A BCC may monitor the state of the battery as represented by various items, such as: [voltage: total voltage, voltage of periodic taps, or voltages of individual cells; temperature: average temperature, or temperatures of individual cells; state of charge (SOC), or depth of discharge (DOD) to indicate the charge level of the battery state of health (SOH), a variously-defined measurement of the overall condition of the battery, and current: current in or out of the battery]. These indices are increasingly important as more batteries become rechargeable and also serve to address safety issues that dog the industry.

Figure 26:
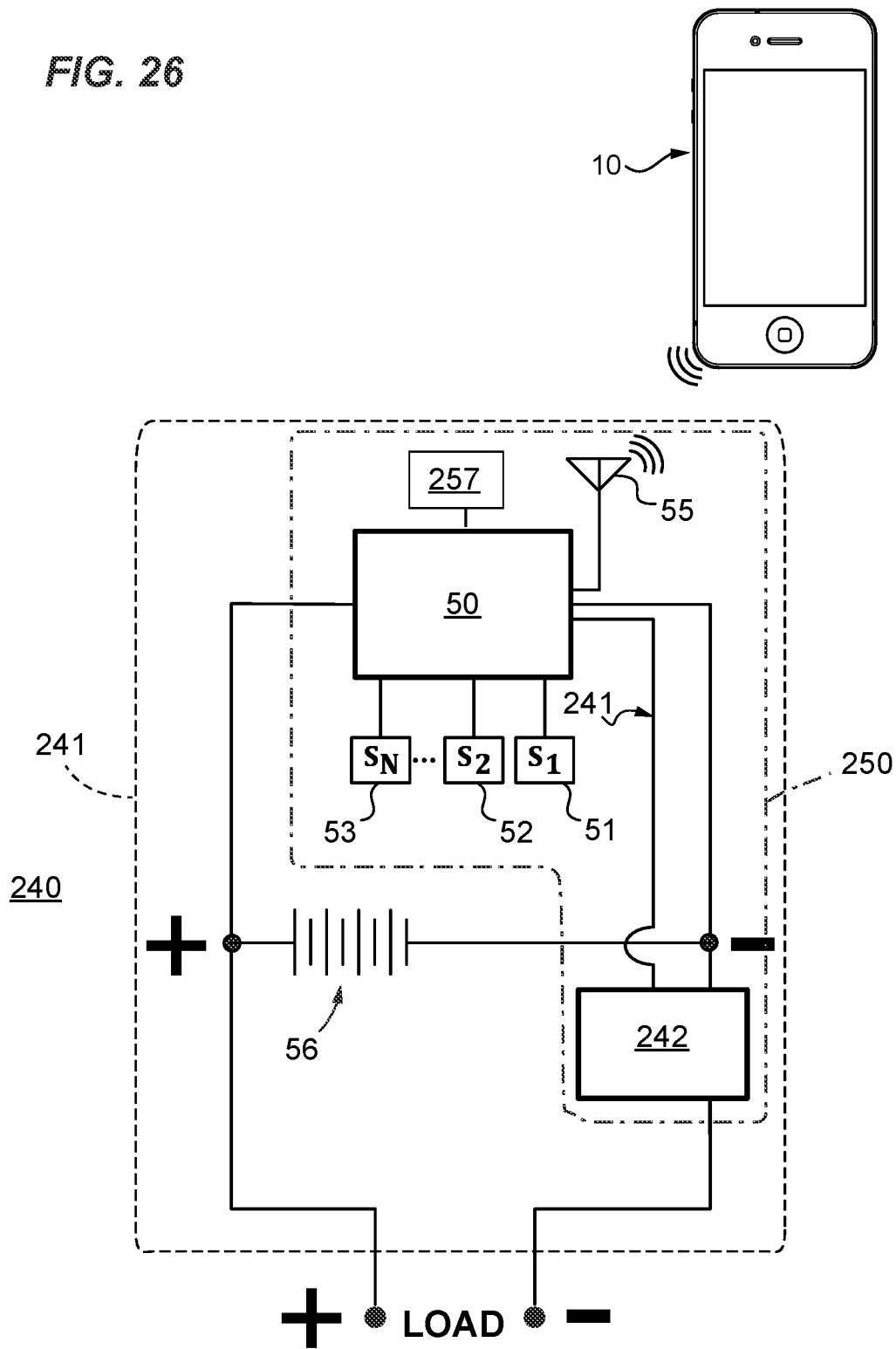
FIG. 26 is a schematic of a battery circuit with radioset in a battery housing. The radioset is in communication with a controller.

FIG. 26 is a view of a device 240 with radiobeacon circuit 250 in a battery housing 241. The battery is generally selected from those commonly used as disposable power supplies, such as double-A, triple-A, 9V, pen cell, and so forth. The voltaic pile 56 is connected in parallel to a radiobeacon circuit centered on a processor 50 and is electrically attachable to a load. However, the load may be cut off from the anode by switch 242, which is controlled by the processor 50, typically involving local or cloud-based radio access and control via antenna 55. The antenna may be built into the housing 241 or applied in layers on the outside of the housing and covered with a radiolucent jacket.

Also shown is a smart device in radio communication with the processor 50 of the radiobeacon circuit. The smart device is provided with program instructions that supply a graphical user interface for operating switch 242 remotely. The program instructions may also be preset to respond to sensor data received by processor 50 from sensors $S_1$, $S_2$ . . . $S_N$ (51,52,53). Sensors may include battery monitoring sensors, but also voltage sensors, photocells, motion sensors, audio sensors, voice digital signal discrimination sensors (DSP), smoke sensors, proximity sensors, and so forth. The smart device is typically provided with the application via a distribution service, such as Google Play and the like. In some instances, an administrative server is used to build a network that provides additional services such as television program information, locations of individuals as described in U.S. Pat. No. 9,392,404, incorporated here in full by reference.

Analogously to as earlier described with respect to FIG. 5A, and as can be seen here, a solid state processor 50 may be supplied to control most of the circuits shown here. An ASIC having the needed functionalities for bluetoothed radiobeacon operation is used. The transmitter/encoder may be a module and powers an antenna 55 in the battery housing wall or on the PCB. The radiobeacon circuit 250 takes power from the power cell 56 that is to be monitored and operated, such that circuit 250 is wired in parallel with the load (LOAD). The "load" is defined by an appliance receiving power from the battery. Generally, these are portable battery powered machines and electronics such as toys, remote control units, walkie-talkies, battery-powered lanterns, smoke alarms, radios and sound boxes, drones, flashlights, Christmas decorations, and so forth that can now be activated or inactivated remotely using the radiobeacon in the battery. Using miniaturized solid state circuits, sophisticated battery functions are performed so as to make their use in DC circuits more popular and add value to the battery as a rechargeable control unit. Within the battery:beacon combination 240, a battery health monitoring circuit may be modularized as indicated here by a series of sensor modules $S_1, S_2 \ldots S_N$, (51,52,53) where $S_1$ may be a low voltage threshold detector, $S_2$ may be a thermal overload detector, and $S_N$ may be motion sensor, for example. Alternatively, some of the sensors may be integrated into the chip. For example, by including a GPS sensor, the transmission of the radiobeacon may include location-specific information that can be directed to local fire responders through a proximate user WWAN device or hub to a cloud server that never sleeps. The chip 50 is set up to encode the sensor data content in a formatted message and to generate a broadcast according to a trigger or to a clock schedule. Subcircuit 257 may be an inductive recharger for example.

Effectors may also be associated with the chip. Control line 241 connects to a solid state switch 242. The switch is controlled by the processor and may be used to connect and disconnect power from the anode of the battery. When disconnected from power at switch 242, battery power is effectively "killed" and cannot power the load. The radiobeacon circuit is still powered, but the supply of electrons to the exterior anode on the housing is blocked at the switch 242. It is believed that this can prevent accidental battery drain in toys for example, when lack of motion is treated as a signal to turn the toy off.

Switch 242 has two states, an open switch state in which the battery is not electrically connected to the load, and a closed switch state, in which the battery is electrically connected to the load. The selection of the state of the switch is made via smart device 255 as described below.

This simplified block view includes a local area, low energy core device 50. The core device includes a transmitter for sending radio signals and may also be enabled for sending control signals to other devices in a local cluster. Optionally, the core device may be specified to include a transceiver for receiving data and control commands from a master host device. The core device generally includes a microcontroller, read only memory (ROM) supplied with a programmed instruction set, random access memory (RAM) sufficient to support rudimentary control, or may be provided with firmware sufficient for basic functions. In current practice, integrated devices that support Bluetooth local area, low energy radiobeacon transmission protocols (BTLE) are used.

Figure 27:
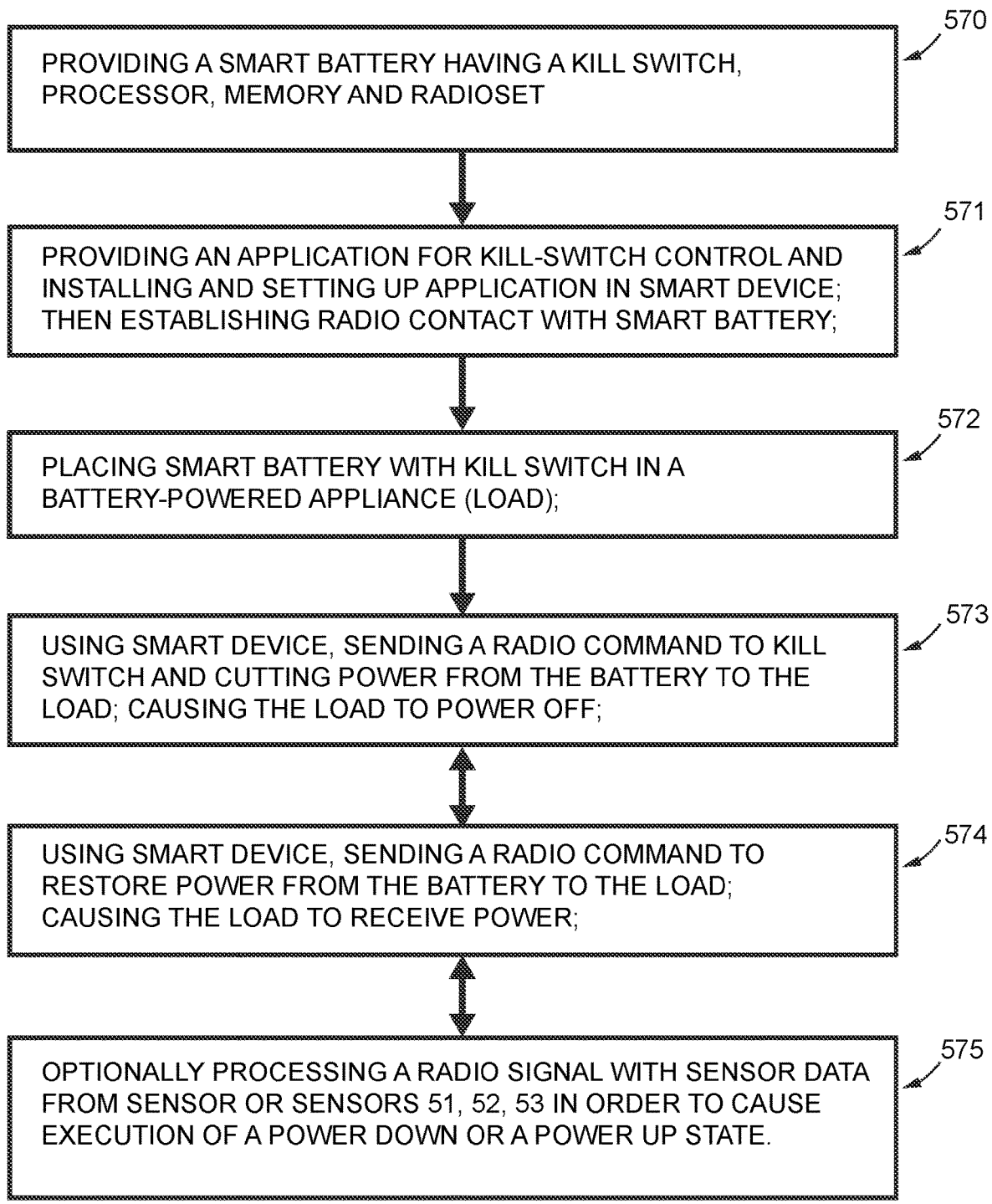
FIG. 27 is a flow chart describing the working of a smart battery with radio controlled kill switch.

FIG. 27 is a flow chart describing the operations involved in a method of using a smart battery with internal kill switch, a processor, supporting logic circuitry, and low energy radioset. The battery is installed in an appliance in place of a conventional battery. An application is copied to, installed and executed in a smart device, first going through a setup menu to identify the radioset in the battery by a digital ID and then to name the battery a "nickname" in a user interface. The application is then accessible via an icon on the user menu and displays a virtual button switch that will send a command to the battery. The first command may be to disconnect the battery from its load (an appliance, for example); the second command may be to restore the battery circuit that powers the load. This can be accomplished with a FET transistor wired to a processor in the battery. The battery processor is always on, but requires only a small resting current and will wake up when a command directed at the radioset ID is received. The processor can then open or close the transistor to turn off or turn on power to the appliance. Optionally, the smart battery will contain sensors that monitor battery function, and the processor can open the kill switch if a serious condition develops that makes disabling the battery important. The processor can also send an alert to the smart device and provide notifications in the form of a status report is the user so chooses. In one example if its usefulness, the smart device can be used to turn off the low battery audio alert that is sounded by smoke detectors when the battery is weak. Being able to turn the alarm off for a period of time allows the user to schedule a convenient hour to replace the battery. And in a preferred embodiment, the processor will notify the user of the low battery condition before the smoke detector goes into alarm. Similarly, the processor can notify the user if the battery is being drained by an actual smoke alarm that indicates smoke. The user can quickly consult a table of smoke alarms in a structure, or receive a notification, as to the location of the smoke detector in alarm, speeding an effective response. Thus giving "nicknames" to the appliances having smart batteries opens up a whole new vista in interacting with a home network, allowing the user to develop a familiar language used by the battery to keep the user up to date about not only battery condition, but also any sensor data that the battery is enabled to provide.

In more detail, the modified battery is supplied 570 with an application 571 that installs onto a smart device, termed here a "master host device". The battery is then loaded into an appliance 572 where it is needed. The application listens for a bluetoothed signal from the battery, records the UUID of the broadcast, and allows the owner of the smart device to turn on or off the battery current to a load 573 if desired, or turn on the battery 574. The concept of "turning on" a battery when needed has not generally been recognized but has value in increasing battery life by preventing leakage current. Thus a battery-powered appliance becomes supplied with a switch, the kind of switch that just like a wall switch, can be toggled to turn on or turn off the light of a lantern, for example. Generally, a user interface is provided that tabulates the UUID of one or more of the batteries and their locations or functions, and allows the user to select one or more to activated or inactivated. A daily or weekly schedule may also be programmable, including options for vacation shutdown, and so forth. Because power to the processor of the radiobeacon is not affected by shutdown of power to the load, the battery radio remains fully operational can be put in sleep mode when inactive and woken up at any time by a ping from a master host device. Similarly, the battery will broadcast a bluetoothed message to the host device on a regular schedule so that the owner can monitor use, condition of the battery, and also quickly find the appliance (if misplaced) by monitoring radio signal strength (the "hot or cold" approach) or by ordering the battery to emit a programmable audio such as a gong or a voice that repeats and leads the user to its location. And in a preferred application, the battery can be supplied with sensors that provide input for automated features 575 such as a thermostat or an outdoor lamp.

Figure 28A:
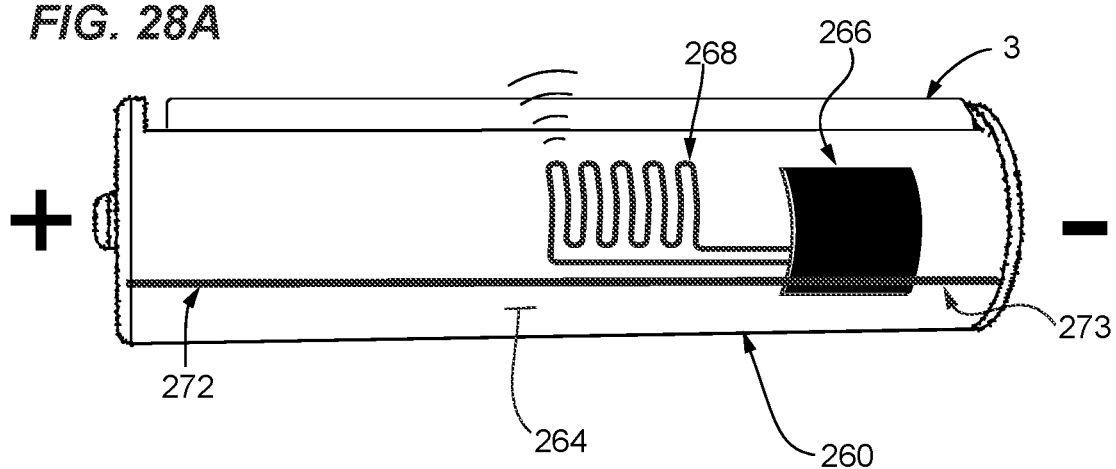
FIG. 28A is a perspective view of a radiojacket that includes a processor, executable instructions, a radioset and a kill switch. The radiojacket holds a battery in a battery sleeve.
Figure 28B:
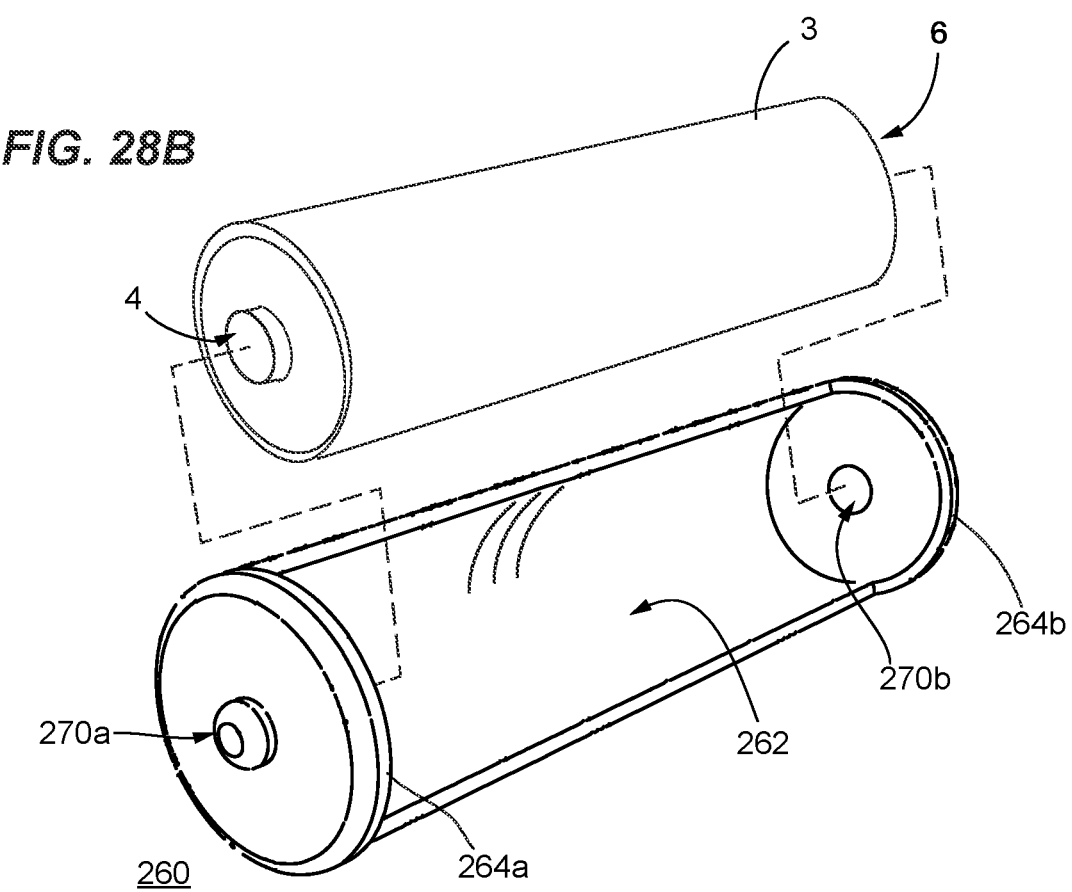
FIG. 28B shows how the battery is seated in the radiojacket.

FIG. 28A is a perspective view of a radiojacket that includes a processor, executable instructions, and a radioset. By supplying a radiojacket with the same features as a smart battery, existing batteries can be retrofitted with smart features such as the capacity to interact with the IoT. The body is formed as a thin jacket 260. End caps (264a,264b, FIG. 28B) cover the cathode and anode of an AA battery. Conventional AA battery 3 is fit into the jacket and seats inside cylindrical cavity 262. FIG. 28B shows how the battery is seated in the radiojacket. The central cavity 262 is provided and is configured so that the battery fits in the pocket while establishing electrical continuity between the poles of the battery and two contacts (270a,270b), one on a cap at each end of the radiojacket. The contacts extend through the end caps (264a,264b) so as to provide a conductive path from the battery poles to an external circuit connection. FIG. 28C is a view of a radiojacket 260 in which the battery sleeve is empty.

In a variant on the radiojacket of FIG. 28A, FIG. 28D shows a kill switch embedded in the jacket between external connections 270a and 270b. The kill switch 582 is a single-throw switch that can interrupt external circuit flow of electrons from the anode 6 via connector 270b to the cathode 4 via connector 270a while not interrupting power to the processor. Kill switch 582 is operable by the processor 584, and hence can be radio controlled.

FIG. 28D is a partial schematic showing a switchable circuit built into a radiojacket 580 to connect the battery cathode 4 and anode through a kill switch 582 under control of a radioset and processor 584. One lead 581a extends from an internal contact with the cathode, through the kill switch, and back 581b to the cathodic end of the jacket to provide power to the external contact when the kill switch is closed. Also shown is a second lead 592 connecting the anode 6 at the base of the battery to the processor and supporting circuitry; thus enabling a continuous power supply to the electronics even when the kill switch is off. An antenna 586 is applied on an external surface of the sleeve. FIG. 28E is an end view of the radiojacket 580 with end lead 592 and connection 270b to anode 6.

FIGS. 29A and 29B summarize power circuitry that includes a radio-controlled kill switch 582. FIG. 29B is a detail view in cross-section of the device of FIG. 29A. An AA battery 3 is shown in a radiojacket 580 such that the anode of the battery connects to an external anode 270b, here hard wired into the jacket) and the cathode 4 of the battery is indirectly connected to an external contact 270a. The battery contact at the cathode end 4 is made initially at contact surface 270c and connects via lead 270ii to solid state kill switch 582. This contact corresponds to Kill Switch IN 581a. The kill switch OUT 581b from the emitter connects to the external contact 270a via a second lead 270i that follows the outside surface of the jacket and folds down to connect to the kill switch and processor, completing the circuit so as to power the processor continuously. Connectors 2701 and 2701i are separated by a layer of insulation so that no short circuit can occur across the cathode stack. Lead labelled Kill Switch IN 581a continuously powers the processor and radio while providing switchable power to the external load.

The kill switch may be viewed as a transistor receiving power from the battery and controlling power to cathode 270a. Power received at cathode 270a may be fed to an external load before returning to the anode at connector 270b.

This structure is a re-usable smart radiojacket for a battery. It includes a sleeve body with an anodic end and cathodic end, the cathodic end having a cathode end cap, the anodic end having an anodic end cap and provision for supplying power from an anodic contact on radiojacket to processor 584, transceiver radioset, and supporting logic circuitry. Typically this is supplied by a micro chipset that is mounted on a stiff but semi-cylindrical support matrix. The device is further characterized by a kill switch having an input and an output, a first state in which the input is electrically connected through the switch to the output, and a second state in which the electrical contact to the output is broken. The switch itself includes a is radio controllable switch selector configured to reversibly toggle the switch from the first state to the second state by remote control as caused by a companion application installed on a smart device.

In circuit controller terms, the cathodic open circuit and conductive bypass is made by inside contact (270c,270ii) for receiving power from the battery and an outside contact (270a,270i) for connecting to an external appliance. Two leads extend from the cathode, one each from the internal and external contacts, to a kill switch 582, such that power can pass across the insulating space between the inside and outside contacts only by passing through the switch. And the switch is provided with a switch selector that is radio controlled via the processor 584 and radioset including antenna 568.

The anodic lead 592 (FIG. 28D) is electrically connected to the anode of the battery and the processor with supporting circuitry so that the processor is always alert and can periodically send messages without being disabled by an open state of the kill switch. The circuits are powered in parallel.

Figure 30:
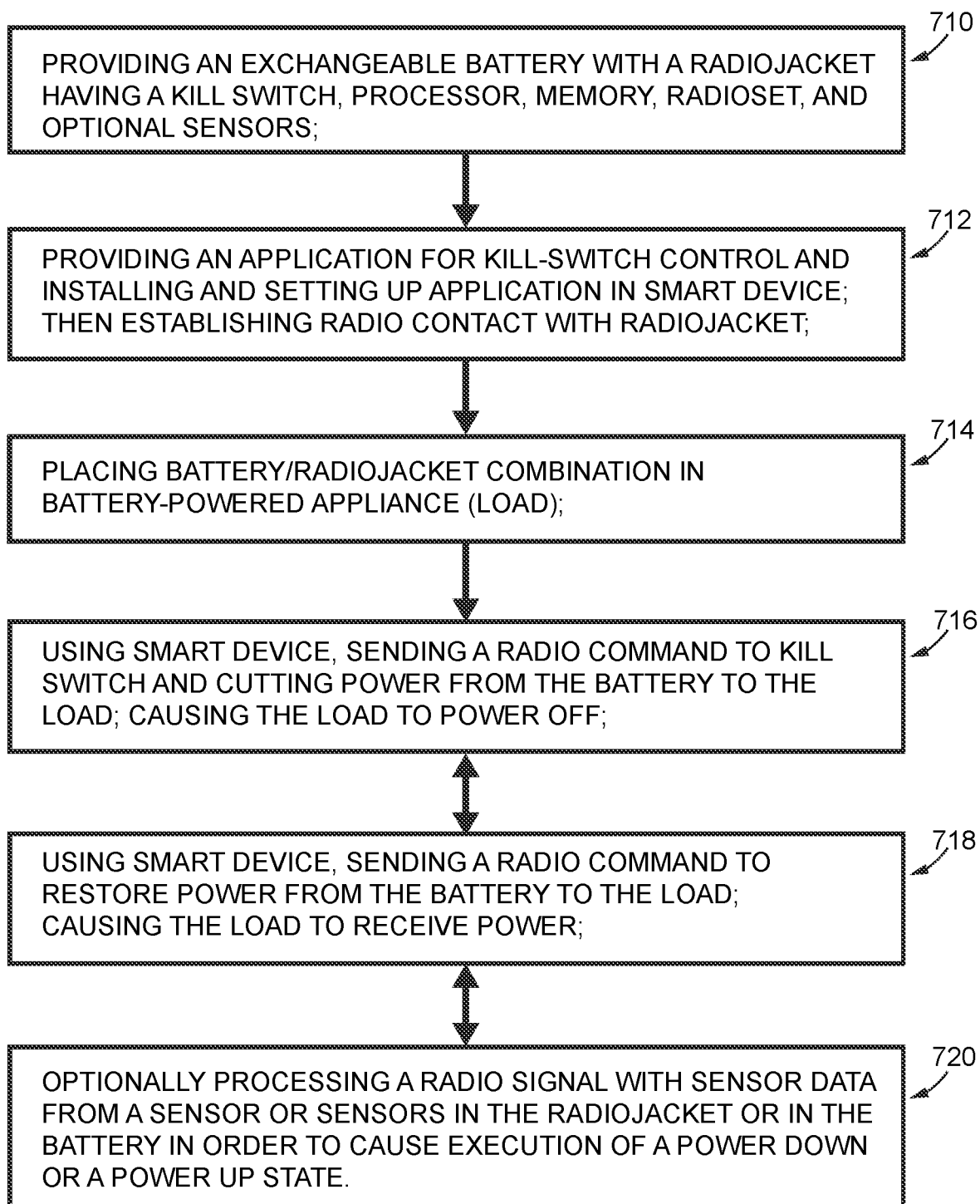
FIG. 30 is a flow chart for using a battery in a radiojacket to control power to an appliance.

FIG. 30 illustrates a flow chart for using an insertable radiojacket onto a conventional battery and then using kill switch in the radiojacket to operate an appliance such as a television remote controller, either manually, automatically, or conditionally dependent on sensor readings from the radiojacket. Use of a low energy radioset ensures that the battery is not exhausted by its radiotransmissions. The conventional battery is installed (710,714) in an appliance with the radiojacket in place and covering the anodic and cathodic poles of the battery. The device is operated using radio control 712. An instruction set, termed here an "application" is copied to, installed and executed in a smart device. The application offers a setup menu to identify the radioset in the radiojacket by its digital ID and then allows the user to name the radiojacket a "nickname" on a user interface. Because the radiojacket is re-usable, the user has the option of renaming the radiojacket according to any current function or place it assumes. The application is accessible via an icon on the user menu and displays a virtual "button" switch that will send a command to the radiojacket. The first command may be to disconnect the battery 716 from its load (an appliance, for example); the second command may be to restore the closed switch that powers the load 718. This can be accomplished with a transistor wired to a processor in the battery. The processor may use flipflop logic and conditional gating to execute the user commands. The battery processor is always on, but requires only a small resting current and will wake up when a command directed at the radioset ID is received. The processor can then open or close the transistor to turn off or turn on power to the appliance. Optionally, the radiojacket will also contain sensors 720 that monitor battery function, and the processor can open the kill switch if a serious condition develops that makes disabling the battery important. The processor can also send an alert to the smart device and provide notifications in the form of a status report is the user so chooses.

Various features, including the outdate of the battery, can be the subject of the notifications. The radiojacket, for example, can be slipped onto an unused battery and will report to the smart device when its expiration date nears or it has weakened below an acceptable level. In this way, batteries kept in emergency kits and the like can be monitored and can be automatically inventoried and tested.

Example 1

A smoke alarm supplied each with a 9V battery began to beep in the late hours of the night. A homeowner groggily got on a stool to replace the battery and went back to bed, but a few hours later, the beep began again because the replacement battery was also depleted. Homeowners typically lack the gear to test battery voltage and maintain stocks of batteries without inventory control. By installing a system of the invention, battery monitoring and replacement may be scheduled at the convenience of the homeowner.

Example 2

All of us who have a battery-operated flashlight in the glovebox of a car will readily admit that at least once on a dark highway, the flashlight was useless because the batteries were dead or weak. By installing a system of the invention, battery monitoring can be automated to better ensure motorist safety. The current flow state of the battery can be set up to limit battery power leakage or to activate a battery on command. A sensor package includes a current sensor and an installation interface can be used to set up control and monitoring of current flow.

Example 3

An emergency kit with a small portable radio was stored in the bedroom of a house, but in a large natural disaster, cellphone service was jammed and the radio did not work because the batteries were dead. By installing a system of the invention, battery monitoring can be automated, saving needless worry.

Example 4

A glucose monitor is supplied with a notification system of the invention. The battery:beacon combination device is installed in and powers the glucose monitor. When activity is noted, the device increments a count and returns a flag to a processor. Under control of the processor, the beacon is activated and the activity is encoded for transmission. Transmission results in actuation of a rules-based application on a smart device or a server of a network. If regular activity is not noted, such as a missed test, the smart device or server will issue a notification to a user.

Improvements may also be implemented by an application provider or network operator that result in a query being issued to the glucose monitor, such as over a wireless system, interrogating the monitor to supply the last test result and the timestamp associated with the test result, and result in a notification to a user or a caregiver if the result is less than 70 mg % or greater than 160 mg %. Nuisance alarm code may also be provided, such as contextual data indicating that a battery:beacon combination operatively associated with a diabetic needle device has been actuated in the event the glucose level is moderately elevated and appropriate actions have been taken by the user.

Example 5

A toy such as a teddybear 320 as shown in FIG. 19 is supplied to a child in a crib. The parent uses a disposable battery with motion sensor combination in the toy to monitor child activity and to provide an alert if activity becomes excessive or ceases. For convenience, the motion sensor is in the battery. Contextual data may also be provided to add "smarts" to parental alerts, allowing the parent to assess the necessary attention level and judge the nature or "cause" of a notification. Notifications may be based on a combination of motion data and a counter, so that duration may be reported in the notification alert as well as a timestamp when the alert threshold was triggered.

The toy comes with an application that promotes interactions with the child. In some instances, the application may be programmed into the battery and operate in conjunction with programming in a master host device such as a smart phone, home hub, or laptop. The toy bear may invite the child to hug it and make a rewarding sound via a voicebox sound controller 321 (the load on the battery) if it is hugged as detected by a motion sensor and may plead for more attention if no interaction is detected by the battery-mounted motion sensor. In another instance, an older child may be provided with a smart tablet and may be able to play hide-and-seek with the teddybear because the smart tablet will display, hot or cold, whether the child is closer or farther from the radiobeacon in the battery. Interestingly, the teddybear may be initially purchased with a relatively low level of interaction capacity, but by providing a battery:beacon combination having one or more sensors and by downloading and installing an upgraded application into the rechargeable battery, the teddybear may "grow" with the child. The toy will literally become smarter without the need to discard it and buy a new, better one. The battery may be kept for years instead of being disposed of, and may even be transferred to other toys or given other tasks that require a smart battery. The child or the parent can select from a palette of games to play by pressing a multifunction button on the battery before installing the battery.

In other uses, the battery may be placed in a remote control for operating the toy, or for operating a television, and the parent can access and see a chart of data that indicates the child's activity levels and interests, ensuring that the child's development is vigorous and active.

Example 6

Sets of tools are needed for adults to complete their work, such as assembly or construction. Tracking these tools may be handled with a proximity detector that ensures they are returned to their storage stations between shifts. Similarly, the battery sensors may be configured to detect unusual vibrations or heating consistent with the need for preventative maintenance. The battery may also provide a counter to measure total time in use, another indicator that may be used to plan servicing based on the actual cumulative "duty cycle" of the tool. Advantageously, the radiobeacon also makes collecting the tool for servicing easy because the beacon signals where the tool is.

Example 7

A battery:beacon combination essentially as drawn in FIG. 2 was constructed and tested. When operated in beacon mode with intermittent pulse transmission of ID and major and minor frames, reception was patent using a compatible receiver, and the signal could be decoded at more than 150 ft away. Further distance was achieved by stepping outside a building through a heavy commercial door. Even in a noisy outdoor environment, signal reception was "five by five" and decoding was without error. In a noisy radio environment, sensitivity to a signal as low as −5 dBm was estimated. Power consumption is 5-6 uAmp in sleep mode; in "advertising mode" with simultaneous broadcast on three channels, power draw increases to millisecond power spikes of up to 15-20 mAmp. A "wake pin" is incorporated so that sleep mode is only interrupted when active messaging is appropriate.

Example 8

A soft bandage-like circuit defining a "radio jacket device" is applied along the length of an over the ends of a AA battery. The end tabs include a conductive foil layer that is exposed underneath the where it contacts the poles of the battery. The foil conductor is also exposed on the outside surface of the radio jacket over the poles so that multiple batteries can be stacked in a voltaic pile if needed. The conductive tabs supply power from the battery to a circuit embedded in layers of the radio jacket. The circuit includes a Bluetooth radio modem with antenna, cache memory for storing a radio unique identifier and basic instruction set, and accessory circuitry including optional battery status sensors and environmental sensors. An insulative layer is applied over the circuit. The AA battery is then inserted inside a flashlight along with several other unjacketed batteries. The user programs a smartphone to detect the unique radio identifier broadcast by the radio jacket device and can map the current location of the device on a map display on the smartphone. The location can also be tracked by a cloud host and a signal can be sent to the user if the battery condition deteriorates.

Scope of the Claims

Representative claims are filed with this application. The disclosure set forth herein of certain exemplary embodiments, including all text, drawings, annotations, and graphs, is sufficient to enable one of ordinary skill in the art to practice the invention. Various alternatives, modifications and equivalents are possible, as will readily occur to those skilled in the art in practice of the invention. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the invention.

In general, in the following representative claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

We claim:

1. A radiobeacon apparatus for retrofit onto a standard 9V alkaline battery, as insertable into a battery-receiving compartment of a battery-operated device in need of a 9V battery, the battery having four side faces, a top face and a bottom face, the top face having an anode pole and a cathode pole, the apparatus comprising:
a printed circuit board ("jacket") having a folded or foldable juncture between a first section and a second section, wherein the first section is configured to contact the top face of the 9V battery and the second section is configured to contact a side face of the battery; the first section includes first and second contacts configured to be conductively contacted to the anode pole and cathode pole; said jacket comprises a circuit powered by the first and second contacts when retrofitted onto the battery in parallel to an external load, and includes a processor, memory for storing processor-executable instructions and data, and a Bluetooth radio enabled to transmit a signal under control of the processor that includes a unique radiobeacon identifier and transmissible data, wherein said jacket processor is configured to execute an instruction set that enables radiobeacon communications with a receiver, said receiver is a smart device is configured with a compatible communications application, said application having instructions which when executed by a processor of the smart device, enable the smart device to receive and process the unique radiobeacon identifier and the transmissible data of the jacket.

2. The apparatus of claim 1, wherein the signal enables the smart device to programmably display a location of the 9V battery while battery power is supplied to the jacket.

3. The apparatus of claim 1, wherein the signal is a trackable signal that can be identified by its radio unit identifier.

4. The apparatus of claim 1, wherein the device includes one or more sensors and the signal includes sensor data.

5. The apparatus of claim 1, wherein the signal data includes battery status data.

6. The apparatus of claim 1, wherein the connector tab comprises conductive foil leads.

7. The apparatus of claim 6, where the connector tab includes an adhesive backing.

8. The apparatus of claim 6, wherein the connector tab is configured to be contacted on the top face of the battery so that the anodic and cathodic connections are not interchangeable.

9. The apparatus of claim 1, wherein the jacket comprises a buzzer or speaker, and is configured to receive a radio command from a smartphone to activate the buzzer or speaker.

10. The apparatus of claim 1, wherein the jacket is reusably adherable to a new 9V battery.

11. The apparatus of claim 1, wherein the smart device is a smartphone having instructions for decoding the signal.

12. The apparatus of claim 11, wherein the smart device is in communication with a cloud host and the cloud host comprises a server with database that stores a user profile for each radio unit identifier and contact information for a user associated with each radio unit identifier.

13. The apparatus of claim 1, comprising coupling, in response to a first instance of a control signal from the smart device, a node of the battery to a power terminal of the battery jacket; and, uncoupling, in response to a second instance of the control signal, the node from the power terminal.

14. A radiobeacon apparatus for retrofit onto a standard pen cell battery as inserted into a battery-receiving compartment of a battery-operated appliance having a battery-receiving compartment sized to receive a standard pen cell battery, the battery having a top face, a bottom face, a cylindrical side face, the top face defining a cathode pole, and the bottom face defining an anode pole, the apparatus comprising:

a printed circuit board ("jacket") having folded or foldable junctures between a first section, a second section, and a third section, wherein the first section is configured to contact the top face of the battery, the second section is configured to contact the side face of the battery; the third section is configured to contact the bottom face, the first section includes a first contact configured to be conductively contacted to the cathode pole, the third section includes a second contact configured to be conductively contacted to the anode pole;

said jacket comprises a circuit powered by the first and second contacts when retrofitted onto the battery in parallel to an external load, and includes a processor, memory for storing processor-executable instructions and data, and a Bluetooth radio enabled to transmit a signal under control of the processor that includes a unique radiobeacon identifier and transmissible data, wherein said jacket processor is configured to execute an instruction set that enables radiobeacon communications with a receiver; and said receiver is a smart device is configured with a compatible communications application, said application having instructions which when executed by a processor of the smart device, enable the smart device to receive and process the unique radiobeacon identifier and the transmissible data of the jacket.

15. The apparatus of claim 14, wherein the signal enables the smart device to programmably display a location of the pen cell battery while battery power is supplied to the jacket.

16. The apparatus of claim 14, wherein the signal is a trackable signal that can be identified by its radio unit identifier.

17. The apparatus of claim 14, wherein the device includes one or more sensors and the signal includes sensor data.

18. The apparatus of claim 14, wherein the signal data includes battery status data.

19. The apparatus of claim 14, wherein the connectors comprises conductive foil leads.

20. The apparatus of claim 19, where the connectors include an adhesive backing.

21. The apparatus of claim 19 wherein the connectors are configured to be contacted so that the anodic and cathodic connections are identifiable or are not interchangeable.

22. The apparatus of claim 14, wherein the jacket comprises a buzzer or speaker, and is configured to receive a radio command from a smartphone to activate the buzzer or speaker.

23. The apparatus of claim 14, wherein the jacket is reusably adherable to a new pen cell battery.

24. The apparatus of claim 14, wherein the smart device is a smartphone having instructions for decoding the signal.

25. The apparatus of claim 24, wherein the smart device is in communication with a cloud host and the cloud host comprises a server with database that stores a user profile for each radio unit identifier and contact information for a user associated with each radio unit identifier.

* * * * *